(12) United States Patent
Andrew et al.

(10) Patent No.: US 7,991,224 B2
(45) Date of Patent: Aug. 2, 2011

(54) SEGMENTING DIGITAL IMAGE AND PRODUCING COMPACT REPRESENTATION

(75) Inventors: James Philip Andrew, Auckland (NZ); James Austin Besley, West Ryde (AU); Steven Richard Irrgang, Caringbah (AU); Yu-Ling Chen, Epping (AU); Eric Wai-Shing Chong, Ryde (AU); Michael Jan Lawther, Eastwood (AU); Timothy John Wark, The Gap (AU)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 11/720,059

(22) PCT Filed: Dec. 20, 2005

(86) PCT No.: PCT/AU2005/001926
§ 371 (c)(1),
(2), (4) Date: Jul. 11, 2007

(87) PCT Pub. No.: WO2006/066325
PCT Pub. Date: Jun. 29, 2006

(65) Prior Publication Data
US 2008/0123945 A1    May 29, 2008

(30) Foreign Application Priority Data

Dec. 21, 2004  (AU) ................................ 2004242419
Dec. 21, 2004  (AU) ................................ 2004242421

(51) Int. Cl.
*G06K 9/34* (2006.01)
*G06K 9/00* (2006.01)
*G06K 9/36* (2006.01)
(52) U.S. Cl. ...................................... 382/164; 382/251
(58) Field of Classification Search .................. 382/162, 382/164, 166, 167, 173, 176, 190, 195, 199, 382/237, 261, 268, 283, 284, 289, 290; 358/1.15, 3.01, 3.06, 453, 515, 518; 375/240.27, E7.19, E7.241; 345/427, 473, 592, 600–604, 611, 629
See application file for complete search history.

(56) References Cited

U.S. PATENT DOCUMENTS
5,321,770 A * 6/1994 Huttenlocher et al. ....... 382/174
(Continued)

FOREIGN PATENT DOCUMENTS
EP    621554 A2    10/1994
(Continued)

OTHER PUBLICATIONS

Léon Bottou et al., High Quality Document Image Compression with DJVU, Journal of Electronic Imaging, vol. 7, No. 3, Jul. 1, 1998, pp. 410-425, XP000771751.

(Continued)

*Primary Examiner* — Amir Alavi
(74) *Attorney, Agent, or Firm* — Fitzpatrick, Cella, Harper & Scinto

(57) ABSTRACT

A method (100), an apparatus, and a computer program product for automatically producing a compact representation of a colour document are disclosed. In the method, a digital image of a colour-document page is segmented (110) into connected components in one-pass, block raster order. The digital image of the page is partitioned into foreground and background images using layout analysis (120) based on compact, connected-component statistics of the whole page. At least one portion of the background image where at least one portion of the foreground image obscures the background image is inpainting (520) in one-pass block raster order. The foreground and background images are combined (130) to form a compact document. A method, an apparatus, and a computer program product for segmenting a digital image comprising a plurality of pixels are also disclosed.

21 Claims, 50 Drawing Sheets

U.S. PATENT DOCUMENTS

| | | | | |
|---|---|---|---|---|
| 5,751,859 | A * | 5/1998 | Howard | 382/238 |
| 5,761,344 | A | 6/1998 | Al-Hussien | 382/237 |
| 6,285,458 | B1 | 9/2001 | Yada | 358/1.15 |
| 6,563,958 | B1 | 5/2003 | Andrew | 382/268 |
| 6,577,763 | B2 | 6/2003 | Fujimoto et al. | 382/199 |
| 6,766,056 | B1 | 7/2004 | Huang et al. | 382/190 |
| 6,782,126 | B2 * | 8/2004 | Rao et al. | 382/164 |
| 6,999,616 | B2 * | 2/2006 | Nacken | 382/165 |
| 7,072,508 | B2 * | 7/2006 | Dance | 382/167 |
| 7,148,897 | B2 | 12/2006 | Ecob et al. | 345/473 |
| 7,227,893 | B1 * | 6/2007 | Srinivasa et al. | 375/240.08 |
| 7,272,258 | B2 * | 9/2007 | Berkner et al. | 382/176 |
| 7,280,120 | B2 | 10/2007 | Ecob et al. | 345/611 |
| 7,292,256 | B2 | 11/2007 | Lawther et al. | 345/629 |
| 2003/0123729 | A1 | 7/2003 | Mukherjee et al. | 382/176 |
| 2003/0146915 | A1 | 8/2003 | Brook et al. | 345/473 |
| 2003/0202697 | A1 | 10/2003 | Simard et al. | 382/195 |
| 2004/0096102 | A1 | 5/2004 | Handley | 382/164 |
| 2006/0023259 | A1 | 2/2006 | Wark et al. | 358/3.06 |
| 2008/0123945 | A1 * | 5/2008 | Andrew et al. | 382/164 |

FOREIGN PATENT DOCUMENTS

| | | | |
|---|---|---|---|
| EP | 1357508 | A2 | 10/2003 |

OTHER PUBLICATIONS

David A. Bader et al., "Parallel Algorithms for Image Histogramming and Connected Components with an Experimental Study," Journal of Parallel and Distributed Computing, vol. 35, No. 2, Jun. 15, 1996, pp. 173-190, XP004419174.

Keechul Jung et al., "Text Information Extraction in Images and Video: A Survey," The Journal of the Pattern Recognition Society, vol. 37, No. 5, May 1, 2004, pp. 977-997, XP004496837.

European Search Report issued in the corresponding application No. 05818582.8 dated May 27, 2009—16 pages.

Notification of the First Office Action issued by the Patent Office of the People's Republic of China in the corresponding application No. 200580043979.X dated Sep. 26, 2008, along with English-language translation—13 pages.

Korean Office Action issued in the corresponding application No. 10-2007-7015120, along with English-language translation—6 pages.

Korean Notice of Preliminary Rejection issued in the corresponding application No. 10-2007-7015120 dated Jan. 16, 2009, along with English-language translation—5 pages.

* cited by examiner

| Changes in labels | | Blob count | |
|---|---|---|---|
| | | 1 | 2 |
| CC count | 1 | Both | Any |
| | 2 | Any | N/A |

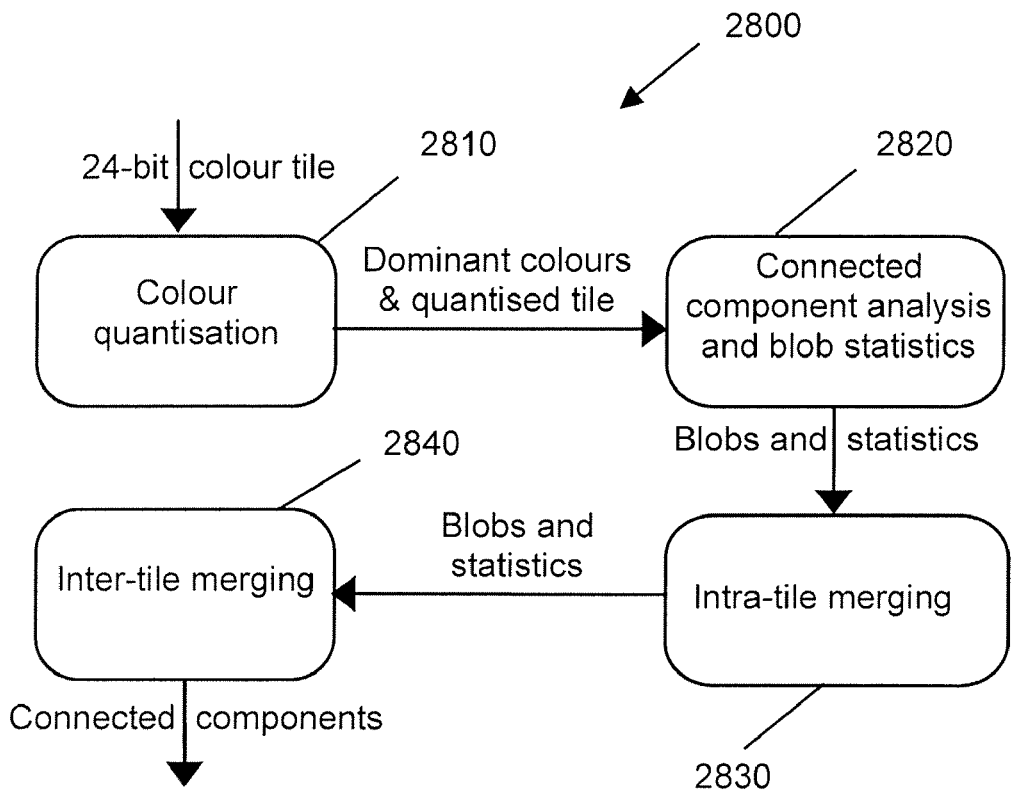
Fig. 28
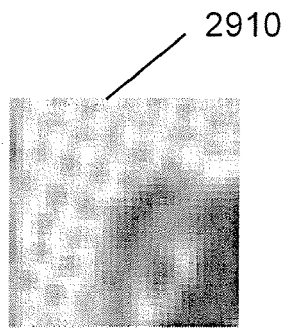 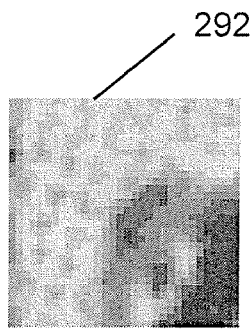 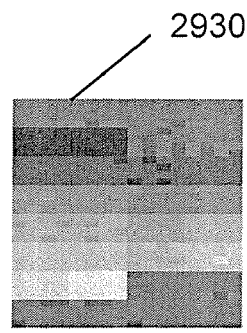
Fig. 29(a)  Fig. 29(B)  Fig. 29(C)

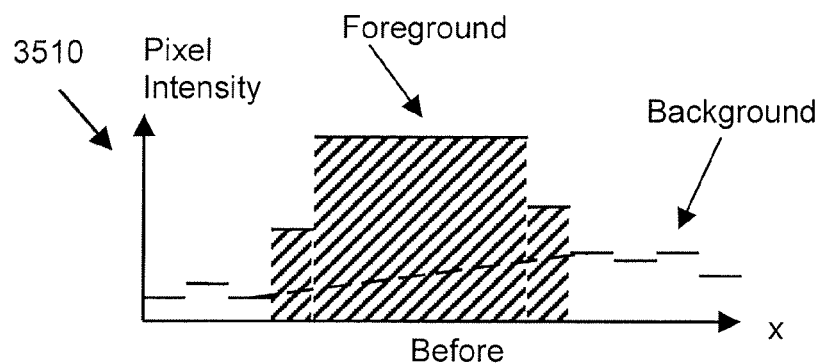
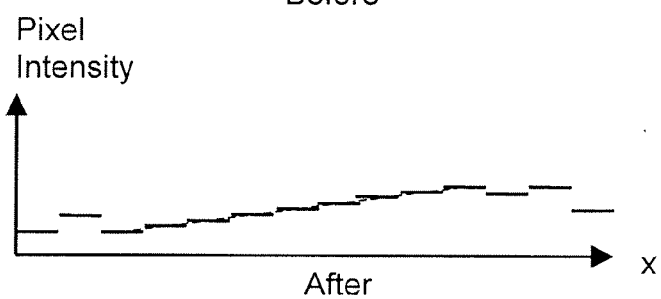
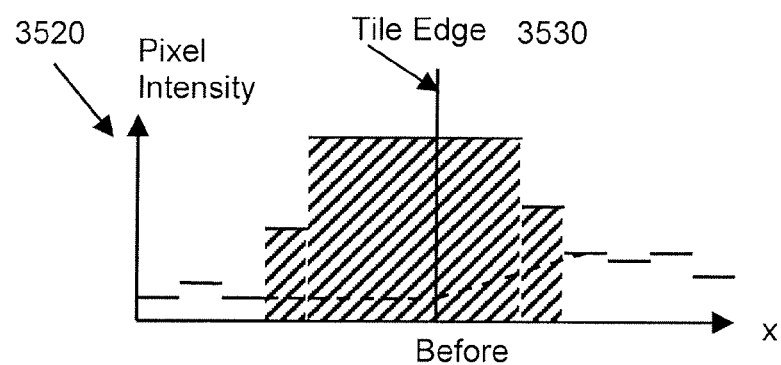
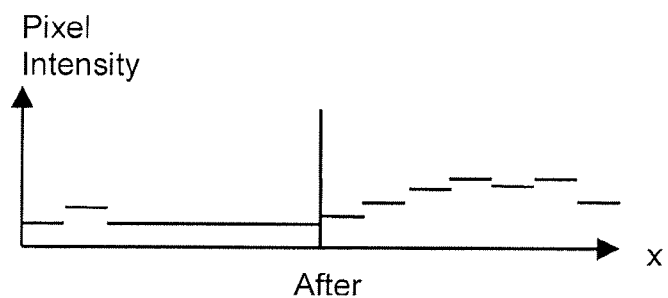
Fig. 35

| (CC count, blob count) | Prior to update | Updated counts |
|---|---|---|
| $\Delta_{cc}\ \Delta_{blob}$ | (X, X) | (1, 1) |
| $\Delta_{cc}$ or $\Delta_{blob}$ only & merge attempted | (1, 2) (2, 1) | (0, 0) if 2$^{nd}$ candidate merged<br>(1, 1) if 1$^{st}$ candidate merged or no merge |
| $\Delta_{blob}$ only & no merge | $(N_{cc}, N_{blob})$ | $(1, N_{blob}+1)$ |
| $\Delta_{cc}$ only & no merge | $(N_{cc}, N_{blob})$ | $(N_{cc}+1, 1)$ |

$\Delta_{cc}$ - change in CC label detected $\Delta_{blob}$ - changed in blob label detected X - don't care $N_{cc}$ - number of CC candidates $N_{blob}$ - number of blob candidates

Fig. 48

SEGMENTING DIGITAL IMAGE AND PRODUCING COMPACT REPRESENTATION

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD

The present invention relates generally to the field of digital image processing and in particular to producing high-level descriptions of digital images.

BACKGROUND

Image segmentation is a process of dividing or separating an image into semantically or visually coherent regions. Each region is a group of connected pixels having a similar attribute or attributes. A basic attribute for segmentation is the luminance amplitude for a monochrome image and the colour components for a colour image.

The proliferation of scanning technology combined with ever increasing computational processing power has lead to many advances in the area of document analysis systems. These systems may be used to extract semantic information from a scanned document, often by means of OCR technology. Such systems can also be used to improve compression of a document image by selectively using an appropriate compression method depending on the content of each part of the page. Improved document compression lends itself to applications such as archiving and electronic distribution.

Segmentation is a processing stage for document image analysis where low-level pixels must first be segmented into primitive objects before higher-level processes, such as region classification and layout analysis, can be performed. Layout analysis classifies primitive objects into known object types according to some predefined rules about document layout. Typically, the layout analysis does not analyse the original scanned image data, but instead works with an alternative data set, such as blobs or connected components from a segmentation of the page. The layout analysis may use object grouping in addition to individual object properties to determine their classification.

A number of existing methods for image segmentation are described hereinafter.

Thresholding is the simplest method for segmentation and can be fast and effective if an image to be processed is bi-level (e.g., a black and white document image). However, if the image is complex with regions of multiple luminance or colour levels, some of these regions may be lost during binarisation. More sophisticated thresholding techniques employ adaptive or multilevel thresholding, where threshold estimation and binarisation are performed at a local level. However, these methods still may fail to segment objects correctly.

Clustering-based methods, such as k-means and vector quantisation, tend to produce good segmentation outcomes, but are iterative algorithms that require multiple passes. Thus, such method can be slow and difficult to implement.

Split-and-merge image segmentation techniques are based on a quadtree data representation, in which a square image segment is split into four quadrants if the original image segment is non-uniform in attribute. If four neighbouring squares are found to be uniform, those squares are merged by a single square composed of the four adjacent squares. The split and merge process usually starts at the full image level. Thus, processing can only begin after the whole page has been buffered, requiring high memory bandwidth. Furthermore, this approach tends to be computationally intensive.

Region-growing is a well-known method for image segmentation and is one of the conceptually simplest approaches. Neighbouring pixels having a similar attribute or attributes are grouped together to form a segment region. However, in practice, reasonably complex constraints must be placed on the growth pattern to achieve acceptable results. Existing region-growing methods can have several undesirable effects in that the methods tend to bias towards initial seed locations. Different choices of seeds may give different segmentation results, and problems can occur if the seed point lies on an edge.

The proliferation of scanning technology combined with ever increasing computational processing power has lead to many advances in the area of document analysis systems. These systems may be used to extract semantic information from a scanned document, often by means of OCR technology. This technology is used in a growing number of applications, such as automated form reading, and can also be used to improve compression of a document by selectively using an appropriate compression method depending on the content of each part of the page. Improved document compression lends itself to applications such as archiving and electronic distribution.

Some document analysis systems perform a layout analysis to break the document into regions classified according to their content. Typically, the layout analysis does not analyse the original scanned image data, but works with an alternative data set, such as blobs or connected components from a segmentation of the page. The layout analysis may use object grouping in addition to individual object properties to determine their classification.

In general, a binary segmentation of the page is performed to generate data for the layout analysis, and this may be obtained by simply thresholding the original image. One advantage of this binary segmentation is that the segmented objects sit within a simple containment hierarchy that aids the layout analysis. Unfortunately, the layout of many complex colour documents simply cannot be represented completely by a binary image. The reduction in information content inherent in the colour to binary image conversion may result in degradation of important features and even loss of the detailed structure of the document.

A colour segmentation of the page document analysis therefore has advantages in terms of preserving the content of the page, but brings with it additional complexity. Firstly, the segmentation analysis itself becomes more involved and the processing requirements increase. Secondly, the analysis of the segmented page objects is complicated by the fact that the objects do not form a containment hierarchy. This limits the accuracy and efficiency of the layout analysis.

Document layout analysis systems may also employ techniques for verifying the text classification of a region of a document. Some of these methods use histogram analysis of pixel sums, shadowing and projected profiles. These methods are often unreliable as robust statistics are difficult to apply to such method and difficult to tune for text that might be either a single line or many lines and for which the character set and alignment of text in the document is unknown.

SUMMARY

In accordance with a first aspect of the invention, there is provided a method of segmenting a digital image comprising a plurality of pixels. The method comprises the steps of: generating a plurality of blocks of pixels from the digital image; and producing at least one connected component for each block using the blocks of pixels in a one-pass manner. In turn, the producing step comprises: segmenting a block of pixels into at least one connected component, each connected component comprising a group of pixels that are spatially connected and semantically related; merging the at least one connected component of the block with at least one connected component segmented from at least one other block that has been previously processed; and storing in a compact form a location in the image of the connected components of the block.

The semantically related pixels may comprise pixels that are similarly coloured.

The generating step may comprise the sub-steps of: arranging the digital image into a plurality of bands, each band comprising a predetermined number of consecutive lines of pixels; and buffering and processing the bands one-by-one. In turn, the processing step comprises the sub-steps performed on each currently buffered band: arranging the current band into a plurality of blocks of pixels; and buffering and processing the blocks of the current band one-by-one for the producing step.

The storing sub-step may comprise storing M−1 binary bitmaps, where M-connected components are in a block, M being an integer.

The storing sub-step may comprise storing an index map.

The segmenting sub-step may comprise: estimating a number of representative colours for each block; quantizing each block to the representative colours; and forming connected components from each quantized block. The segmenting sub-step may further comprise merging a subset of the connected components that are formed. The merging sub-step may comprise gathering statistics of the connected components. The statistics may comprise any one or more of bounding boxes, pixel count, border length, and average colour. The method may further comprise the step of removing the formed connected components that are deemed to be noise. The noise may comprise connected components having a pixel count that is below a predefined threshold and a border-length-to-pixel-count ratio above another predefined threshold. The merging step may comprise: merging connected components of a block with connected components of a block on the left and above; and updating the statistics of the merged connected components. The statistics may comprise any one of more of bounding boxes, pixel count, fill ratio, and average colour.

The estimating sub-step may comprise: forming a histogram related to a plurality of colour bins based on YUV data of pixels in each block; classifying each block based on histogram statistics; and merging bin colours to form the representative colours based on the block classification. The method may further comprising the step of forming an indexed map for each pixel in one pass. The quantizing step may comprise: quantizing non-empty bins to representative colours; creating a bin mapping to the representative colours; and remapping the indexed map to the representative colours using the bin mapping. The forming sub-step may comprise: deciding a luminance band based on Y value; deciding a colour column based on U and V value; accumulating the pixel colour to the mapped bin; and incrementing the pixel count of the mapped bin. The step of deciding a luminance band may further comprise luminance-band anti-aliasing. The step of deciding a colour column may further comprise colour column anti-aliasing/

The merging step may comprise the following sub-steps performed for each connected component in a current block touching the left and above border: finding a list of connected components that touch the current connected component along the common border; and deciding the best candidate to merge.

In accordance with another aspect of the invention, there is provided an apparatus comprising a processor and memory for segmenting a digital image comprising a plurality of pixels in accordance with anyone of the aspects of the foregoing method.

In accordance with still another aspect of the invention, there is provided a computer program product comprising a computer readable medium having recorded therein a computer program for segmenting a digital image comprising a plurality of pixels in accordance with anyone of the aspects of the foregoing method.

In accordance with yet another aspect of the invention, there is provided a method of automatically producing a compact representation of a colour document. The method comprises the steps of: segmenting a digital image of a colour-document page into connected components in one-pass, block raster order; partitioning the digital image of the page into foreground and background images using layout analysis based on compact, connected-component statistics of the whole page; inpainting in one-pass block raster order at least one portion of the background image where at least one portion of the foreground image obscures the background image; and combining the foreground and background images to form a compact document.

The method may further comprise the step of downsampling the background image. Still further, the method may further comprise the step of compressing the background image. The compressing step may involve lossy compression. Further, the method may comprise a different compressing of the lossy compressed background image.

In accordance with a further aspect of the invention, there is provided an apparatus comprising a processor and memory for automatically producing a compact representation of a colour document in accordance with anyone of the aspects of the foregoing method.

In accordance with still a further aspect of the invention, there is provided a computer program product comprising a computer readable medium having recorded therein a computer program for automatically producing a compact representation of a colour document in accordance with anyone of the aspects of the foregoing method.

In accordance with another aspect of the invention, there is provided a method of analysing a digital image comprising a plurality of pixels. The method comprises the steps of: segmenting the digital image into objects, where the segmentation is represented by more than two labels; providing a set of properties for each object; for a subset of the objects, using a measure of containment to determine if a parent-child relationship exists between adjacent objects sharing a boundary; forming groups of objects that share a common parent based on object properties; and classifying objects according to their properties and grouping.

The containment may be determined using bounding boxes around each object and information describing touching relationships between objects. An object contains another object if the two objects touch at a boundary and the bounding box of the object completely contains the bounding box of the other object.

The forming groups step may comprise: considering pairs of child objects from a list of children of a common parent; and determining using the object properties whether each pair should be grouped together. Only neighbouring objects from a list of child objects with the same parent may be considered for grouping. Objects may grouped based on bounding box and colour information.

A group of objects may be classified as text according to a test of text-like qualities of the objects within the group. The test for text-like qualities may comprise: identifying a single value for each object representing that a location of the object; forming a histogram of the values; and identifying text by a property of the histogram.

The method may further comprise the step of adding further objects to a text-classified group of objects according to their properties, but regardless of their parent-child properties.

In accordance with still another aspect of the invention, there is provided a method of analysing a digital image comprising a plurality of pixels of a document page. The method comprises the steps of: segmenting the digital image to form objects based on the image; forming groups of the objects; and determining if the groups of objects each represent text. The determining step comprises: identifying a single value for each object dependent on a location of the object on the page; forming a histogram of the values; and identifying text by a property of the histogram.

The property of the histogram may be the total number of objects in bins in the histogram that have more than a specified number of objects. Alternatively, the property may be the sum of the squares of counts in the histogram.

The single value for each object representing the location of the object may be an edge of abounding box of the object.

In accordance with another aspect of the invention, there is provided an apparatus comprising a processor and a memory for analysing a digital image comprising a plurality of pixels in accordance with the method according to any one of the foregoing aspects.

In accordance with another aspect of the invention, there is provided a computer program product comprising a computer readable medium having recorded therein a computer program for analysing a digital image comprising a plurality of pixels in accordance with the method according to any one of the foregoing aspects.

In accordance with yet another aspect of the invention, there is provided a method of inpainting a digital image comprising a plurality of pixels. The method comprises the steps of: generating a plurality of blocks of pixels from the digital image; and changing in raster order pixel values of at least one run of pixels for at least one block. The changing step comprises the following sub-steps performed on each block: determining start and end pixels for a run of pixels in the block relating to an object, the run comprising adjacent pixels grouped together; modifying at least one pixel value of the object in said run dependent upon pixel values of pixels outside the run; and determining an activity measure for pixels that do not correspond to an object in the block; and changing all pixel values in each block having at least one run of pixels to a set value if the activity measure for the block is less than a predetermined threshold.

The method may further comprise the step of modifying at least one pixel value of a dilated object pixel outside the object dependent upon pixel values of pixels outside the dilated object.

The generating step may comprise the sub-steps of: arranging the digital image into a plurality of bands, each band comprising a predetermined number of consecutive lines of pixels; and buffering and processing the bands one-by-one. The processing step may comprise the following sub-steps performed on each currently buffered band: arranging the current band into a plurality of blocks of pixels; and buffering and processing the blocks of the current band one-by-one for the changing steps.

The run comprises adjacent pixels in a raster line of pixels of the block.

The method may further comprise the step of compressing each block using a block-based compression method. The block-based compression method may be JPEG. The method may further comprise the step of further compressing the block-based compressed blocks using another compression technique.

The at least one pixel value of the object may be modified dependent upon pixel values of pixels outside the object uses a value interpolated from pixel values to the left and right of the run, or a value from a pixel to the left of the run.

All pixel values in each block having at least one run of pixels may be changed to an average value of a previously processed block or an average value of visible pixels in the block.

The method may further comprise the step of, if an end of the run of dilated object pixels is not found, setting colour values of pixels to a colour value of a pixel that does not correspond to an object to the left of the run of dilated object pixels.

The pixel values may be colour values.

In accordance with a further aspect of the invention, there is provided an apparatus comprising a processor and memory for inpainting a digital image comprising a plurality of pixels in accordance with the method of any one of the foregoing aspects.

In accordance with a further aspect of the invention, there is provided a computer program product comprising a computer readable medium having recorded therein a computer program for inpainting a digital image comprising a plurality of pixels in accordance with the method of any one of the foregoing aspects.

In accordance with another aspect of the invention, there is provided a method of changing pixels values of a digital image comprising a plurality of pixels, at least a portion of the pixels corresponding to an object in the image, the method comprising the steps of: arranging the digital image into a plurality of bands, each band comprising a predetermined number of consecutive lines of pixels; and buffering and processing the bands one by one in turn. The processing step comprises the following sub-steps for each currently buffered band: arranging the current band into a plurality of blocks of pixels; and processing the blocks one by one in turn. The block processing step comprises the following sub-steps for each block: determining an activity measure for pixels in the block that do not correspond to objects in the image; if the activity measure is less than a predetermined threshold, changing pixel values of all pixels in the block to a pixel value; compressing the block with JPEG; and compressing the JPEG compressed block using another compression method.

The bands each may comprise 16 lines of pixels of the digital image, the blocks comprise 16×16 pixels, and the compressing steps are performed in a pipeline manner.

The step of changing colour values of all pixels in the block may comprise setting the colour values of the pixels to colour values obtained by linearly interpolating between pixels that do not correspond to objects immediately to the left and right of a run of dilated object pixels, the dilated object pixels being pixels outside and adjacent to the run.

The method may further comprise the step of, setting colour values of pixels in the block to an average colour value of pixels that do not correspond to an object in the block.

The method may further comprise the step of, setting colour values of pixels in the block to an average colour of a preceding block.

Pixels of a dilated object may be determined by dilating a mask defining a location of the object.

The other compression method may comprise ZLIB.

The pixel values may be colour values.

In accordance with still another aspect of the invention, there is provided an apparatus comprising a processor and memory for changing pixels values of a digital image comprising a plurality of pixels, at least a portion of the pixels corresponding to an object in the image, in accordance with the method of any one of the foregoing aspects.

In accordance with a further aspect of the invention, there is provided a computer program product comprising a computer readable medium having recorded therein a computer program for changing pixels values of a digital image comprising a plurality of pixels, at least a portion of the pixels corresponding to an object in the image, in accordance with the method of any one of the foregoing aspects.

In accordance with a still another aspect of the invention, there is provided a method of segmenting a digital image comprising a plurality of pixels. The method comprises the steps of: generating a plurality of blocks of pixels from the digital image; and producing at least one connected component for each block using the blocks of pixels in a one-pass manner. In turn, the producing step comprises: segmenting a block of pixels into at least one connected component, each connected component comprising a group of pixels that are spatially connected and semantically related; merging the at least one connected component of the block with at least one connected component segmented from at least one other block that has been previously processed; and storing in a compact form a location in the image of the connected components of the block.

The semantically related pixels may comprise pixels that are similarly coloured.

The storing sub-step may comprise storing M−1 binary bitmaps, where M-connected components are in a block, M being an integer.

The storing sub-step may comprise storing an index map.

The segmenting sub-step may comprise: estimating a number of representative colours for each block; quantizing each block to the representative colours; and forming connected components from each quantized block. The segmenting sub-step may further comprise merging a subset of the connected components that are formed. The merging sub-step may comprise gathering statistics of the connected components. The statistics may comprise any one or more of bounding boxes, pixel count, border length, and average colour. The method may further comprise the step of removing the formed connected components that are deemed to be noise. The noise may comprise connected components having a pixel count that is below a predefined threshold and a border-length-to-pixel-count ratio above another predefined threshold. The merging step may comprise: merging connected components of a block with connected components of a block on the left and above; and updating the statistics of the merged connected components. The statistics may comprise any one of more of bounding boxes, pixel count, fill ratio, and average colour.

The estimating sub-step may comprise: forming a histogram related to a plurality of colour bins based on YUV data of pixels in each block; classifying each block based on histogram statistics; and merging bin colours to form a representative colours based on the block classification. The method may further comprising the step of forming an indexed map for each pixel in one pass. The quantizing step may comprise: quantizing non-empty bins to representative colours; creating a bin mapping to the representative colours; and remapping the indexed map to the representative colours using the bin mapping. The forming sub-step may comprise: deciding a luminance band based on Y value; deciding a colour column based on U and V value; accumulating the pixel colour to the mapped bin; and incrementing the pixel count of the mapped bin. The step of deciding a luminance band may further comprise luminance-band anti-aliasing. The step of deciding a colour column may further comprise colour column anti-aliasing/

The merging step may comprise the following sub-steps performed for each connected component in a current block touching the left and above border: finding a list of connected components that touch the current connected component along the common border; and deciding the best candidate to merge.

In accordance with another aspect of the invention, there is provided an apparatus comprising a processor and memory for segmenting a digital image comprising a plurality of pixels in accordance with anyone of the aspects of the foregoing method.

In accordance with still another aspect of the invention, there is provided a computer program product comprising a computer readable medium having recorded therein a computer program for segmenting a digital image comprising a plurality of pixels in accordance with anyone of the aspects of the foregoing method.

In accordance with yet another aspect of the invention, there is provided a method of automatically producing a compact representation of a colour document. The method comprises the steps of: segmenting a digital image of a colour-document page into connected components in one-pass, block raster order; partitioning the digital image of the page into foreground and background images using layout analysis based on compact, connected-component statistics of the whole page; inpainting in one-pass block raster order at least one portion of the background image where at least one portion of the foreground image obscures the background image; and combining the foreground and background images to form a compact document.

The method may further comprise the step of downsampling the background image. Still further, the method may further comprise the step of compressing the background image. The compressing step may involve lossy compression. Further, the method may comprise a different compressing of the lossy compressed background image.

In accordance with a further aspect of the invention, there is provided an apparatus comprising a processor and memory for automatically producing a compact representation of a colour document in accordance with anyone of the aspects of the foregoing method.

In accordance with still a further aspect of the invention, there is provided a computer program product comprising a computer readable medium having recorded therein a computer program for automatically producing a compact representation of a colour document in accordance with anyone of the aspects of the foregoing method.

In accordance with another aspect of the invention, there is provided a method of analysing a digital image comprising a plurality of pixels. The method comprises the steps of: segmenting the digital image into objects, where the segmentation is represented by more than two labels; providing a set of properties for each object; for a subset of the objects, using a measure of containment to determine if a parent-child relationship exists between adjacent objects sharing a boundary;

forming groups of objects that share a common parent based on object properties; and classifying objects according to their properties and grouping.

The containment may be determined using bounding boxes around each object and information describing touching relationships between objects. An object contains another object if the two objects touch at a boundary and the bounding box of the object completely contains the bounding box of the other object.

The forming groups step may comprise: considering pairs of child objects from a list of children of a common parent; and determining using the object properties whether each pair should be grouped together. Only neighbouring objects from a list of child objects with the same parent may be considered for grouping. Objects may grouped based on bounding box and colour information.

A group of objects may be classified as text according to a test of text-like qualities of the objects within the group. The test for text-like qualities may comprise: identifying a single value for each object representing that a location of the object; forming a histogram of the values; and identifying text by a property of the histogram.

The method may further comprise the step of adding further objects to a text-classified group of objects according to their properties, but regardless of their parent-child properties.

In accordance with still another aspect of the invention, there is provided a method of analysing a digital image comprising a plurality of pixels of a document page. The method comprises the steps of: segmenting the digital image to form objects based on the image; forming groups of the objects; and determining if the groups of objects each represent text. The determining step comprises: identifying a single value for each object dependent on a location of the object on the page; forming a histogram of the values; and identifying text by a property of the histogram.

The property of the histogram may be the total number of objects in bins in the histogram that have more than a specified number of objects. Alternatively, the property may be the sum of the squares of counts in the histogram.

The single value for each object representing the location of the object may be an edge of a bounding box of the object.

In accordance with another aspect of the invention, there is provided an apparatus comprising a processor and a memory for analysing a digital image comprising a plurality of pixels in accordance with the method according to any one of the foregoing aspects.

In accordance with another aspect of the invention, there is provided a computer program product comprising a computer readable medium having recorded therein a computer program for analysing a digital image comprising a plurality of pixels in accordance with the method according to any one of the foregoing aspects.

In accordance with yet another aspect of the invention, there is provided a method of inpainting a digital image comprising a plurality of pixels. The method comprises the steps of: generating a plurality of blocks of pixels from the digital image; and changing in raster order pixel values of at least one run of pixels for at least one block. The changing step comprises the following sub-steps performed on each block: determining start and end pixels for a run of pixels in the block relating to an object, the run comprising adjacent pixels grouped together; modifying at least one pixel value of the object in said run dependent upon pixel values of pixels outside the run; and determining an activity measure for pixels that do not correspond to an object in the block; and changing all pixel values in each block having at least one run of pixels to a set value if the activity measure for the block is less than a predetermined threshold.

The method may further comprise the step of modifying at least one pixel value of a dilated object pixel outside the object dependent upon pixel values of pixels outside the dilated object.

The generating step may comprise the sub-steps of: arranging the digital image into a plurality of bands, each band comprising a predetermined number of consecutive lines of pixels; and buffering and processing the bands one-by-one. The processing step may comprise the following sub-steps performed on each currently buffered band: arranging the current band into a plurality of blocks of pixels; and buffering and processing the blocks of the current band one-by-one for the changing steps.

The run comprises adjacent pixels in a raster line of pixels of the block.

The method may further comprise the step of compressing each block using a block-based compression method. The block-based compression method may be JPEG. The method may further comprise the step of further compressing the block-based compressed blocks using another compression technique.

The at least one pixel value of the object may be modified dependent upon pixel values of pixels outside the object uses a value interpolated from pixel values to the left and right of the run, or a value from a pixel to the left of the run.

All pixel values in each block having at least one run of pixels may be changed to an average value of a previously processed block or an average value of visible pixels in the block.

The method may further comprise the step of, if an end of the run of dilated object pixels is not found, setting colour values of pixels to a colour value of a pixel that does not correspond to an object to the left of the run of dilated object pixels.

The pixel values may be colour values.

In accordance with a further aspect of the invention, there is provided an apparatus comprising a processor and memory for inpainting a digital image comprising a plurality of pixels in accordance with the method of any one of the foregoing aspects.

In accordance with a further aspect of the invention, there is provided a computer program product comprising a computer readable medium having recorded therein a computer program for inpainting a digital image comprising a plurality of pixels in accordance with the method of any one of the foregoing aspects.

In accordance with another aspect of the invention, there is provided a method of changing pixels values of a digital image comprising a plurality of pixels, at least a portion of the pixels corresponding to an object in the image, the method comprising the steps of: arranging the digital image into a plurality of bands, each band comprising a predetermined number of consecutive lines of pixels; and buffering and processing the bands one by one in turn. The processing step comprises the following sub-steps for each currently buffered band: arranging the current band into a plurality of blocks of pixels; and processing the blocks one by one in turn. The block processing step comprises the following sub-steps for each block: determining an activity measure for pixels in the block that do not correspond to objects in the image; if the activity measure is less than a predetermined threshold, changing pixel values of all pixels in the block to a pixel value; compressing the block with JPEG; and compressing the JPEG compressed block using another compression method.

The bands each may comprise 16 lines of pixels of the digital image, the blocks comprise 16×16 pixels, and the compressing steps are performed in a pipeline manner.

The step of changing colour values of all pixels in the block may comprise setting the colour values of the pixels to colour values obtained by linearly interpolating between pixels that do not correspond to objects immediately to the left and right of a run of dilated object pixels, the dilated object pixels being pixels outside and adjacent to the run.

The method may further comprise the step of, setting colour values of pixels in the block to an average colour value of pixels that do not correspond to an object in the block.

The method may further comprise the step of, setting colour values of pixels in the block to an average colour of a preceding block.

Pixels of a dilated object may be determined by dilating a mask defining a location of the object.

The other compression method may comprise ZLIB.

The pixel values may be colour values.

In accordance with still another aspect of the invention, there is provided an apparatus comprising a processor and memory for changing pixels values of a digital image comprising a plurality of pixels, at least a portion of the pixels corresponding to an object in the image, in accordance with the method of any one of the foregoing aspects.

In accordance with a further aspect of the invention, there is provided a computer program product comprising a computer readable medium having recorded therein a computer program for changing pixels values of a digital image comprising a plurality of pixels, at least a portion of the pixels corresponding to an object in the image, in accordance with the method of any one of the foregoing aspects.

BRIEF DESCRIPTION OF THE DRAWINGS

A number of embodiments are described hereinafter with reference to the drawings in which:

FIG. 17 is a table showing inter-tile merging conditions;

FIG. 28 is a block diagram of a colour blobbing system;

FIGS. 29(a) to 29(c) are images of the colour histogram output, including the original tile, an indexed map, and the palette where the upper and lower grey portions of the palette represent empty bins;

FIG. 35 comprises plots of one-dimensional inpainting examples;

FIG. 48 is a table showing CC and blob candidate counts before and after updating for all operating conditions;

DETAILED DESCRIPTION

Figure 1:
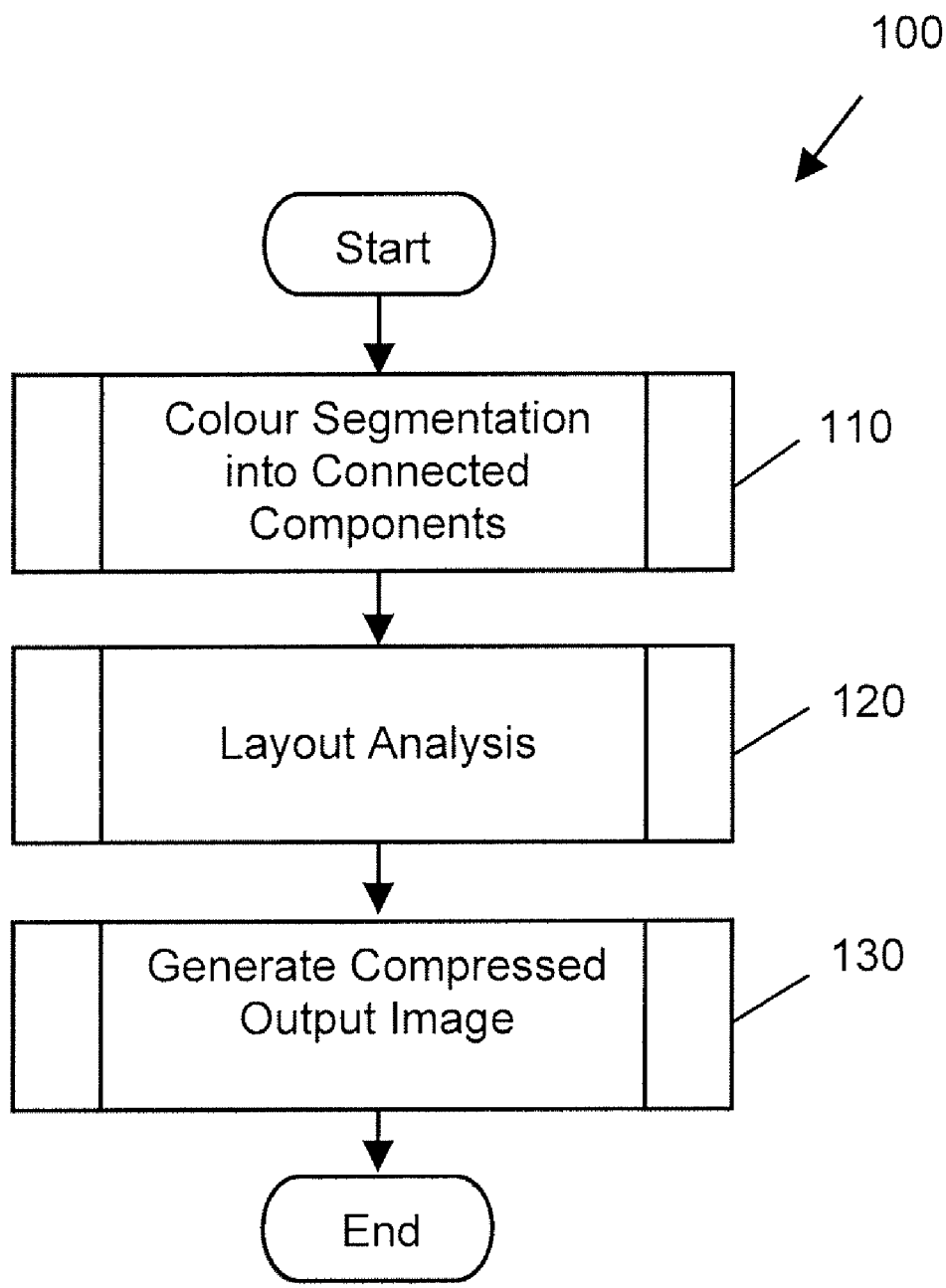
FIG. 1 is a high-level flow diagram providing an overview of segmenting, analysing, and compressing a digital image in accordance with an embodiment of the invention.

Methods, apparatuses, and computer program products are disclosed for processing and compressing a digital image. In the following description, numerous specific details, including particular lossless compression techniques, colour spaces, spatial resolutions, tile sizes, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

In the context of this specification, the word "comprising" has an open-ended, non-exclusive meaning: "including principally, but not necessarily solely", but neither "consisting essentially of" nor "consisting only of". Variations of the word "comprising", such as "comprise" and "comprises", have corresponding meanings.

The contents of the detailed description are organised into sections as follows:
1. Overview
2. Colour Segmentation
   2.1. Obtain Next Tile of Input Image
   2.2. Form Colour Segmentation of Tile
      2.2.1. Colour Quantisation
         2.2.1.1. Form 2D Histogram and First Palette
         2.2.1.2. Analyse Histogram and Classify Image
         2.2.1.3. Form Second Palette
            2.2.1.3.1. Generate 2-Coloured Palette
            2.2.1.3.2. Generate Multi-Coloured Palette
         2.2.1.4. Associate Pixels with Second Palette
            2.2.1.4.1. Map Bi-Level Tile
            2.2.1.4.2. Map Multi-Level Tile
      2.2.2. Colour CC Analysis and Blob Statistics
         2.2.2.1. Form Blobs
         2.2.2.2. Example of Blob Merging
      2.2.3. Intra-tile Merging
      2.2.4. Inter-Tile Merging
         2.2.4.1. Inter-Tile Merging Conditions
         2.2.4.2. Inter-Tile Merging Examples
         2.2.4.3. Process Best Blob and CC Pair
         2.2.4.4 CC Mapping Outcome
      2.2.5. Post Merging Processing
   2.3. Segmentation Example
3. Layout Analysis
   3.1. Grouping CCs
      3.1.1. Finding Children for Parent CC
      3.1.2. Initial Grouping
         3.1.2.1. Grouping Test for Two CCs
   3.2. Checking Groups
      3.2.1. Check Alignment
      3.2.2. Alignment Example
4. Generating Compressed Output Image
   4.1 Inpaint Tile
      4.1.1. Form Tile Foreground Bitmask
      4.1.2 Inpaint Pixels and Measure Tile Activity
      4.1.3. Inpainting Examples
      4.1.4. Tile Flattening
5. Hardware Embodiment
   5.1 Colour Segmentation Module
6. Computer Implementation
7. Industrial Applicability The foregoing sections are described in detail hereinafter in the foregoing order.

1. Overview

Figure 6:
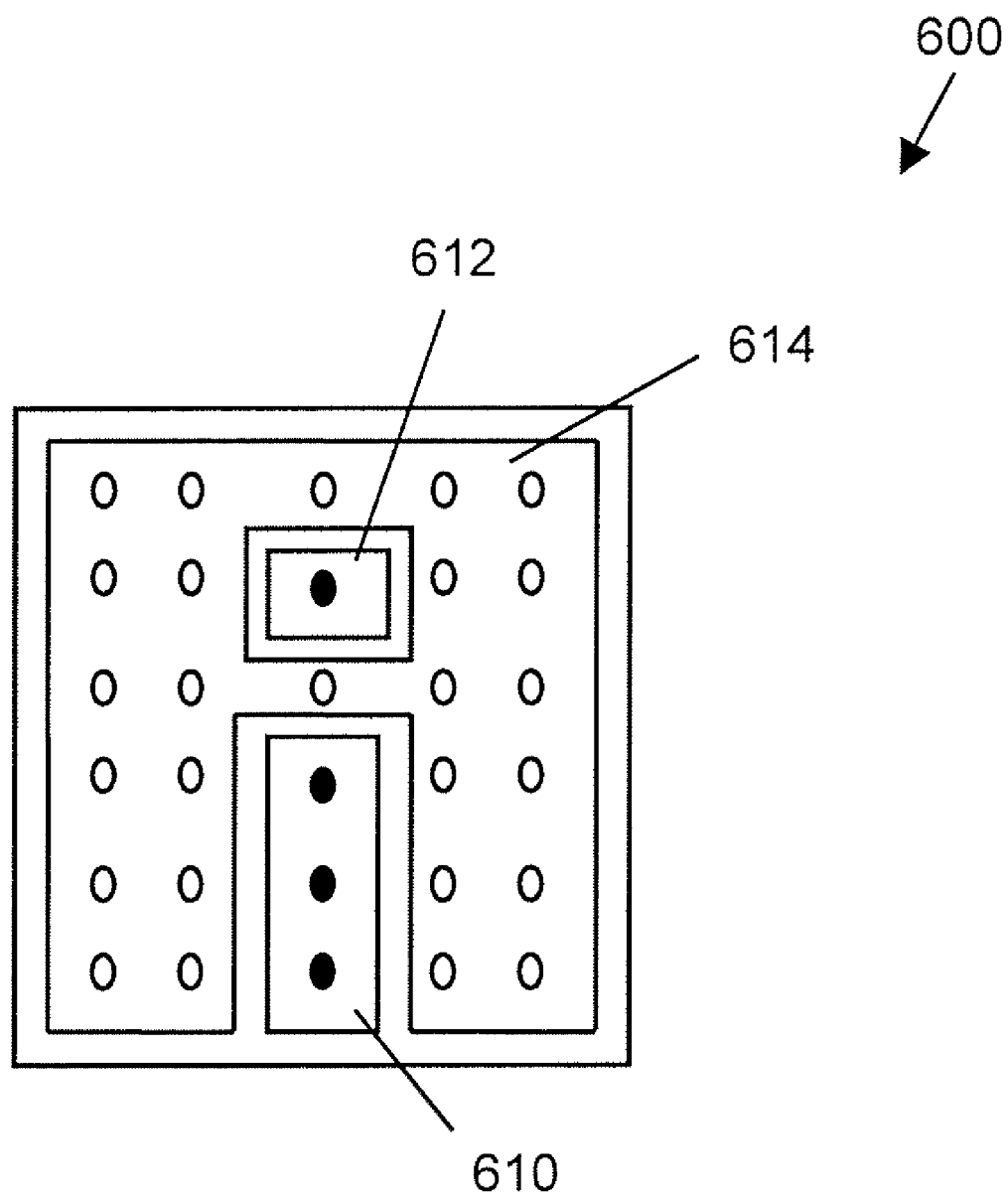
FIG. 6 is a block diagram of an image comprising the character "i" and associated connected components.

The first embodiment of the invention is a process running on a general-purpose computer. FIG. 1 provides high-level overview of the process 100 of segmenting, analysing, and compressing a digital image. The input to the process 100 is preferably an RGB image at a resolution of 300 dpi. However, images in other colour spaces may be input with appropriate modifications to the process 100. Likewise, images at different resolutions may be input. In step 110, colour segmentation of the image into Connected Components (CCs) is performed using a single pass over the input image. Using one-pass processing, digital images can be processed rapidly, so that a high volume of high resolution images can be processed. Connected components are groups of similarly coloured pixels that are all connected (touching). For example, the pixels forming the body or stem of the letter "i" printed in black ink on a white page form a connected component, the dot on the "i" forms another CC, and any white pixels surrounding the letter "i" as background form yet another CC. FIG. 6 depicts an image 600 comprising the character "i", where black dots represent black pixels and white dots represent white pixels. The stem of the "i" CC 610 and the dot of the "i" CC 612 are depicted. Also shown is another resulting CC 614 of blank pixels.

As part of the segmentation, compact information and statistics describing the CCs are calculated. The digital is downsampled and provided directly to step 130. In step 120, a layout analysis is performed on the CCs using this compact CC information and statistics. The layout analysis determines the layout of the features on the page, which includes for example text characters, paragraphs, tables, and images. In step 130, this layout information is used to create one or more foreground images. A foreground image is typically made up of text characters identified in step 120, and is preferably a binary image. The foreground images may be stored at the input resolution (e.g. 300 dpi), while a background image may be stored at a lower resolution (e.g., 150 dpi). The foreground elements are removed from the background image. Both the foreground and background are then compressed using different techniques and stored in a compound image format. The compound format may be a PDF document, for example. Colour segmentation, layout analysis, and compressing a digital image are each described hereinafter in separate sections.

One application for the embodiments of the invention is to analyse raster pixel images from a scanner and extract as much high-level information as possible. From this information, a high-level description of the page can be produced. To this end, a system may be designed to run faster by doing pixel analysis in hardware. However, it will be apparent from the following description that the system may be implemented entirely in software, as well. Also, while a particular output format PDF is described hereinafter, variations may be made to the system to utilise other page description formats as the output format.

Figure 8:
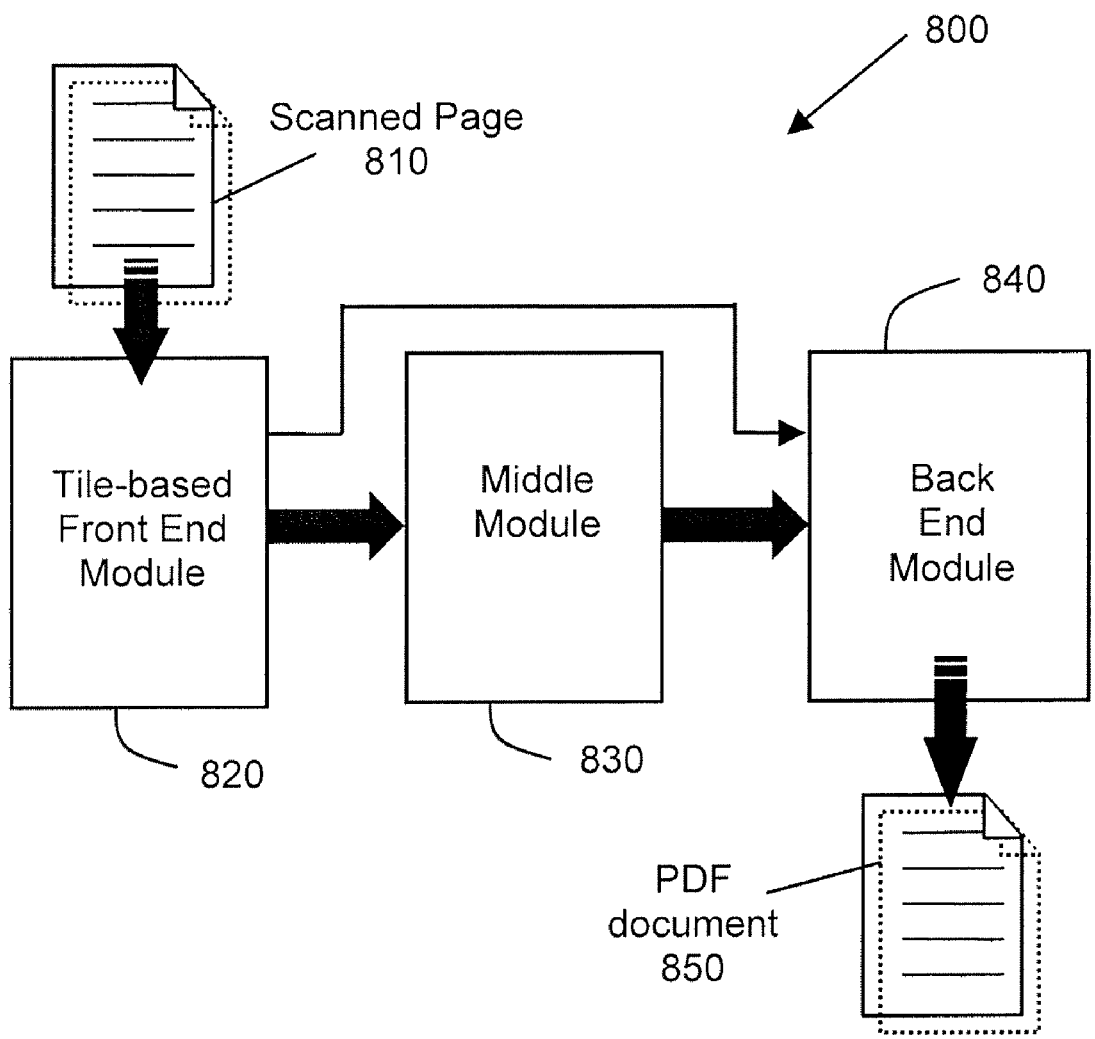
FIG. 8 is a block diagram of a system for producing a compressed output for a scanned input page in accordance with an embodiment of the invention.

FIG. 8 is a high-level block diagram of a system 800 in accordance with an embodiment of the invention for producing a compressed or compact representation 850 of a scanned input document 810. The system 800 comprises a front end module 820, a middle module 830, and a back end module 830. The front end module 820 is a tile-based front end that is preferably implemented in hardware, but may be a combination of an ASIC and software executed by an embedded processor. Tile raster order is a tile-based processing method in which tiles are made available for processing from top-to-bottom and left-to-right one at a time. This module performs colour segmentation on the input image and provides the background image of a tile to the back end module 840 (indicated by an arrow). The front end module 820 performs a colour connected-component analysis at the full page resolution (eg. 300 dpi). The front end module 820 produces connected components (CCs) also from the digital image 810, and the CCs are provided to the middle module, which performs layout analysis. This module may be implemented entirely in software. The front-end module 820 provides a downsampled image to module 840. The output of the middle module 830 is provided to the back end module 840, which performs tile-based inpainting and produces the compact representation of the digital image 810. Like the front end module 820, the back end module 840 may be implemented at least partially in hardware with software executed on an embedded processor and an ASIC. This compacted output may comprise a digital image at a lower spatial resolution and a foreground bitmap at a higher resolution.

The front end module 820 performs all the analysis work that involves examining each pixel and forms colour CCs of regions of semantically related pixels. The output from the front end module 820 is information about all the colour CCs on the page. The information for each CC includes the bounding box, average colour, touching list, and the number of pixels. When implementing algorithms in hardware, for best performance, the algorithm should be bandwidth efficient. For image processing tasks, the algorithm does not have random access to an entire scanned page. Instead, the algorithm works on small tiles at a time.

2. Colour Segmentation

Figure 2:
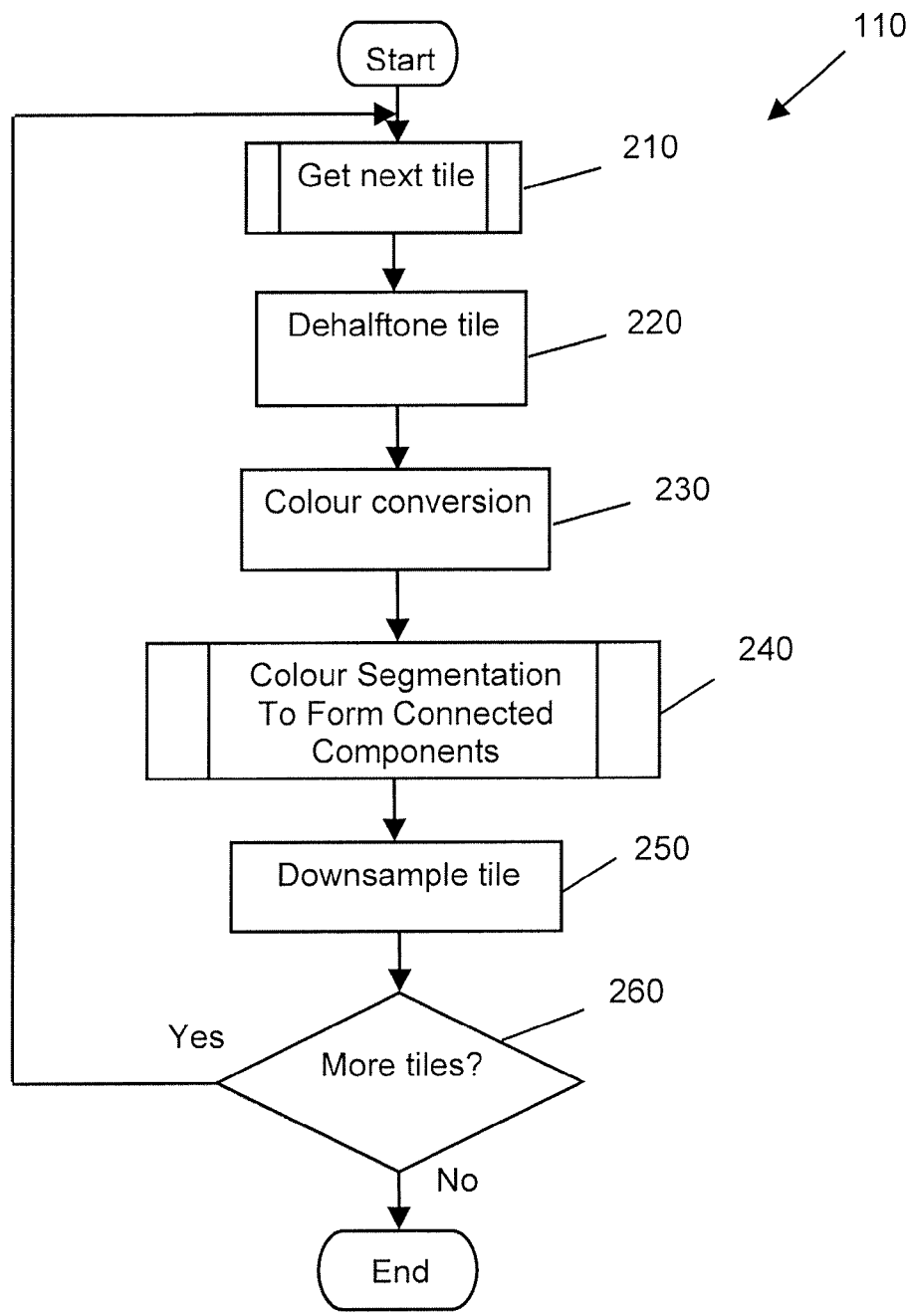
FIG. 2 is a flow diagram of the colour segmentation step of FIG. 1.

FIG. 2 illustrates step 110 of FIG. 1 in greater detail. The process shown in FIG. 2 work on tiles of the input image, which for example may be of size 32×32 pixels. The tiles may be processed in raster order—that is, from left to right, and top to bottom. The first tile to be processed is the top-left tile of the input image, and the last tile to be processed is the bottom-right tile of the input image. This tiling is done for efficiency purposes.

In step 210, the next tile of the input image to be processed is obtained. Pointer information may be used to efficiently access each tile. Step 210 is described in more detail with reference to FIG. 3. The processing in steps 220, 230, 240 and 250 is confined to the pixels of the current tile. In step 220, dehalftoning is optionally performed on the current tile. For example, scanned input documents processed by this method may contain halftones from a printing process. Halftones may make the subsequent analysis difficult and may not compress well. Therefore, this step 220 may be used to detect and remove halftones. By way of example only, the following dehalftoning process may be practiced. The dehalftoning process may work on 16×16 tiles. Each input tile of 32×32 RGB pixels may be divided into four 16×16 tiles, and each is processed separately. Halftone detection may work on one colour channel (ie, R, G and B) at a time. If halftones are detected in any channel, the halftone removal may be performed on all channels. For detecting halftones, each pixel in the tile is quantised to four levels. The input colour channel value ranges from 0-255. The four levels are the ranges 0-63, 64-127, 128-191 and 192-255. The number of level changes between pixels that are next to each other can then be measured. This measurement may be done horizontally and vertically.

Because halftones are typically small dots, the detection requires that the number of changes be large and the number of horizontal changes to be similar to the number of vertical changes. This prevents changes in level caused by edges of text characters being detected as halftones. A threshold value for detection may be specified. If halftones are detected in a 16×16 tile, a spatial blur for example may be used to remove the halftones. The halftone detector can also use information from previously analysed tiles. For example, if the tiles touching the current one have halftones detected in the tiles, the current tile likely also contains halftones. When this information is used, the threshold value may be adjusted to relax or tighten the halftone detection requirements.

In step 230, if the colour space of the current tile is not already in the YUV colour space, then a conversion is performed to convert the pixels of the tile to YUV colour space. Therefore, this step is optional dependent upon the colour space of the input image. While the YUV colour space is used in this embodiment, other colour spaces could be practiced without departing from the scope and spirit of the invention. The conversion formula used to convert from RGB to YUV may be the same as that used in the Independent JPEG Group (IJG) JPEG library, for example.

Figure 10:
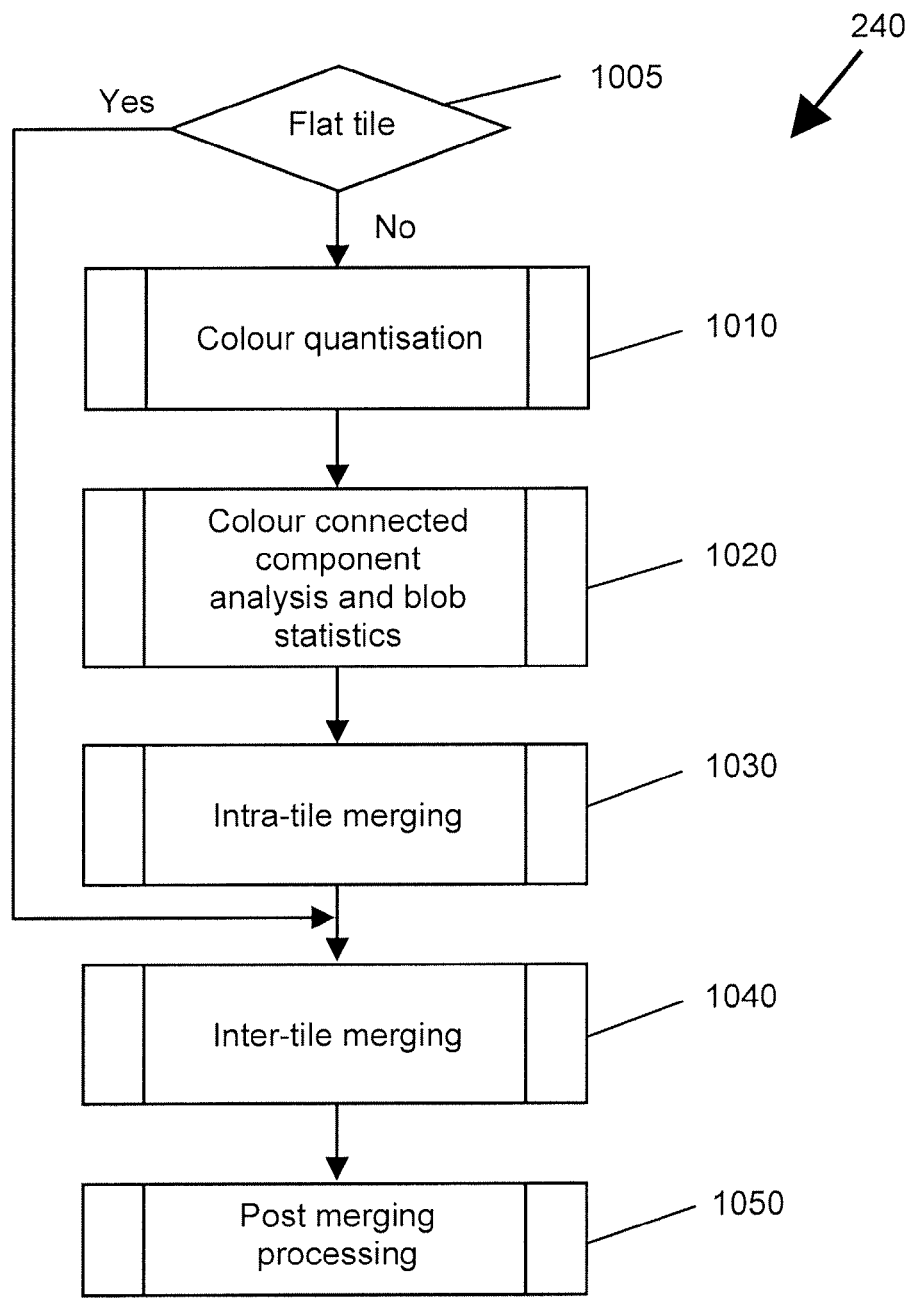
FIG. 10 is a flow diagram of the colour segmentation step of FIG. 2.

In step 240, a colour segmentation to form Connected Components is performed on the current tile, and compact information and statistics about the CCs in the tile are calculated. A colour CC comprises one or more semantically related blobs, spanning across one or more tiles. For example, semantically related blobs may be similarly coloured. A blob is a connected group of pixels, within a single tile, having similar colour characteristics. Blobbing is a process of colour segmentation and forming connected component representations. Each CC has the following statistics: size in pixels, mean colour, binary mask, blob boundary length, and bounding box. FIG. 10 illustrates this step in greater detail.

In step 250, the current tile is downsampled to form a corresponding part of a background image. For example, a box filter may be used to downsample by 2:1 in both dimensions, but other methodologies may be practiced without departing from the scope and spirit of the invention. In decision step 260, a check is made to determine if there are any more tiles remaining to be processed. If the result of step 260 is No (that is all the tiles in the image have been processed), processing terminates. However, if the result of step 260 is Yes, processing continues at step 210.

2.1 Obtain Next Tile of Input Image

Figure 3:
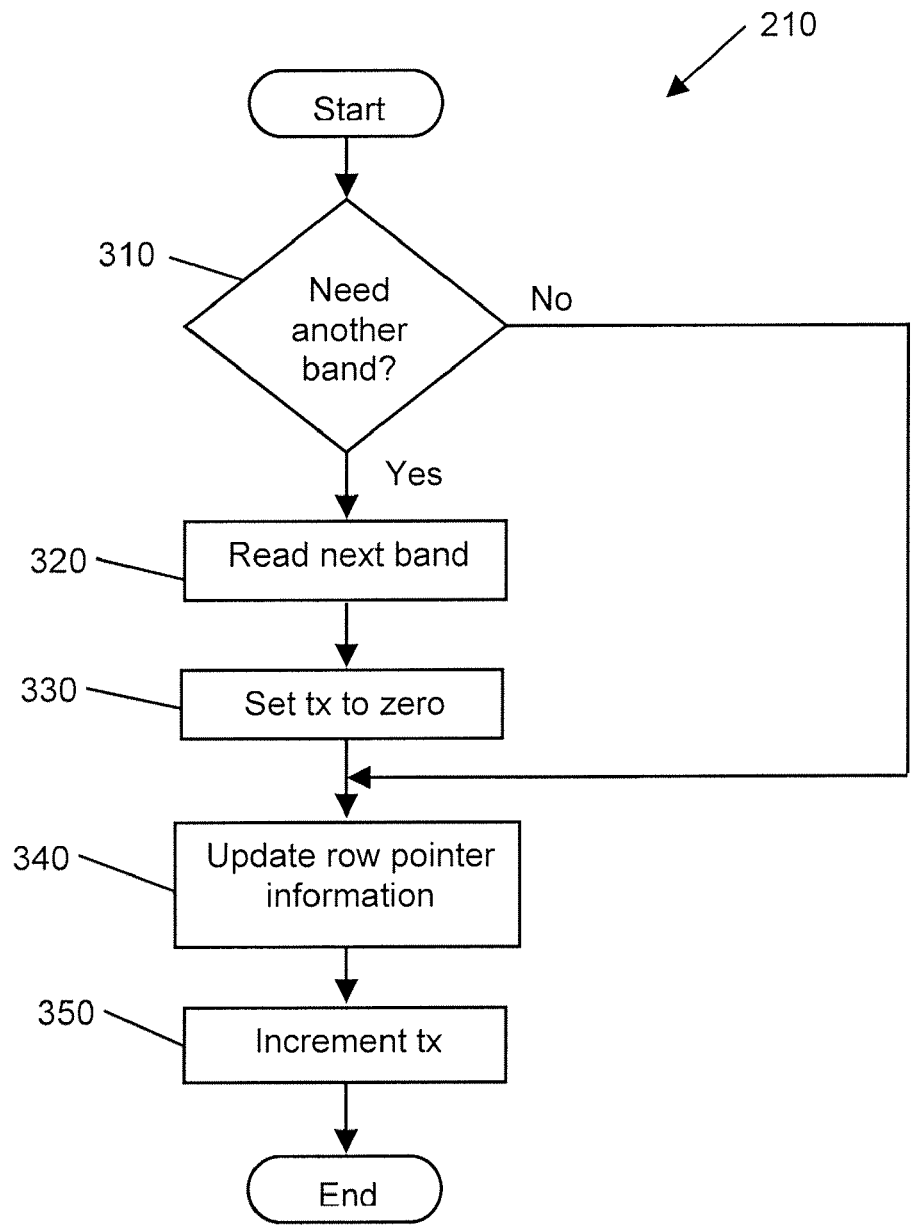
FIG. 3 is a detailed flow diagram of the step of obtaining a next pixel of FIG. 2.

FIG. 3 illustrates in detail step 210 of FIG. 2. The process 210 works on bands of the input digital image. A band of the image is a number of consecutive image lines. The height of each band may be the same as the height of a tile. Thus, for example, the first 32 lines of the image form a band, and in this case the first band of the image; the next 32 image lines form a next band, and so on. The width of each band may be the width of the input image. In decision step 310, a check is made to determine if another band needs to be read in. Another band needs to be read in when all the tiles of the current band have been processed. The other time another band needs to be read in is the first time that step 310 is performed, because at that point no bands have been read. If the result of step 310 is Yes, processing continues at step 320. Otherwise, processing continues at step 340.

In step 320, the next band of data is read from the input image, for example, from disk into an in-memory buffer. The memory buffer may be arranged to contain each line of pixels of the band in contiguous memory locations. Further, a record of the memory location of the start of each line is kept: that is, a pointer to each band row. In step 330, a variable tx that determines the tile to be accessed, the current tile, is initialised (i.e. set to 0). In step 340, row pointer information is updated to point at the current tile. Other processes that call the process 210 of FIG. 3 obtain a new tile by referencing the row pointer information updated in step 340. The row pointer information may comprise a pointer per tile row. Thus, there may be 32 row pointers per tile. A given row pointer points to the memory location of the first pixel of the tile in the given row. The row pointer information may be updated by stepping each row pointer along (tile width*tx) memory locations beyond the pointer to the start of each corresponding band line. In step 350, the variable tx is incremented by 1, so that the next time the process 210 of FIG. 3 is called another tile is input to the process.

2.2 Form Colour Segmentation of Tile

Colour blobbing is an image segmentation algorithm that works in tile raster order. A blob is a connected group of pixels of the same quantised labels within a single tile. Each blob has the following statistics: size in pixels, mean colour, binary mask, blob boundary length, and bounding box. Its goal is to segment a document image into a set of non-overlapping connected components, where each connected component contains a connected set of semantically related pixels, e.g. the set of pixels in a particular text letter forms one connected component, the pixels in a section of image around the text would form another connected component, etc.

FIG. 28 is a block diagram of a colour blobbing system 2800 that has four modules 2810, 2820, 2830, and 2840. The colour quantisation module 2810 receives an input colour tile (e.g., 24-bit pixel values for the RGB colour space), determines the number of dominant colours in the tile, and quantises the tile according to the dominant colours. The dominant colours and quantised tile are provided as input to a connected component and blob statistics module 2820 that performs an 8-way connected component analysis on the quantised tile in a single raster pass. Blob statistics such as the number of pixels, mean colour, blob boundary length and bounding box information are collected in the same raster pass. The blobs and statistics are provided as input to an intra-tile merging module 2830, which reduces the number of spurious and small blobs within a tile by merging blobs based on colour, size, and boundary statistics. The resulting blobs and statistics from this module 2830 are provided as input to an inter-tile merging module 2840 that groups blobs in the current tile with touching blobs in the adjacent tiles (left and above) according to blob statistics to form connected components as the output of the system 2800. This is described further with reference to the processing of FIG. 10.

FIG. 10 is a detailed flow diagram of step 240 for segmenting an image into colour CCs. As part of the segmentation process, compact information and statistics describing the CCs are calculated. The segmentation process begins by receiving an input tile of pixels from step 230. In decision block 1005, a check is made to determine if the tile is flat. If the tile is flat, processing continues at step 1040 to the inter-tile merging stage. Otherwise, processing continues at step 1010. In step 1010, colour quantisation is performed on the tile. Colour quantisation finds the dominant colours within a tile without considering pixel geometry, using three principal steps: 1) colour reduction, 2) tile classification, and 3) finding dominant colours and quantisation. The dominant colours in the input tile are determined by a colour histogram method. A quantised tile of colour labels is created by quantising the input tile pixels according to the dominant colours. A dominant colour is one that a human viewer would perceive as significant visually within the tile. The algorithm suits a hardware (HW) implementation and is also reasonably fast with a software (SW) implementation.

Step 1020 performs an 8-way connected component analysis on the quantised tile in a single raster pass to form blobs. In step 1030, an intra-tile merging process is performed to reduce the number of spurious and small blobs within the tile by merging blobs based on colour, size and boundary information. In step 1040, an inter-tile merging is performed. Blobs identified in the quantised tile are compared with blobs identified in two previously processed tiles that are to the left of the current tile and above the current tile for merging into colour CCs. Thus, a colour CC comprises one or more similarly coloured blobs spanning across one or more tiles. As such, colour CCs have the same types of statistics as mentioned above for the blobs except for boundary information.

In step 1050, blobs in the current tile and the colour CCs that the blobs form are stored in a compact tile-state data structure. This tile state does not contain pixel data. The tile state only contains information required for merging newly created blobs to existing colour CCs. The inter-tile merging process 1040 can be performed with high memory efficiency because at any stage of the segmentation process only two or less tile states are required for merging with the current tile. Furthermore, step 1050 updates a touching list for each colour CC. A touching list describes which connected components are next to each other. The touching list is generated as part of the colour CC analysis in the front end. Step 240 in FIG. 2 generates the touching list. Processing then terminates.

2.2.1 Colour Quantisation

The purpose of colour quantisation is to reduce the full colour input to a reduced set of colours for the preparation of connected component generation. To find dominant colours, each input pixel is examined once and a histogram is generated. The embodiments of the invention employ histograms that use luminance as the first dimension and combine the two chrominance components as the second dimension. This is unlike a conventional colour histogram that divides the bins in three dimensions according to the axes of three colour components. The embodiments of the invention produce a compact histogram that helps finding good dominant colours easier. From the characteristics of the histogram, a tile is classified into three types—flat, bi-level and multi-coloured. A palette is generated for the tile depending on the tile classification. After the palette is generated, each pixel is assigned with a quantised label according to the palette colour that the pixel maps to. The method is designed for high-speed processing and low-memory requirements. A flat tile has only one quantised label. A bi-level tile has two quantised labels. A multi-coloured tile has up to four quantised labels.

Figure 11:
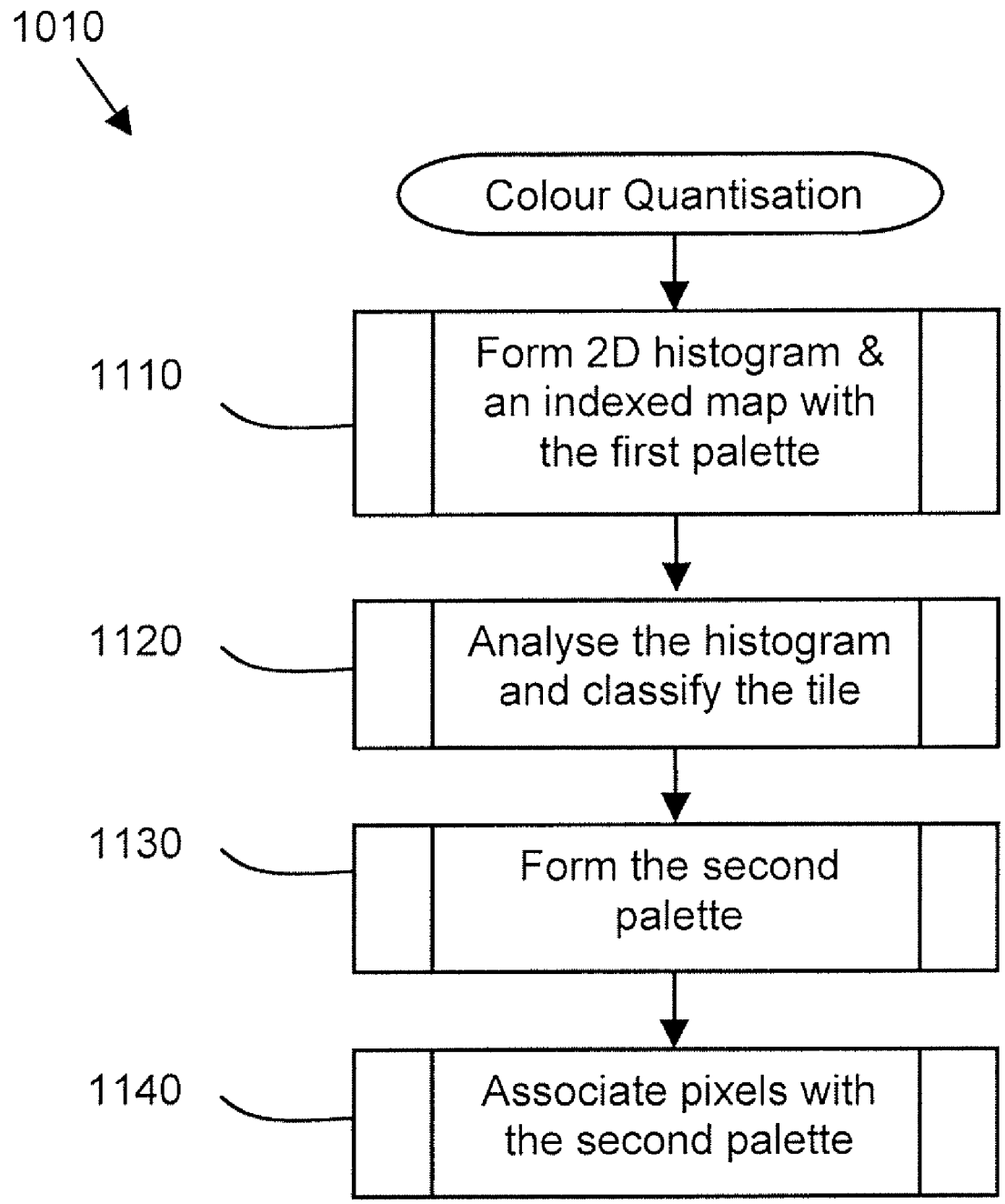
FIG. 11 is a detailed flow diagram of the colour quantisation step of FIG. 10.
Figure 40A:
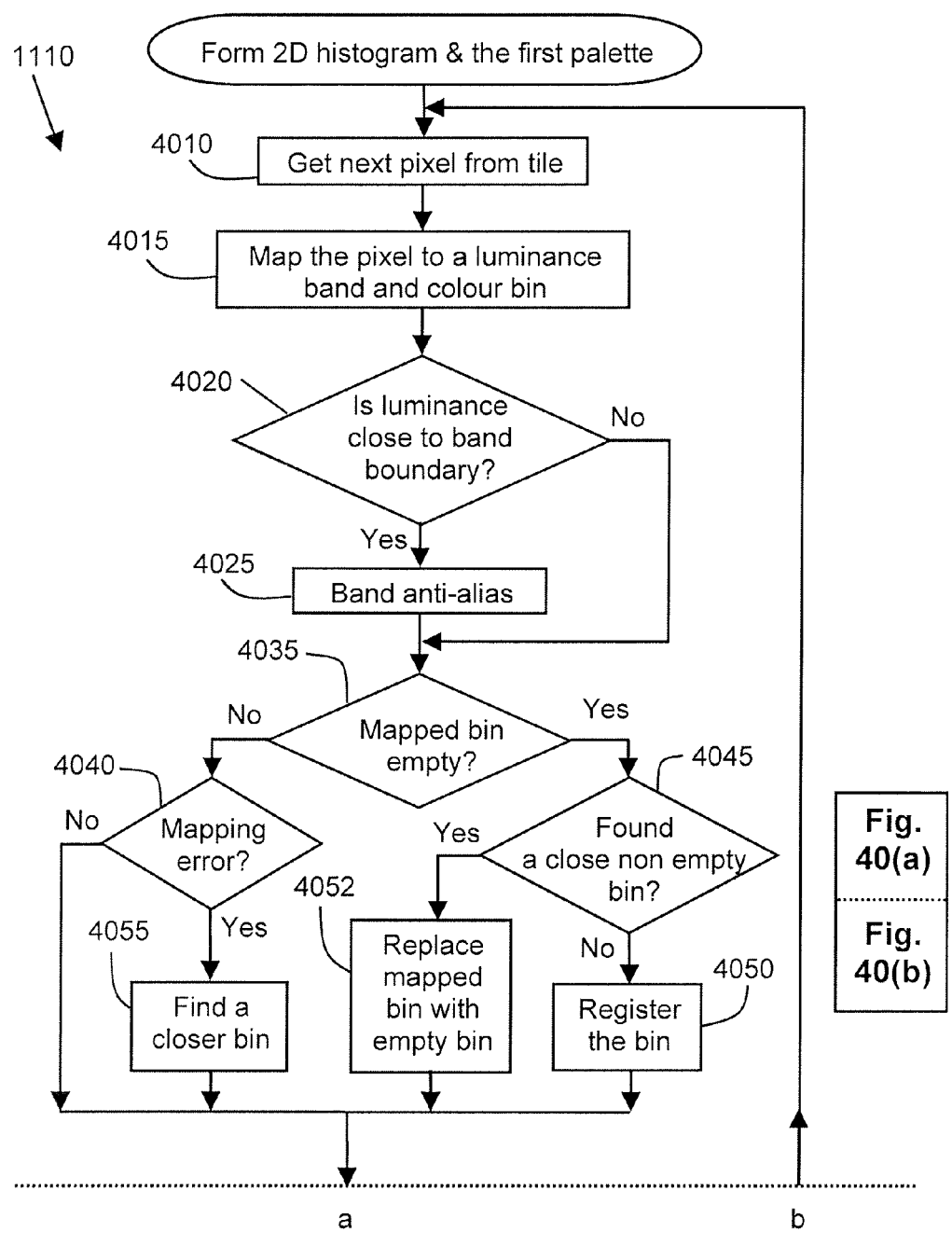
FIG. 40 is a flow diagram illustrating the step of forming a 2D histogram and a first palette of FIG. 11.
Figure 40B:
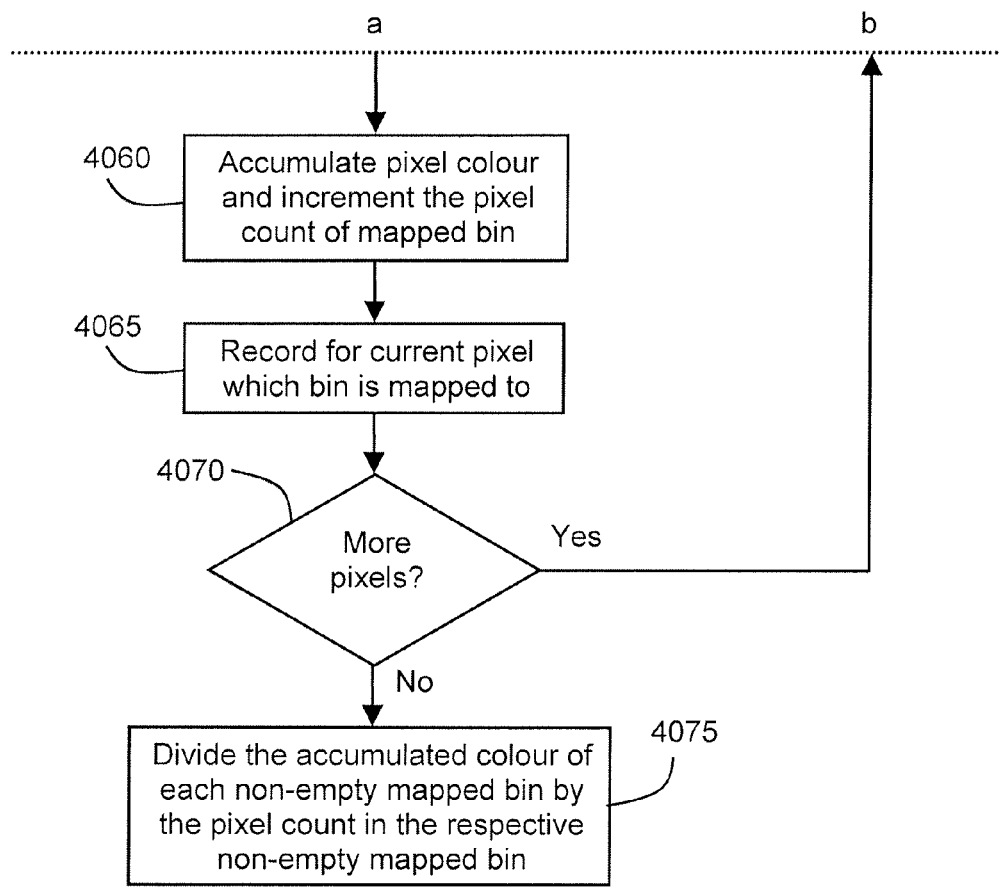
Figure 41:
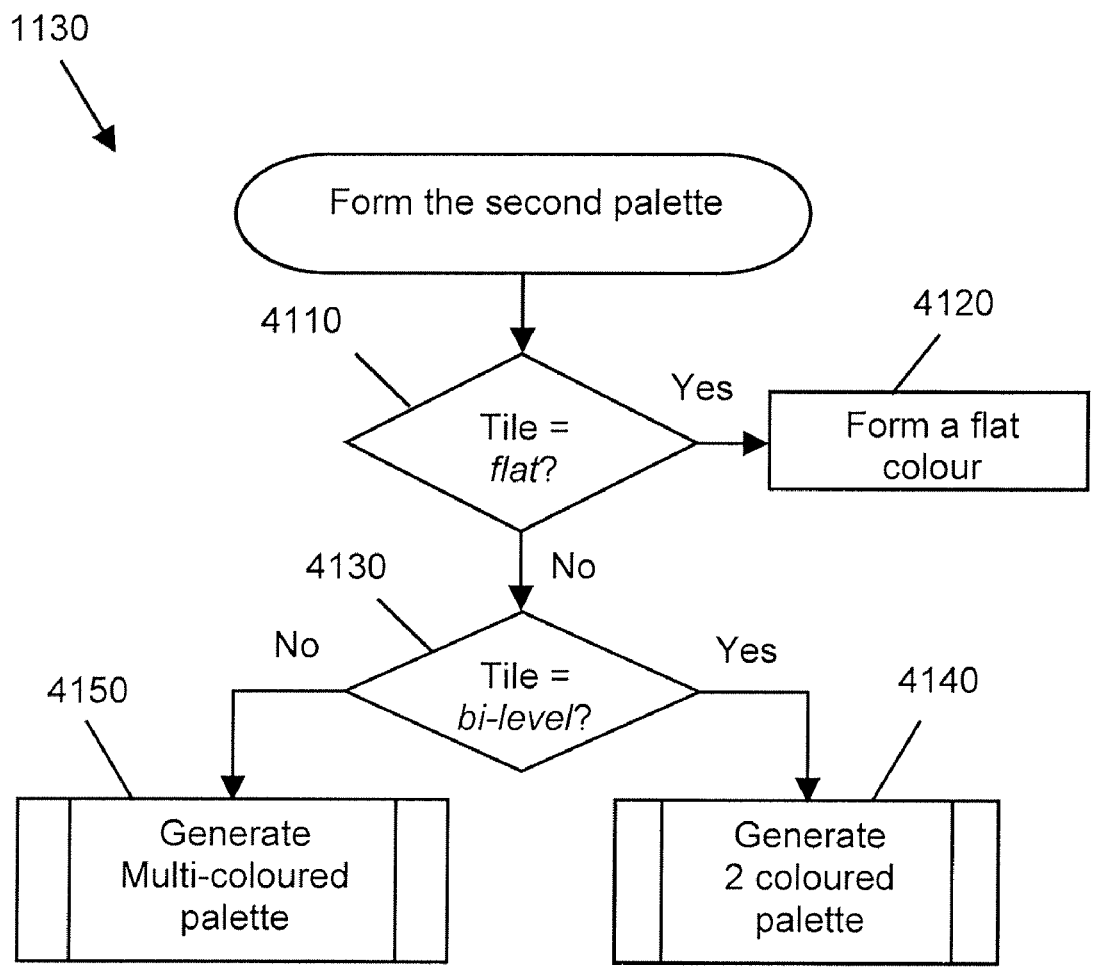
FIG. 41 is a flow diagram illustrating the step of forming a second palette of FIG. 11.
Figure 47:
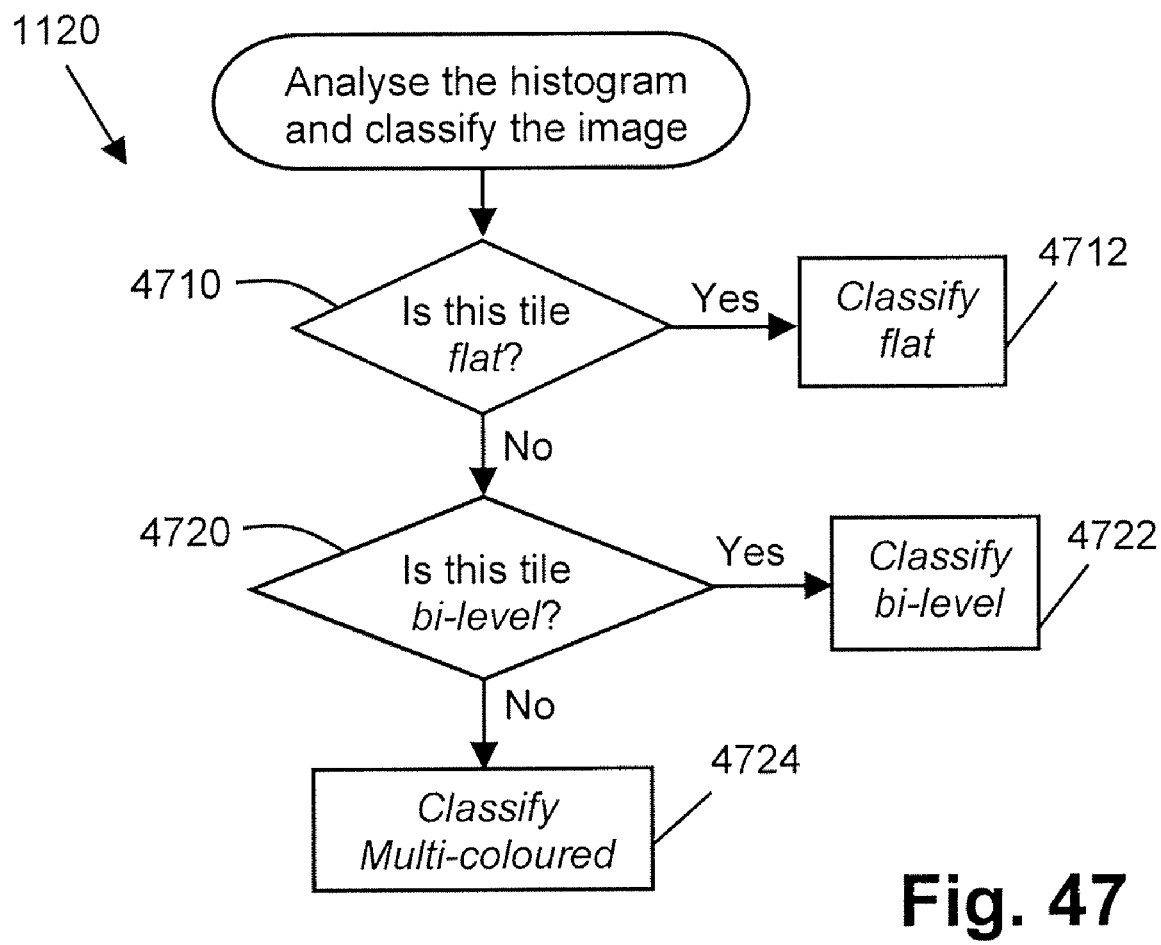
FIG. 47 is a flow diagram of the step of analysing a histogram and classifying a tile of FIG. 11.

The colour quantisation step 1010 of FIG. 10 is further expanded upon in FIG. 11. A brief description of each step in FIG. 11 is given here and the detailed description for each step follows. In step 1110, a 2D histogram and an indexed map with the first palette are formed at the same time. FIG. 40 provides further details of step 1110. In step 1120, a tile classification is carried out from the statistics of the 2D histogram. FIG. 47 provides further details of step 1120. In step 1130, the second palette is formed based on the tile classification. This involves condensing the first palette. FIG. 41 provides further details of step 1130. In step 1140, pixels are associated with the second palette. The indexed map is remapped to one of the second palette colours to generate a quantised tile with quantised labels. Processing then terminates.

2.2.1.1 Form 2D Histogram and First Palette

FIG. 40 illustrates the processing of step 1110 of FIG. 11 in greater detail. The input full coloured tile is quantised to an indexed map in pixel raster order in one pass by a predetermined mapping method. FIG. 29(*a*) shows an example of an input original tile and the resulting indexed map that is produced. The mapping may be configured for 32 colour bins organised in 8 luminance bands and 4 colour columns. Each colour bin may have a colour accumulator, a pixel counter and a registration ID which is set by the YUV value of the first pixel put into the bin. The predetermined mapping method may be changed depending on the stats of the 2D histogram. As a result, there is no predetermined colour for each bin and the order of pixel colour may affect the composition of the first palette. The average colour of each non-empty bin at the end makes up the first palette. FIG. 29(*c*) shows a palette that is produced, where the upper and lower grey portions represent empty bins.

In step 4010, a pixel with colour value (YUV) is obtained from the tile. The predetermined mapping is performed in step 4015 to map the pixel to a luminance band and colour bin (i.e. bin_mapped). The predetermined mapping may be as follows:

band=Y>>5, and column=(|*U*−REF_*U*|+|*V*−REF_*V*|)*NORMALIS-ING_FACTOR[band].

The chrominance value of grey may be used for REF_U and REF_V: (that is, REF_U=128 and REF_V=128 for 8 bit RBG input data). The NORMALISING_FACTOR for each band is pre-calculated using the chosen REF_U and REF_V for normalising each band into 4 bins from the RGB colour space. The NORMALISING_FACTOR can be generated using the pseudocode of Table 1.

TABLE 1

Set max_dist [0:7] to 0
for each r in 0 to 255
{
  for each g in 0 to 255
  {
    for each b in 0 to 255
    {
      c = RGB2YUV(r, g, b);
      band = c.y >> 5;
      dist = |c.u − 128| + |c.v − 128|;
      if (dist > max_dist [band])
        max_dist [band] = dist;
    }

TABLE 1-continued

}
}
for each band in 0 to 7
  NORMALISING_FACTOR [band] = 1 / max_dist [band] * 4

Steps 4020 to 4025 perform an optional "band anti-alias" for bi-level tile outline enhancement. In step 4020, if "band anti-alias" is enabled and the difference in luminance between a mapped band and the band above or below does not exceed a specified threshold (e.g. 16), a "band anti-alias" is performed in step 4025. Otherwise, processing continues at step 4035.

In step 4025, a band anti-alias is performed. An attempt to find a close non-empty bin in the band above or below is carried out. The candidate bin is the one mapped by band−1 or band+1. In either of the two conditions below, the candidate bin replaces the mapped bin (bin_mapped):

1. The candidate bin is not empty and its registration ID(Y) is less than 16 away from Y and bin_mapped is empty.
2. Both the candidate bin and bin_mapped are not empty and Y is closer to the candidate bin's registration ID(Y) than the registration ID(Y) of bin_mapped.

Steps 4035 to 4055 carry out a "bin anti-alias" process. Step 4035 checks if the mapped bin (bin_mapped) is empty. If the mapped bin is not empty, step 4040 checks the mapping error as follows:

max(|*U*−registration ID(*U*)|,|*V*−registration ID(*V*)|) <MAX_BIN_ERROR[band], where MAX_BIN_ERROR[band] is one eighth of the max_dist in each band as defined in the above pseudo code for generating the normalising factor.

If step 4035 returns false (No), processing continues at step 4040. Otherwise, processing continues at step 4045. In decision step 4040, a check is made to determine if there is a mapping error exceeding a specified threshold which is maximum bin error for this band.

If the mapping error is within the threshold, the processing continues at step 4060. Otherwise, step 4055 is carried out to find a closer bin. In step 4055, a search starts from column 0 and moves forward to column 3 in the mapped band. The search terminates when any of the following conditions is met:

1. An empty bin is found, and
2. A bin with a mapping error within the allowed threshold is found.

If the search of step 4055 terminates on condition 1, the (YUV) value is registered into the empty bin, and the empty bin replaces bin_mapped. If both conditions fail, a bin with the smallest mapping error replaces bin_mapped. Processing then continues at step 4060.

Following the test in step 4035, if the mapped bin is empty, processing continues at step 4045. In decision step 4045, a check is made to determine a close non empty bin in the same band has been found. Step 4045 searches from column 0 to 3 trying to find a non-empty bin satisfying the mapping error threshold defined previously. If such a bin is found, the empty bin replaces bin_mapped in step 4052 and processing then continues at step 4052. Otherwise, if step 4045 returns false (No), bin_mapped is registered with colour (YUV) value in step 4050 and processing continues at step 4060.

In step 4060, pixel colour (YUV) is accumulated in the mapped bin (bin_mapped) and the pixel count in bin_mapped is incremented. In step 4065, the location of bin_mapped is recorded for the current pixel. In step 4070, a check is made to determine if there are more pixels left in the tile. If the result is YES, processing continues at step 4010. Otherwise, it continues at step 4075 where the accumulated colour in each non-empty bin is divided by its pixel count. The average colour of each non-empty bin forms the first palette. Processing then terminates.

2.2.1.2. Analyse Histogram and Classify Image

Tile classification is a method of finding the dominant colours within a tile. Based on the distribution and the colour variance in a palette, tiles are classified into three groups: flat, bi-level, and multi-coloured. Flat tiles have visually constant colour to human eyes and normally form a cluster in the 2D histogram. The flat palette has up to three colours and the colour variance is small. Bi-level tiles have two distinctive colours and normally line up vertically in the 2D histogram. The bi-level palette has colours that span across a few luminance bands, but the colour variance in each luminance band is small. Multi-coloured tiles usually spread over a large number of bins in the 2D histogram. The multi-coloured palette comprises tiles that fail the first two tests.

Step 1120 of FIG. 11 analyses the bin distribution and colour characteristics in the 2D histogram and classifies the tile accordingly. Tiles are classified into the three groups: flat, bi-level and multi-coloured. FIG. 47 illustrates the processing of step 1120 in greater detail. In step 4710, a flat tile test is carried out. If the result is Yes, the tile is classified as flat in step 4712. Otherwise, a second test in step 4720 is carried out to determine if the tile is bi-level. If the result for the bi-level test is Yes, the tile is classified as bi-level in step 4722. Otherwise, the tile is classified as multi-coloured in step 4724. Steps 4710 and 4720 are described in greater detail hereinafter.

Regarding step 4710, first LumRange is defined as the range between the highest and the lowest luminance bands at which bins are not all empty. For a tile to pass flat test, the tile has to satisfy all three conditions below:
1. Number of non empty bins<=3,
2. LumRange<=2, and
3. FlatColourVariance<FLAT_COLOUR_VARIANCE, where FlatColourVariance is defined as the sum of the pixel count weighted Manhattan distances between the largest bin and the rest. The threshold parameter may be FLAT_COLOUR_VARIANCE=15.

Regarding step 4720 for a tile to pass bi-level test, the tile has to satisfy all three conditions below:
1. Number of non empty bins<=BILEVEL_MAX_BIN_CNT,
2. LumRange>2, and
3. MaxColourVariance<BILEVEL_COLOUR_VARIANCE MaxColourVariance is defined as max(ColourVariance[band]), where ColourVariance[band] is the sum of the pixel count weighted Manhattan distances between the largest bin and the rest in a band. The parameter values may be BILEVEL_MAX_BIN_CNT=16 and BILEVEL_COLOUR_VARIANCE=40.

2.2.1.3. Form Second Palette

FIG. 41 illustrates the processing of step 1130 of FIG. 11 in greater detail. Step 4110 tests if a tile is classified as flat. If the tile is, step 4120 forms a flat colour. This may be done by calculating the weighted average of the non-empty bins. If the test result in step 4110 is No, processing continues at step 4130 to test if the tile is classified as bi-level. If the test result is Yes, processing moves to step 4140. In step 4140, a two-coloured palette is generated. Otherwise, if step 4130 returns false, processing continues at step 4150. In step 4150, a multi-coloured palette is generated.

2.2.1.3.1. Generate 2-Coloured Palette

Figure 42:
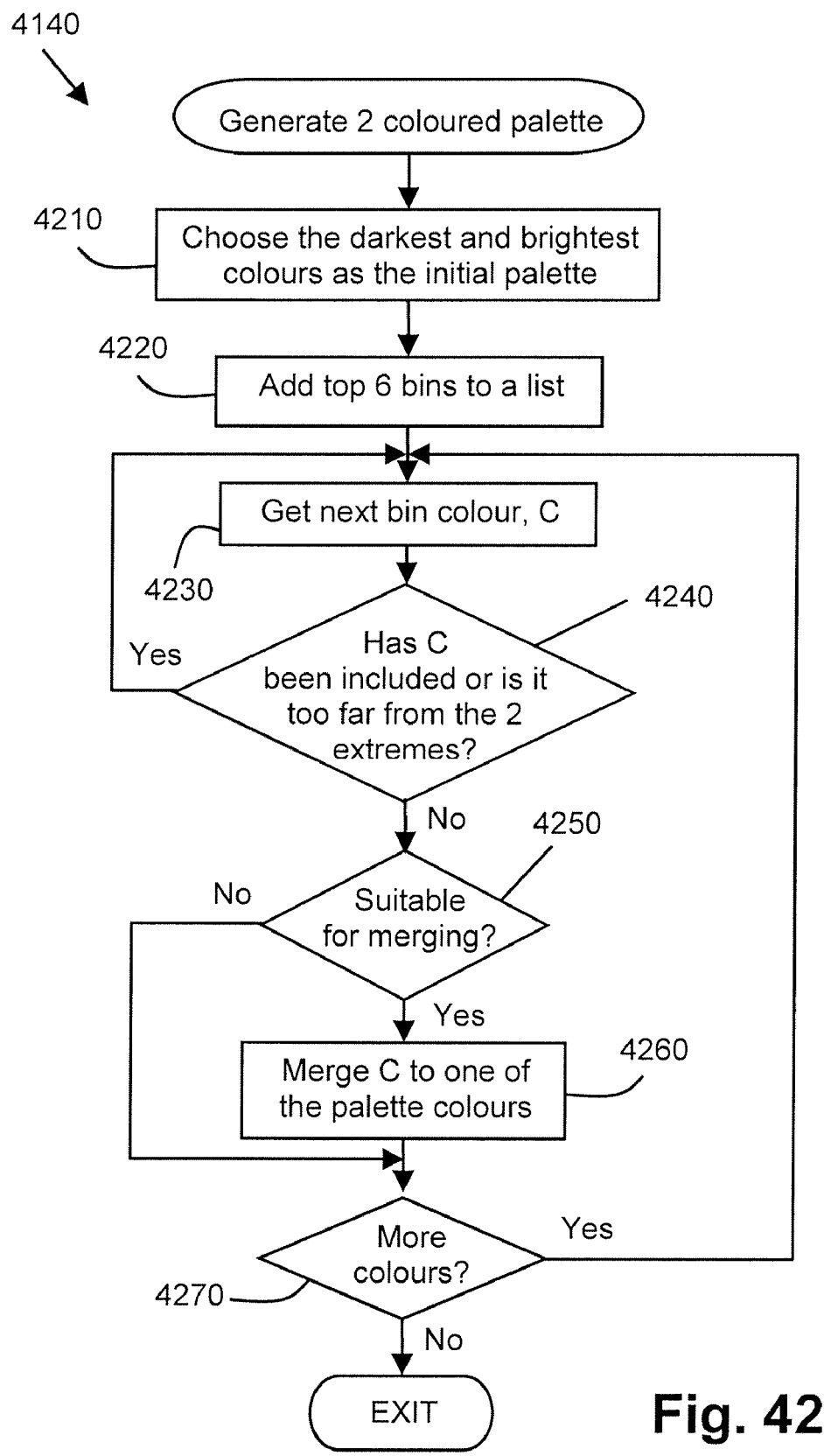
FIG. 42 is a flow diagram illustrating the step of generating a two-coloured palette of FIG. 41.

FIG. 42 provides further details of generating a 2-coloured palette for a bi-level tile in step 4140. The aim is to find two contrasting colours to represent the image. Due to halftoning and registration errors in printing, the colours representing the original two contrast colours are normally polluted. As a result, the average colours of the foreground and background areas are not a good representation for the original image. Excluding the colours in the transition area makes the image look sharper.

In step 4210, the darkest and the brightest colours are chosen to form the initial palette for dominant colours. In step 4220, the six most populated bins are used to generate to a list of bins. The top six bins are found from the palette according to pixel count. Step 4230 to step 4270 process the colours in the list sequentially. In step 4230, the next bin colour, C, from the list is obtained. Decision step 4240 tests if the colour C has been included in the initial palette or if the colour is too far from the two extremes. If the result is Yes, the colour is ignored and processing returns to step 4230 to get the next bin colour for processing. If the result in step 4240 is No, processing continues at step 4250. Decision step 4250 tests if the colour is suitable for merging to the initial palette. A suitable colour for merging is a colour located close to any colour of the initial palette. If the test result from step 4250 is Yes, the colour is merged to one of the initial palette colours based on the closer Manhattan colour distance with weighted pixel count. The pixel count of C is added to the pixel count of the palette colour to merge to. Processing continues at step 4270. If the result of step 4250 is No, the colour is ignored and the process moves to step 4270 to check if there are any unprocessed colours. If the test in step 4270 returns Yes, processing returns to step 4230. Otherwise, processing terminates.

2.2.1.3.2. Generate Multi-Coloured Palette

Figure 43:
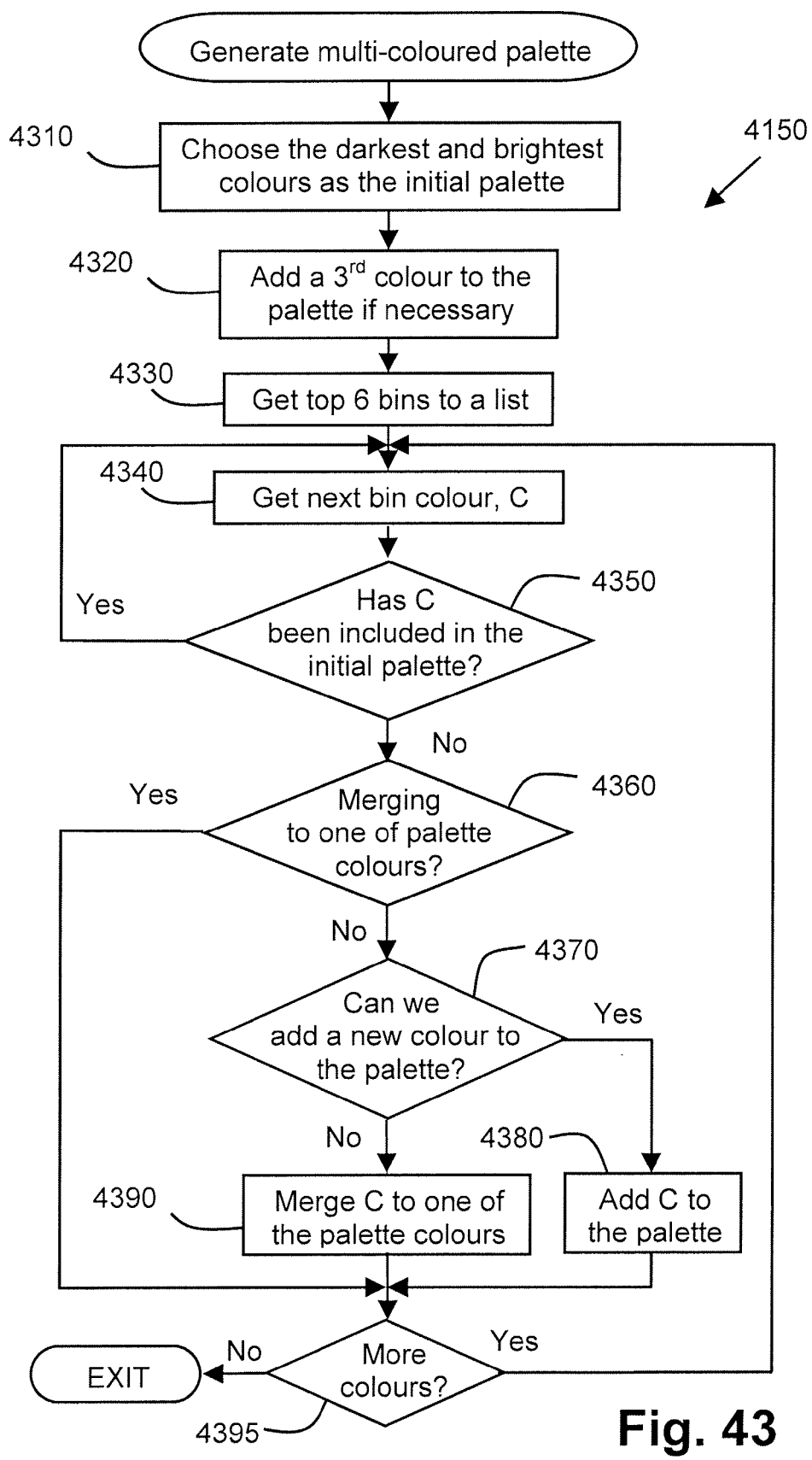
FIG. 43 is a flow diagram illustrating the step of generating a multi-coloured palette of FIG. 41.

FIG. 43 expands on step 4150 of FIG. 41, which generates a multi-coloured palette for a multi-coloured tile. In step 4310, the darkest and the brightest colours are chosen to form the initial palette as the initial dominant colours. In step 4320, a third colour is added to the palette if both conditions below are true:
1. LumRange>THIRD_COLOUR_MIN_LD, and
2. LargestVar>THIRD_COLOUR_MIN_VAR, LargestVar is defined as the largest Manhattan colour distance from the mean colour of the brightest and the darkest colours among the bins between the darkest and the brightest luminance bands. If the above test is true, the colour that generates LargestVar is added as the third initial palette colour. The threshold may be THIRD_COLOUR_MIN_LD=4 and THIRD_COLOUR_MIN_VAR=40.

In step 4330, the top (i.e. most populated) 6 bins are added to a list of bins. Steps 4340 to 4395 process colours of the list sequentially. In step 4340, the next bin colour, C, from the list is obtained. Step 4350 tests if the colour has been included in the initial palette. If the result is Yes, the colour is ignored and processing returns to step 4340. Otherwise, step 4360 tries to merge the colour to one of the palette colours. The colour is merged to the colour in the palette with the closest Manhattan colour distance if the distance is within BIN_MERGE_THRESHOLD1 where the threshold may be BIN_MERGE_THRESHOLD1=10. If the attempt in step 4360 succeeds, processing continues at step 4395 to check if there are more colours to process. Otherwise, processing moves to step 4370.

Step 4370 tests if an extra colour can be added to the palette. If step 4370 returns true (YES), processing continues at step 4380. An extra colour is added in step 4380 if the test in the pseudo code below is true.

```
Number_palette_colours < MAX_NUM_PALETTE_COLOURS
&&
(
    minDist > BIN_MERGE_THRESHOLD2
    ||
    (
        minDist > BIN_MERGE_THRESHOLD3
        &&
        (minDist * pCnt) > BIN_NEW_MIN
        &&
        pixel_count_closest_palette_colour >
        BIN_DONT_TOUCH_CNT
    )
)
``` minDist is the closest Manhattan colour distance of C to the palette colours. pCnt is the pixel count of C. pixel_count_closest_palette_colour is the pixel count of the palette colour which generates minDist. The threshold values may be MAX_NUM_PALETTE_COLOURS=4, BIN_MERGE_THRESHOLD2=70, BIN_MERGE_THRESHOLD3=40, BIN_NEW_MIN=4000 and BIN_DONT_TOUCH_CNT=150

From step 4380, processing continues at step 4395.

If the test in step 4370 is false, processing continues at step 4390. In step 4390, the bin colour C is merged with the palette colour with the closest Manhattan colour distance. Colours are merged with weighted pixel count and the pixel count of C is added to the pixel count of the palette colour to merge to. Processing continues at step 4395. If there are no more colours to process at step 4395, processing terminates.

2.2.1.4 Associate Pixels with Second Palette

Once the dominant colours are found, pixels within a tile are quantised to one of the dominant colours. A quantised map is produced along with the dominant colour list for connected component analysis. The quantisation process for each group is as follows:
1) Flat—no quantisation;
2) Bi-level—remap the palette to one of two dominant colours or find a threshold value to binarise the original pixels; and
3) Multi-coloured—remap the palette to one of the dominant colours.

Binarisation produces sharper outlines, but takes longer since binarisation requires finding a proper threshold value. The steps of finding the threshold are: 1) perform the first derivative on the luminance channel, 2) identify edge pixels, and 3) use the average luminance value from the edge pixels as the threshold. Edge pixels are pixels where their surrounding 3×3 first derivative output is all above a predefined threshold.

Figure 44:
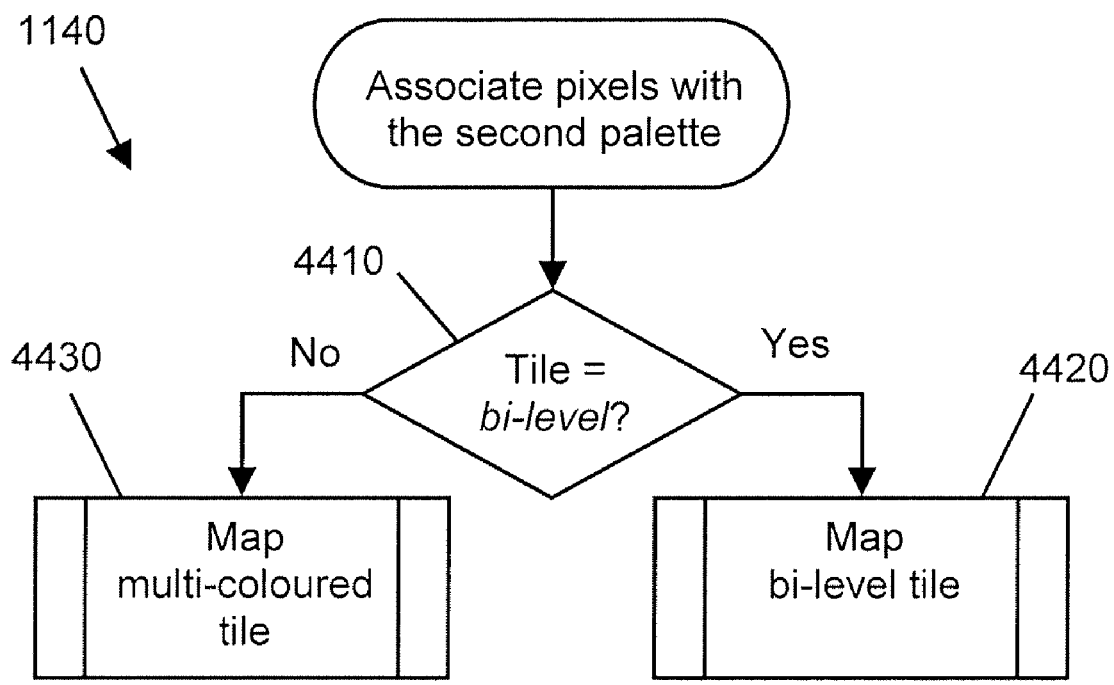
FIG. 44 is a flow diagram illustrating the step of associating pixels with the second palette of FIG. 11.

FIG. 44 provides further details of step 1140 of FIG. 11. Step 4410 tests if the tile is classified as bi-level. If the test result is Yes, processing continues at step 4420. In step 4430, the multicoloured tile is mapped. Otherwise, processing continues at step 4430. The bi-level tile is mapped in step 4420.

2.2.1.4.1 Map Bi-Level Tile

Figure 45A:
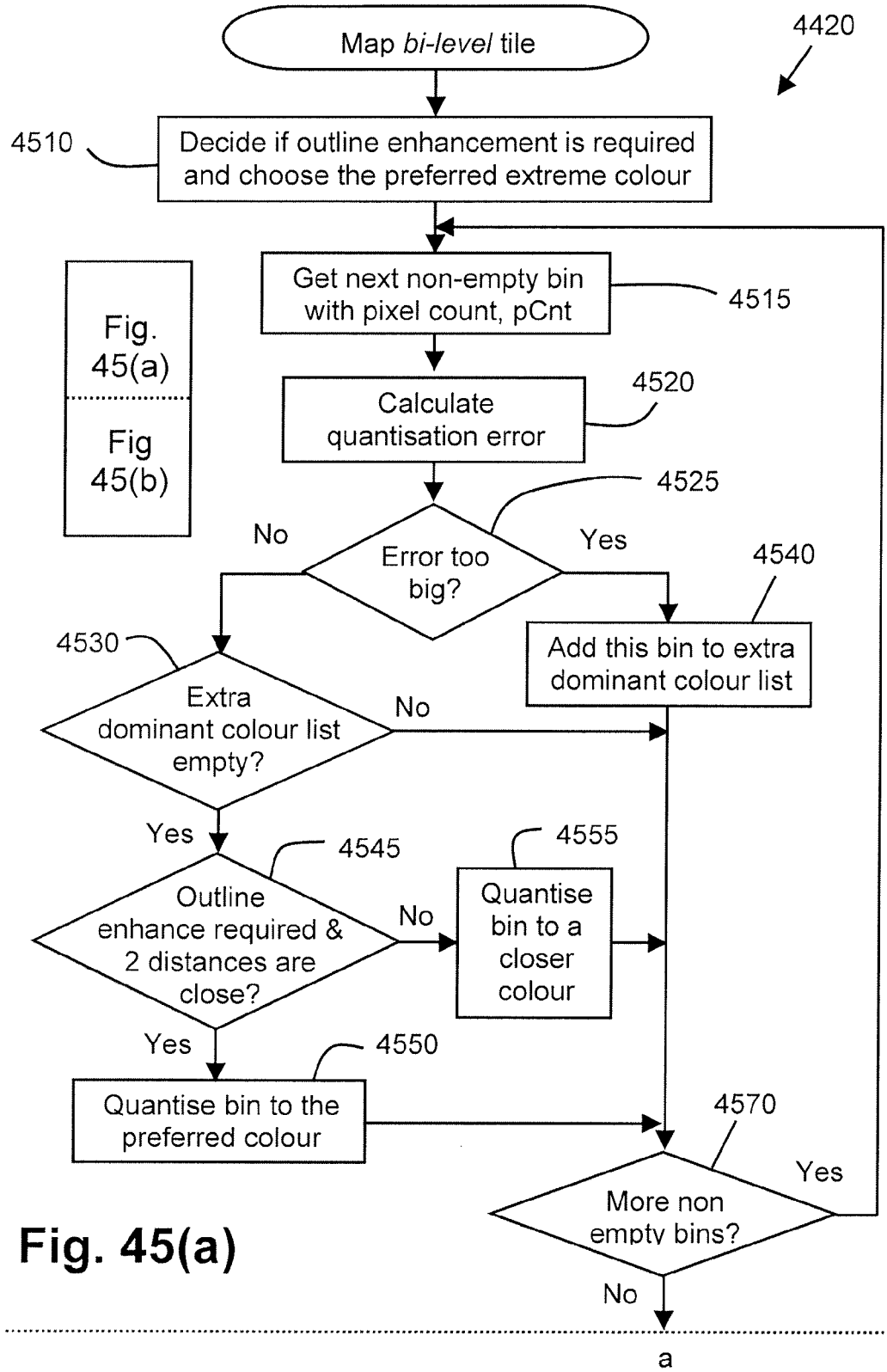
FIG. 45 is a detailed flow diagram illustrating the step of mapping a bi-level tile of FIG. 44.
Figure 45B:
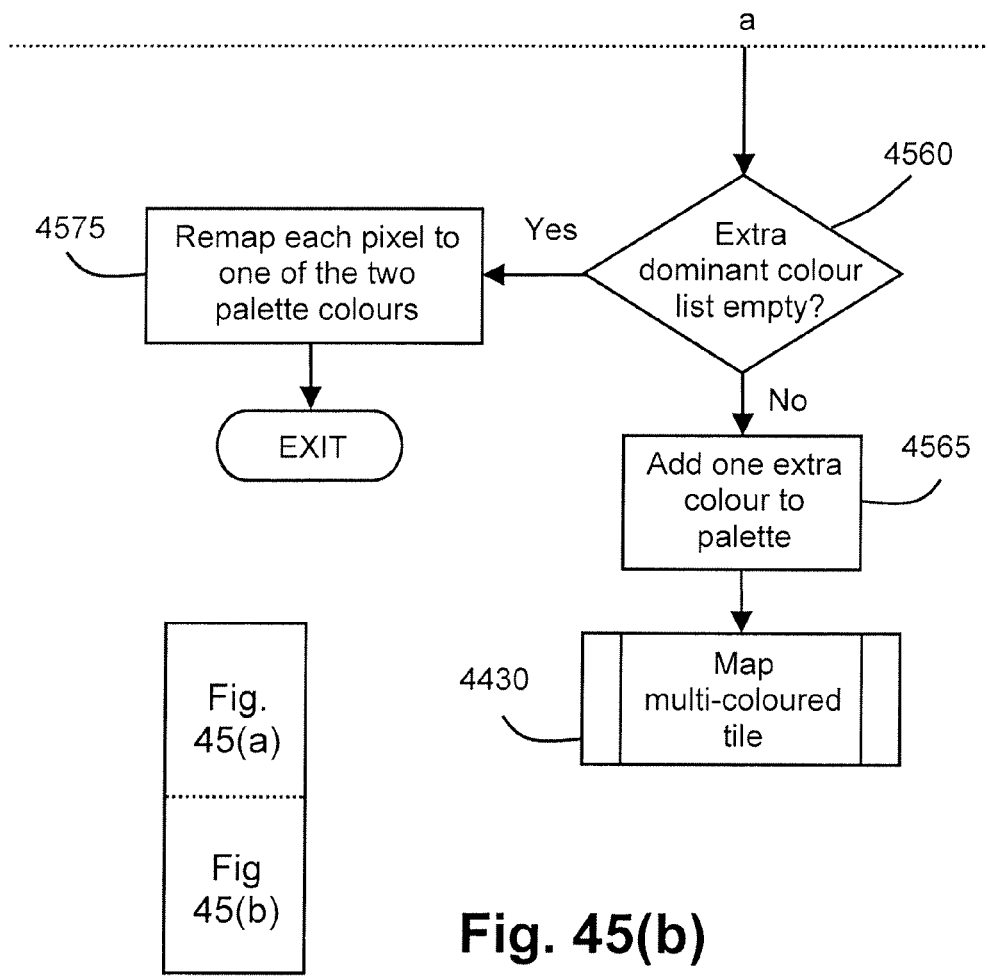

FIG. 45 provides further details of step 4420. The whole process 4420 maps all non-empty bins to the two colours in the second palette with quantisation error checking. Step 4510 to step 4570 perform the quantisation and error checking for each non-empty bin. If a big quantisation error is not found, the process remaps all pixels to the second palette after the bin quantisation. If a big quantisation error is found, the tile is reclassified as multi-coloured and subjected to multi-coloured tile mapping. The details of mapping bi-level tiles are explained below.

Step 4510 decides if outline enhancement is required and chooses the preferred extreme colour for quantisation for the bin that is subject to outline enhancement. Outline enhancement is required if one pixel count of the two palette colours outweighs the other by a factor of 5. Let the two colours in the second palette have the first colour C1 and pixel count P1 and the second colour C2 and pixel count P2. If (P1/P2) or (P2/P1) is greater than 5, outline enhancement is required and OUTLINE_ENHANCE is set to true. The preferred extreme colour may be the colour with smaller pixel count.

Step 4515 gets the next non-empty bin with pixel count, pCnt. Step 4520 calculates the quantisation error of the two colours. The Manhattan distances (D1 and D2) to the two palette colours are calculated and the smaller one is defined as minDist. minDist is the quantisation error. The process then continues at decision step 4525 to check if the quantisation error is too big. The pseudo code below defines the condition when quantisation error is too big:

```
(minDist * pCnt) > BIN_NEW_BILEVEL_THRESHOLD
||
(
    minDist > BIN_NEW_BILEVEL_COLOUR_DIFF
    &&
    pCnt > BIN_MERGE_BILEVEL_CNT_MIN
)
``` where the threshold values may be BIN_NEW_BILEVEL_THRESHOLD=6000, BIN_NEW_BILEVEL_COLOUR_DIFF=50 and BIN_MERGE_BILEVEL_CNT_MIN=100.

If the test of step 4525 is true, processing continues at step 4540. In step 4540, the current bin is added to the extra dominant colour list. Processing then continues at step 4570. If the test in step 4525 is false, processing continues at decision step 4530 to check if the extra dominant colour list is empty. If the list is not empty (No), the process switches to step 4570 to see if there are more non-empty bins to be processed. Otherwise, if the result of step 4530 is Yes, processing continues at step 4545 to determine if outline enhancement is required and if the two distances are close. The test condition is given as the pseudo code below:
  OUTLINE_ENHANCE
  &&
  abs(D1-D2)<BILEVEL_THRESHOLD_MARGIN
where the threshold may be BILEVEL_THRESHOLD_MARGIN=16.

If the test in step 4545 is true, processing continues at step 4550. In step 4550, the bin is quantised to the preferred colour. Processing continues at step 4570. Otherwise, processing continues at step 4555 to quantise the bin to the closer colour based on D1 and D2. The process then continues at step 4570 to check if there are more non-empty bins to be processed. If there are more non-empty bins, processing returns to step 4515. If there are no more non-empty bins, the process continues at decision step 4560 to check if the extra dominant colour list is empty. This determines if there is any big quantisation error during the bin quantisation process. If the list is empty, the process continues at step 4575 and remaps all pixels to one of the two palette colours according to the bin mapping in either of steps 4550 and 4555, as appropriate. Processing then terminates. If the list is not empty in step 4560, the process continues at step 4565 to add one extra colour to the palette. The bin with the highest pixel count in the extra dominant colour list is chosen as the third palette colour. In step 4430, the tile is remapped as a multi-coloured tile. Processing then terminates.

2.2.1.4.2 Map Multi-Level Tile

Figure 46:
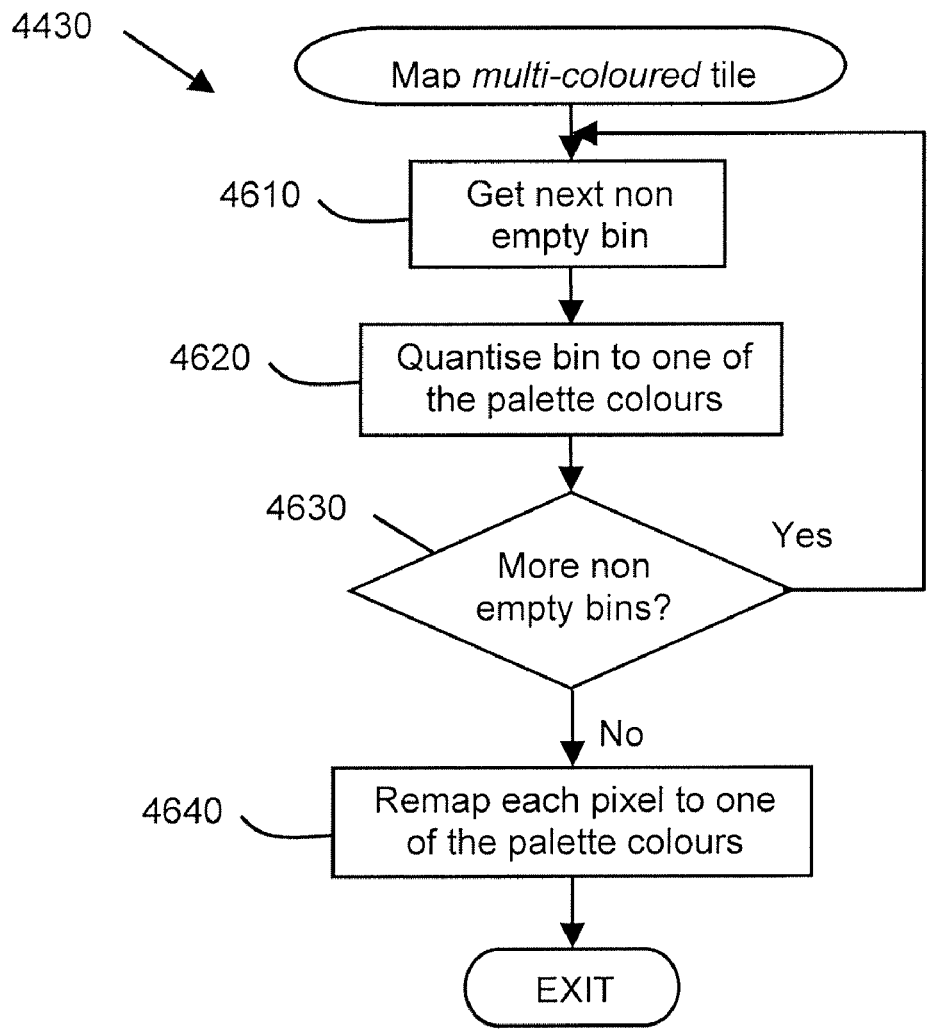
FIG. 46 is a detailed flow diagram illustrating the step of mapping a multi-coloured tile of FIG. 44.

Step 4430 of FIG. 44 is expanded upon FIG. 46. Step 4610 gets the next non-empty bin. Step 4620 quantises the bin to one of the palette colours. This may be done based on the closest Manhattan colour distance. Step 4630 checks if there are more non-empty bins to be processed. If the test in step 4630 is true, processing continues at step 4610. If the test in step 4630 returns No, processing continues at step 4640. In step 4640, all pixels are remapped to one of the palette colours according to the bin mapping in step 4620. Processing then terminates.

2.2.2 Colour CC Analysis and Blob Statistics

This process 1020 of FIG. 10 takes the quantised tile from the previous step and forms blobs. Each blob has the following statistics: bounding box, size, mean colour, bitmask, and blob boundary length. The blobs are formed in a single raster pass in a fast and efficient manner. In raster order, adjacent pixels in the quantised tile belonging to the same colour class are grouped to form "runs". At the end of each run (segment), the run is compared with touching segments (in terms of 8-way connectivity) on the row above for growing or merging. Growing occurs if a run that has yet to be given a blob label touches a blob of the same class. In contrast, merging occurs when two blobs of the same class come into contact. A new blob is formed if no growing is possible. Blob statistics are updated at end of each run.

Figure 36:
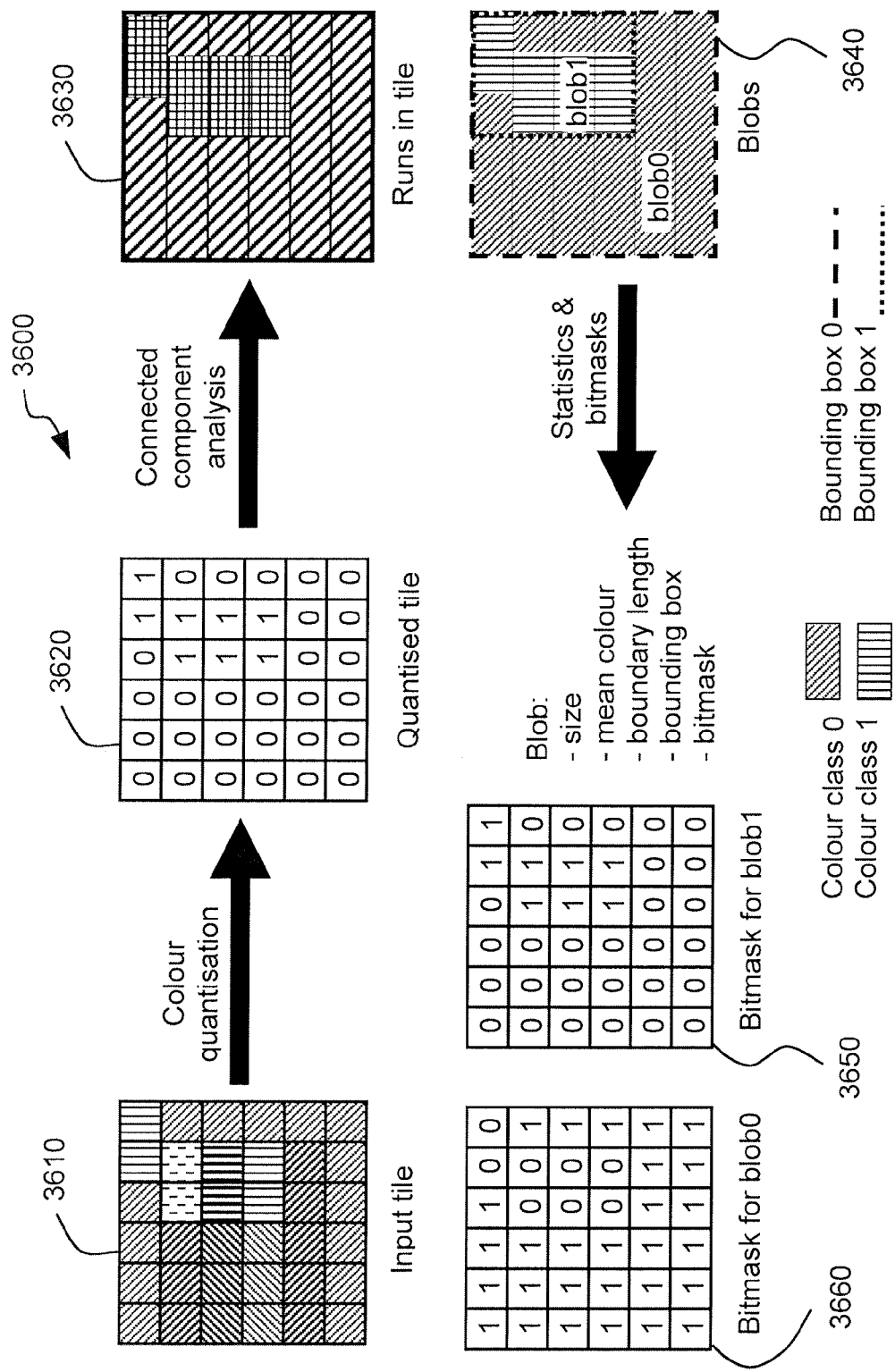
FIG. 36 is a block diagram illustrating colour blob processing using an example of a 6×6 tile.

FIG. 36 is an illustration of the colour blobbing process 3600 using an example 6×6 input tile 3610. Colour quantisation is applied to the input tile 3610, which has a number of colours to produce quantised tile 3620. The quantised tile 3620 contains class labels corresponding to the dominant colour classes. In this case, there are two dominant colours in the tile, thus giving class labels 0 and 1. Connected component analysis begins, in a row, by grouping adjacent labels of the same class to form runs. In FIG. 36, the first four '0's in the first row form a run and the next two '1's form another run, for example. Blobs are formed by joining runs of the same class from successive rows in the quantised tile 3620. Tile 3630 shows the runs in the tile. When comparing the current segment with the touching segments from the row above, there are three possible actions:

1. Grow an existing blob by adding the current segment to the blob;
2. Merge two blobs by consolidating statistics for the two blobs into one; and
3. Form a new blob by initialising the blob using the current segment.

Tile 3640 shows the resulting blobs, blob0 and blob 1, where blob 0 has an outer bounding box and blob1 has an inner bounding box. Blob statistics are accumulated at the same time as the runs and blobs are formed. So by the end of the processing stage, each blob has all the statistics as shown in FIG. 36 for blob0 and blob1. The bitmasks 3650 and 3660 are representative. The illustrative bitmaps 3650 and 3660 are not actually formed at this stage. The quantised colour is used as the mean colour of a blob. Alternatively, the mean colour of a blob may be determined by accumulating the actual pixel values in that blob, not the quantised colour. This gives a more accurate mean colour. Again, the blob statistics may comprise size, mean colour, boundary length, bounding box, and bitmask.

Figure 9:
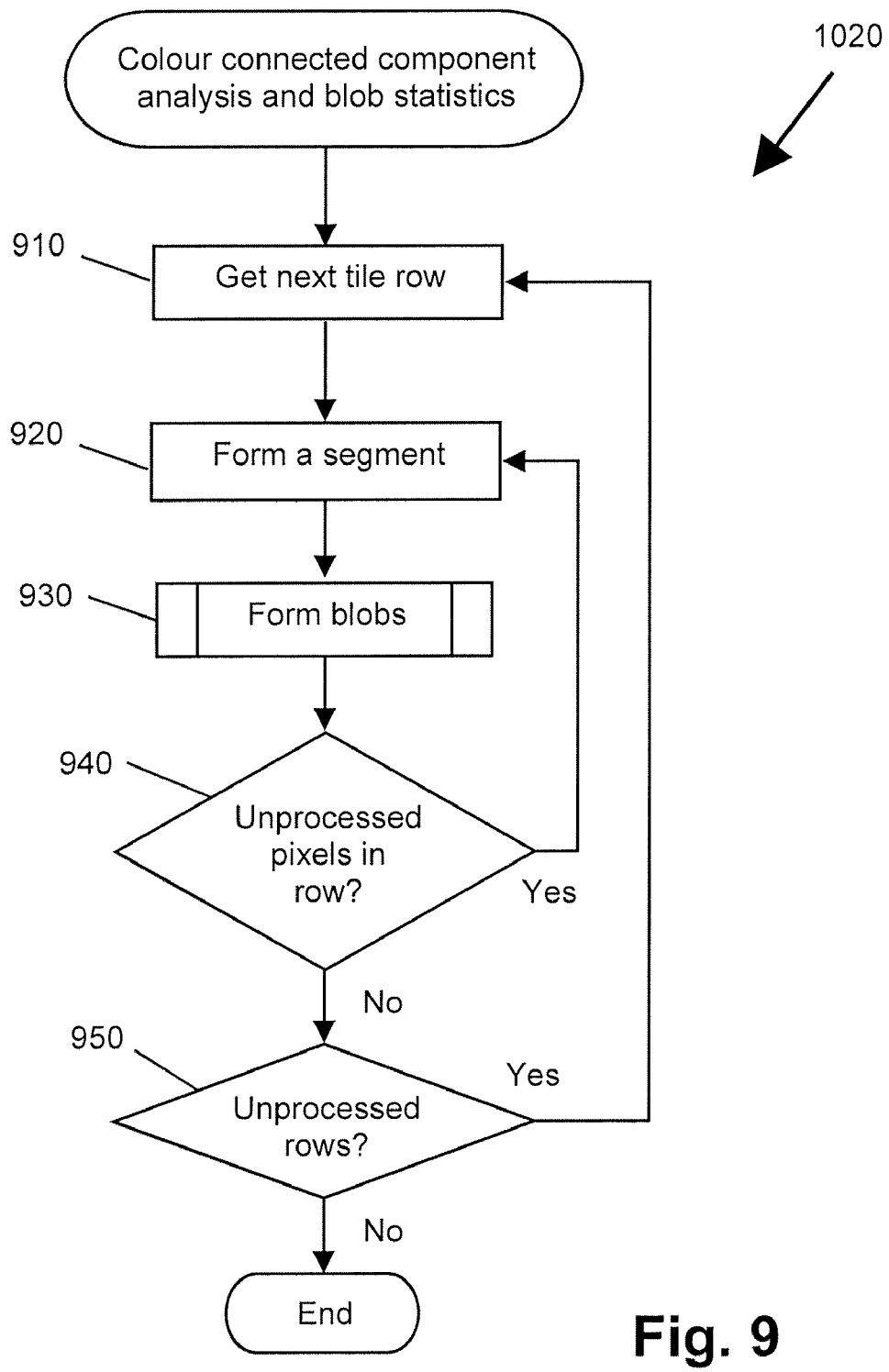
FIG. 9 is a detailed flow diagram of the colour connected component analysis and blob statistics step of FIG. 10.

FIG. 9 illustrates in more detail step 1020 of FIG. 10, which employs a loop structure to form blobs from the quantised tile, processing a tile row at a time, from top to bottom. In step 910, a current tile row is obtained for processing. In step 920, a contiguous segment of pixels of the same quantised label is formed. This is done by recording its start and end positions. This segment is the current segment $S_c$. The start position is the pixel to the right of the end position of the previous segment. In the case of a new tile row, the start position is the first pixel in that row. The end position is the last pixel before a change in quantised label occurs during a pixel-by-pixel examination of the quantised label across the current tile row from left to right. In the case where the current tile row ends before a change is detected, the end position is the last pixel of the row. For the purpose of a later re-estimation of the colour of a blob, YUV values for each pixel in the segment in the original full colour tile are accumulated during the examination from its start to end positions. Alternatively, the quantised colour of the segment maybe used without colour re-estimation.

Figure 12:
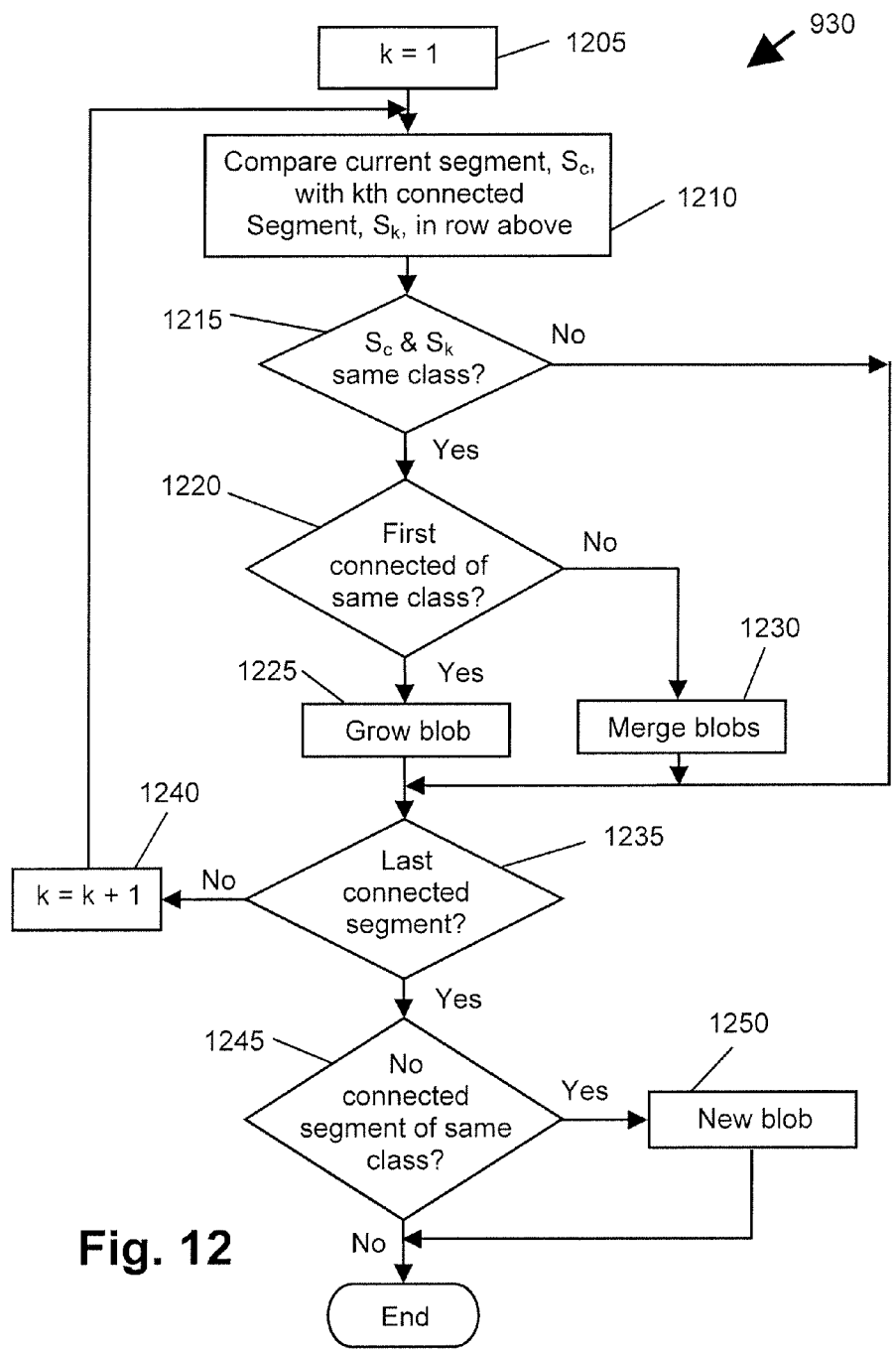
FIG. 12 is a detailed flow diagram of the step of forming a new blob or growing an existing blob of FIG. 9.

In step 930, a new blob is formed or an existing blob is grown using the segment. FIG. 12 provides further details of this step. In decision step 940, a check is made to determine if there are unprocessed pixels remaining in the row. If decision step 940 returns true (Yes), processing returns to step 920. This occurs until all pixels in the current tile row are processed. If step 940 returns false (No), processing continues at step 950. In decision step 950, a check is made to determine if unprocessed rows remain. If step 950 returns true (Yes), processing continues at step 910. This occurs until there are no more unprocessed tile rows. If step 950 returns false (No), processing terminates; every pixel in the quantised tile has been assigned to a blob.

2.2.2.1 Form Blobs

Figure 15:
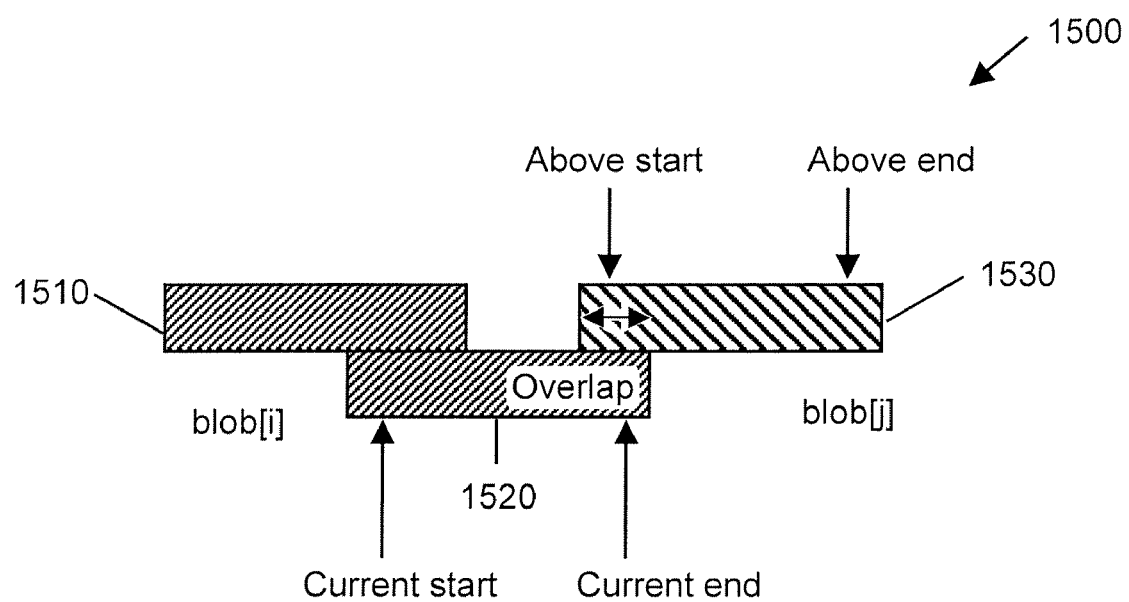
FIG. 15 is a block diagram illustrating an example of the blob merging process.

FIG. 12 illustrates step 930 in greater detail. The process of FIG. 12 takes as input the current segment $S_c$, as identified in step 920 of FIG. 9. At step 1205, a variable k is initialised to 1. This value refers to the kth segment $S_k$ of the tile row above the current tile row that is connected to the current segment $S_c$. Preferably, the connection is 8-way connected. In step 1210, a comparison is performed between $S_k$ and $S_c$. In decision step 1215, a check is made to determine if $S_c$ and $S_k$ are of the same class. If the two segments, $S_k$ and $S_c$, have the same quantised label, processing moves from step 1215 to step 1220. Otherwise, processing continues at decision block 1235. In decision step 1220, a check is made to determine if $S_k$ is the first connected segment of the same class. Thus, if $S_k$ is the first connected segment with the same quantised label as $S_c$, processing continues at step 1225. Otherwise, processing continues at step 1230. In step 1225, the current blob is grown. Thus, the current segment is grown upon the blob that the kth segment belongs to. Growing a blob involves updating the blob's size, boundary information, bounding box, and accumulated YUV values. Processing then continues at step 1235. Conversely, if decision step 1220 returns false, this indicates that the current segment has already been assigned a blob label, e.g., blob[i], and come into contact with another blob, e.g., blob[j], and processing continues at step 1230. These two blobs are merged together in step 1230 if the blobs have different blob labels, i.e., i≠j. The blob merging process in step 1230 is depicted in FIG. 15. Processing then continues at step 1235.

From steps 1215, 1225 and 1230, processing continues to decision block 1235. In decision block 1235, a check is made to determine if the last connected segment has been processed. If the kth segment is not the last segment connected to the current segment, processing continues at step 1240 and k is incremented by 1. Processing then returns to step 1210 to process the next connected segment. Otherwise, if decision step 1235 returns true, processing moves to decision block 1245. In decision block 1245, a check is made to determine if none of the connected segments is of the same class (i.e. of the same quantised label as the current segment). If step 1245 returns true (Yes), processing continues at step 1250. A new blob is formed using the current segment in step 1250. Forming a new blob involves assigning a new blob label to the current segment, incrementing the number of blobs by 1, and initialising blob statistics using the current segment information. Processing terminates following step 1250. Likewise, if decision block 1245 returns false (No), processing terminates.

2.2.2.2 Example of Blob Merging

Figure 37:
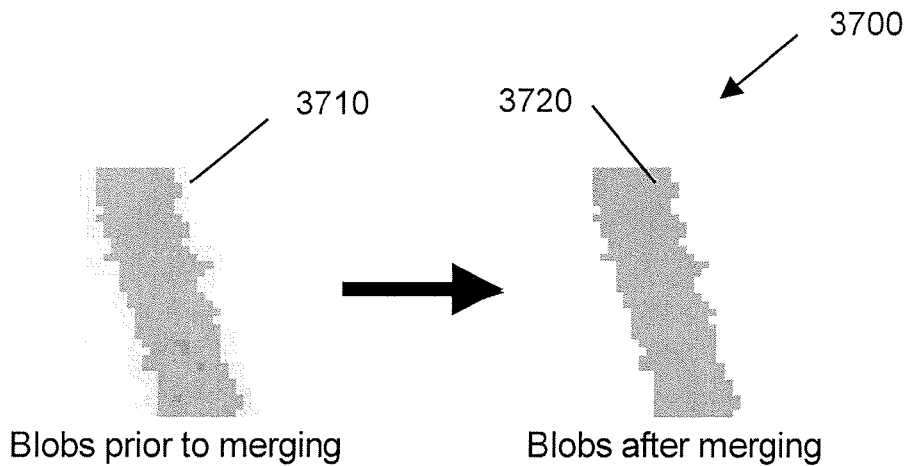
FIG. 37 comprises images showing an example of blob merging.
Figure 38:
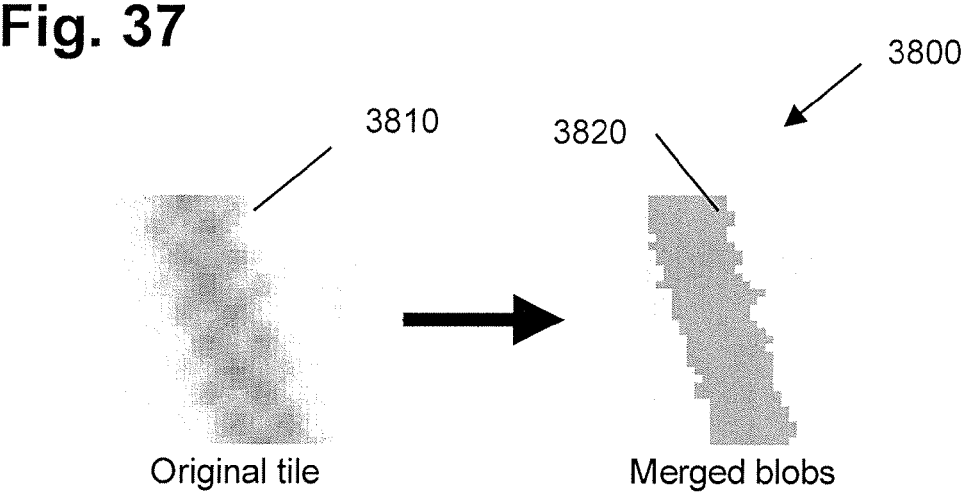
FIG. 38 comprises images showing an original tile with the merged blob output for comparison purposes.

FIG. 15 illustrates an example of blob merging 1500. Segments 1510 and 1520 both belong to blob[i], which is connected to segment 1530 belonging to blob[j]. The current start and current end for the segment 1520 are depicted, as are the above start and above end for the segment 1530. Also the overlap of segments 1520 and 1530 are shown in FIG. 15. The blob merging process 1500 involves combining the statistics of the two blobs, mapping one blob label to another, and reducing the number of blobs by 1. For example in FIG. 15, the label j is mapped to label i. The following pseudo code instructions are used to combine the blob statistics:

blob[$i$].boundingBox=combine(blob[$i$].boundingBox, blob[$j$].boundingBox)

blob[$i$].size+=blob[$j$].size blob[$i$].tileBorderPixelCount+=blob[$j$].tileBorderPixelCount blob[$i$].horizontalEdges+=blob[$j$].horizontalEdges−2*overlap blob[$i$].verticalEdges+=blob[$j$].verticalEdges blob[$i$].YUV+=blob[$j$].YUV 2.2.3. Intra-Tile Merging Once the blobs for a tile have been formed by the connected component analysis, the next stage is to use colour, size, and blob boundary length statistics to merge semantically related blobs together. From this stage onwards, blobs can only be merged, not split. Therefore, the tile moves from being over segmented to much closer to the correct level of segmentation. An example of intra-tile merging is shown in FIGS. 37 and 38, where blob statistics are used to assess whether to merge a given pair of blobs. In the example, there are four quantisation colours and the connected component analysis returns ten blobs. FIG. 37 shows the blobs prior to merging 3710 on the left. A number of these blobs are due to residual halftone patterns and colour "bleeding" effect between two distinct colour regions. After applying intra-tile merging, small blobs with relatively long boundary length are merged into larger blobs with similar colour features. The blobs after merging 3720 are shown in the example 3700. FIG. 38 contains a comparison 3800 of the original tile 3810 with the merged blobs 3820.

The quantisation and blob forming processes often create many small unwanted or erroneous blobs. These are in the form of small blobs caused by noise speckles, remaining halftones in the input image, or thin, high-aspect-ratio blobs caused by bleeding effects at the edge of larger connected components. The erroneous blobs may be removed by merging those blobs with a blob the erroneous blobs are touching that is closest in colour.

Speed and memory usage are improved by limiting the number of blobs in a tile produced by the segmentation and connected component processes. If there are too many blobs in a tile, the number may be reduced by merging some blobs of similar colour even if those blobs are not touching. This produces blobs that have separate disconnected parts, but are treated as a single element. Quality is unaffected as this only occurs in tiles with a lot of small noise elements, which are discarded in a later step.

Figure 19:
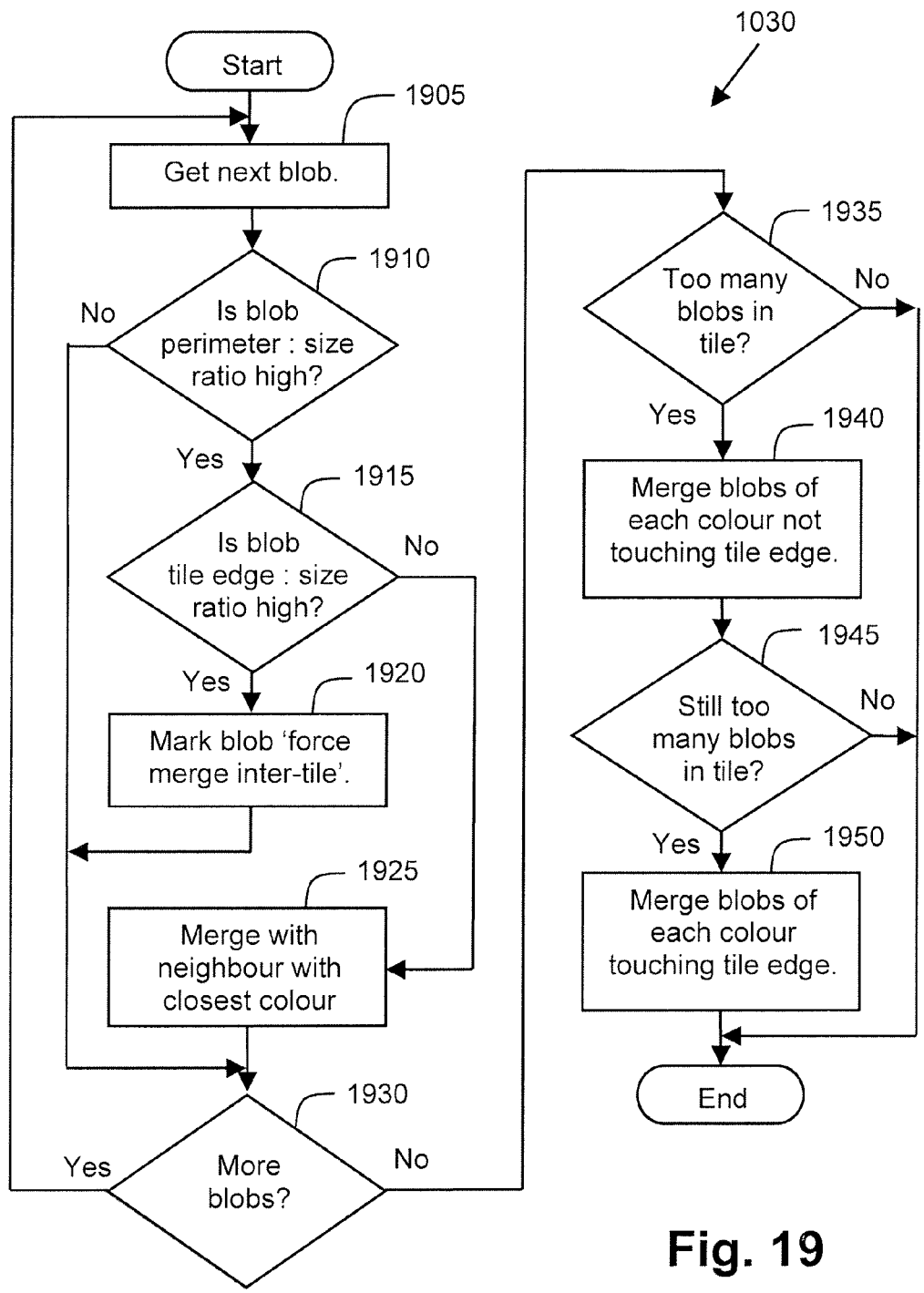
FIG. 19 is a flow diagram of the intra-tile merging step of FIG. 10.

FIG. 19 illustrates in detail step 1030 of FIG. 10. In step 1905, a blob in the current tile is obtained. In step 1910, the blob perimeter to size ratio is checked to determine if it is high. If this parameter is found to be greater than a threshold level, processing continues at step 1915. Otherwise, if step 1910 returns false, processing continues at step 1930. In step 1915, the ratio of pixels in the blob touching the tile edge is checked. If the ratio is above a threshold value, processing continues at step 1920. In step 1920, the blob is marked "force merge inter-tile". The force merge flag for the blob is set, which makes the blob much more likely to be merged with connected components in adjacent tiles in step 1420 of FIG. 14. After step 1920, processing continues at step 1930. If in step 1915 the blob's tile edge ratio is below the threshold, processing continues at step 1925. In step 1925, the blob is merged with the neighbour blob with the closest colour. All the blobs touching the current one and their distance in colour from the current blob are found. The current blob is then merged with the neighbour closest in colour. Processing then continues at step 1930. In decision step 1930, a check is made to determine if there are more blobs in the tile to be processed. If step 1930 returns true (Yes), processing returns to step 1905. Otherwise, processing continues with step 1935.

In decision step 1935, the current number of blobs in the tile is checked to determine if there are too many. If the number of blobs is found to be higher than a predefined limit, processing continues at step 1940. Otherwise, processing ends. In step 1940, the blobs of the same quantised colour class that are not touching the tile edge are merged together. This is done for each of the quantised colour classes. The blobs touching the tile edge are not merged, because these blobs may form part of much larger CCs and merging them could have a detrimental effect on quality. In step 1945, the current number of blobs in the tile is checked again to determine if there are still too many blobs in the tile. If the number is now found to be below the predefined limit (No), processing terminates. Otherwise, processing continues at step 1950. In step 1950, blobs of each colour touching the tile edge are merged. Step 1950 performs a similar process to step 1940 but considers blobs that do touch the tile edge to reduce the number of blobs below the limit. Processing then terminates.

2.2.4. Inter-Tile Merging

Figure 13:
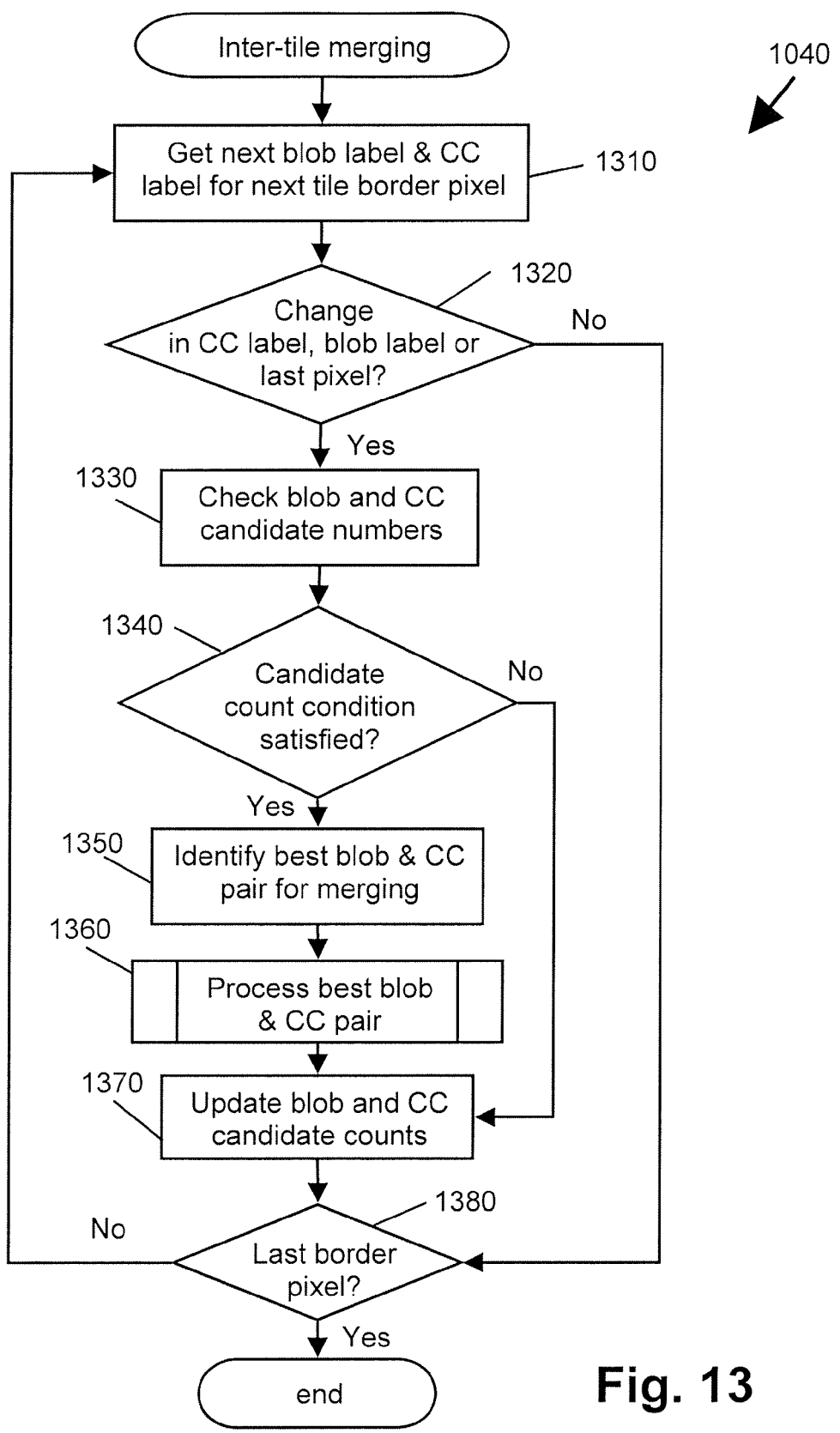
FIG. 13 is a flow diagram of the inter-tile merging step of FIG. 10.

FIG. 13 illustrates in detail the inter-tile merging process of step 1040. This process is repeated for each of the left and top borders of the current tile in no particular order. The following description is applicable for merging along either the left or top border of the current tile. For example, a 32×32 tile has a 32-pixel border with its adjacent tile state and each pixel has a blob label. The adjacent tile state also has a 32-pixel border, and each pixel has a CC label. So for each pixel step along the border, there is a blob label in the current tile and a corresponding CC label in the adjacent tile state. Processing begins, in step 1310, along the common border by obtaining a blob label in the current tile for the next tile border pixel and a CC label in its adjacent tile state.

A test is performed at decision block 1320 to detect a change in the CC label, the blob label, or the last pixel as processing moves along the border. Decision block 1320 returns Yes if the current pixel is the last border pixel. If step 1320 returns false (No), processing continues at step 1380. Otherwise, if step 1320 returns true (Yes), processing continues at step 1330. Step 1330 checks the number of blobs and the number of CCs that are available as candidates for merging. In decision step 1340, a check is made to determine if the candidate count condition is satisfied. Decision block 1340 returns Yes if the merging candidate counts of blobs and CCs satisfy a predefined condition 1700 as shown in FIG. 17 and described hereinafter.

If decision step 1340 of FIG. 13 returns false (NO), processing continues at step 1370. Otherwise, processing continues at step 1350. Step 1350 identifies the best blob and CC pair among the merging candidates, for merging based on a colour distance metric. Let $(Y_{cc}, U_{cc}, V_{cc})$ and $(Y_{blob}, U_{blob}, V_{blob})$ be the YUV colour values for a CC and blob candidate pair, the colour square distance, sd, is given by:

$$sd = W_y(Y_{cc}-Y_{blob})^2 + W_u(U_{cc}-U_{blob})^2 + W_v(V_{cc}-V_{blob})^2,$$

where $W_y$, $W_y$ and $W_y$ are weights for the Y, U and V channels, respectively. The weights $W_y$, $W_y$ and $W_y$ may be set to 0.6, 0.2 and 0.2 respectively. The best blob and CC pair is the one that has the minimum square distance value.

This best blob and CC pair is processed by step 1360, which performs various merging operations and is described in greater detail with reference to FIG. 14. Following step 1360 or a No from decision block 1340, processing continues at step 1370, where blob and CC candidate counts are updated. FIG. 48 shows the CC and blob candidate counts before and after updating for all operating conditions. If both the CC and blob labels are found to have changed, the CC and blob candidate counts are set to 1 for all possible count combinations prior to merging ("x" for prior to update indicates "Don't Care"). If only one label is found to have changed and there are two candidates on either side of the tile border, the counts may be set to either 0 or 1 depending on which one of the two candidates is merged. If the second blob is selected for merging (see 4920 in FIG. 49), then both candidate counts are set to 0 after the merging has taken place. However if the first blob or no blob is selected for merging, then both counts are set to 1. In the remaining cases where candidate count update is required, the count for the label that has changed is incremented by 1, whereas the count for the unchanged label is set to 1.

Following either of steps 1320 or 1370, processing continues at decision block 1380. In decision block 1380, a check is made to determine if the current pixel is the last border pixel. If step 1380 returns false (No), processing moves to the next pixel location in step 1310. Otherwise, processing terminates.

2.2.4.1 Inter-Tile Merging Conditions

According to FIG. 17, merging usually occurs when there are two candidates on one side and one on the other, except when both CC and blob labels change at the same time in which case one candidate on each side is sufficient for merging. This is so as to avoid two adjacent candidates on one side merging to the same candidate on the other. FIG. 17 sets out the conditions under which an inter-tile merging operation may be performed. If the current CC and blob counts are (1,1), then both labels must change at the same time for merging to occur. However if the current CC and blob counts are (1,2) or (2,1), then a change in either label is sufficient for merging to occur. The case (2,2) never occurs.

2.2.4.2 Inter-Tile Merging Examples

Figure 49:
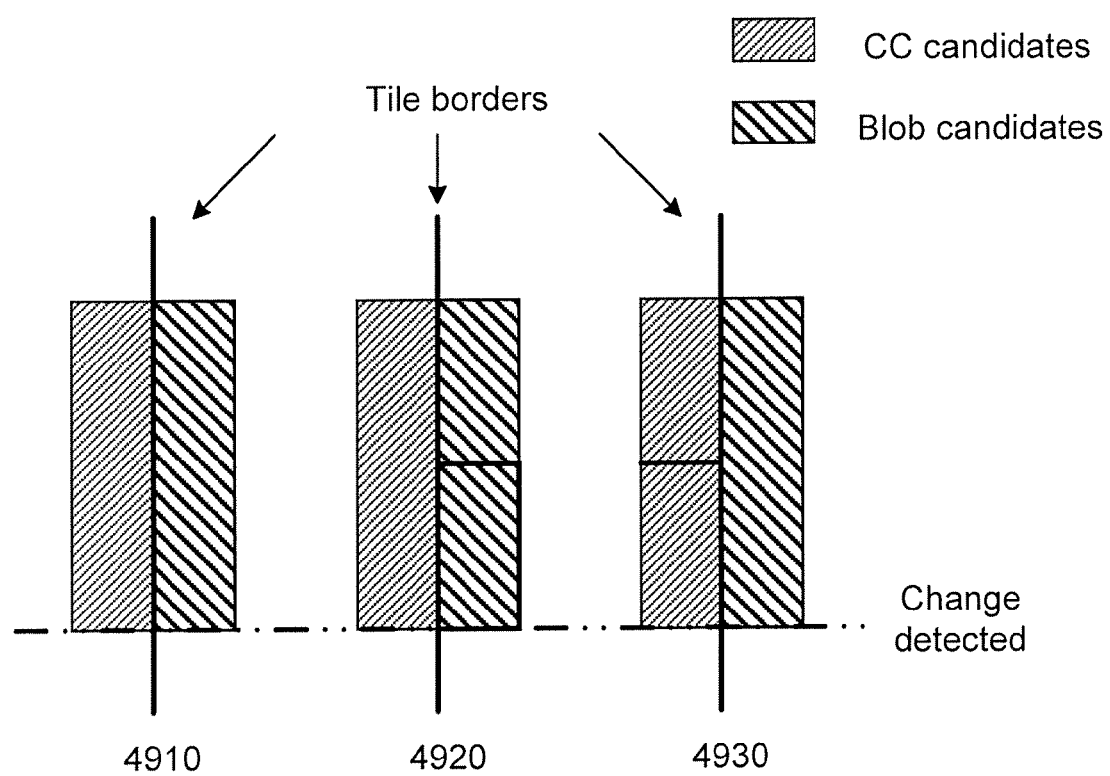
FIG. 49 is a block diagram illustrating examples of merging blob and CC candidates.

FIG. 49 provides an illustration of merging between blob and CC candidates. There are three typical cases: i) in 4910 each side has only one candidate; ii) 4920 has one CC and two blobs, and iii) 4930 has two CCs and one blob. In case 4920, the CC candidate is connected to two blob candidates. Suppose both blobs are close in colour to the CC but only one may merge with the CC. If merging is performed in sequence from top to bottom one candidate on each side at a time, then the top blob merges with the CC, leaving the bottom blob unmerged. This might not produce the most desirable result, as the bottom blob could be a better candidate for merging. Thus, two candidates are required on one side for cases similar to those in 4920 and 4930. Case 4910 only requires one candidate on each side because there are no alternative merging combinations for 4-connectedness.

Figure 39:
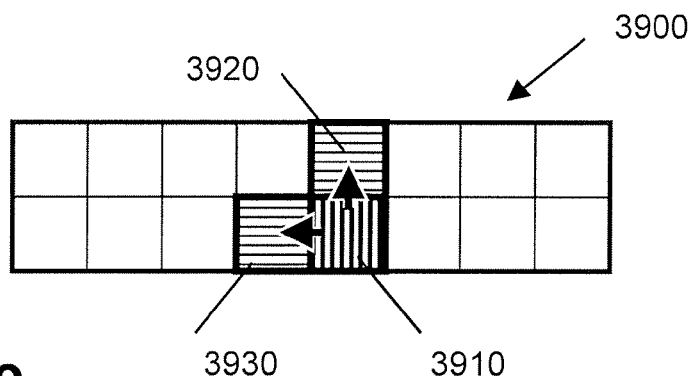
FIG. 39 is a block diagram illustrating merging blobs over tiles in raster order.

Colour-connected components that span across more than one tile are formed by inter-tile merging blobs in tile raster order. As shown in the example 3900 of FIG. 39, this is performed in raster order, where blobs within a tile 3910 are merged with blobs in either of the two adjacent tiles 3930 and 3920 located to the left of and above the tile 3910, respectively.

Figure 16:
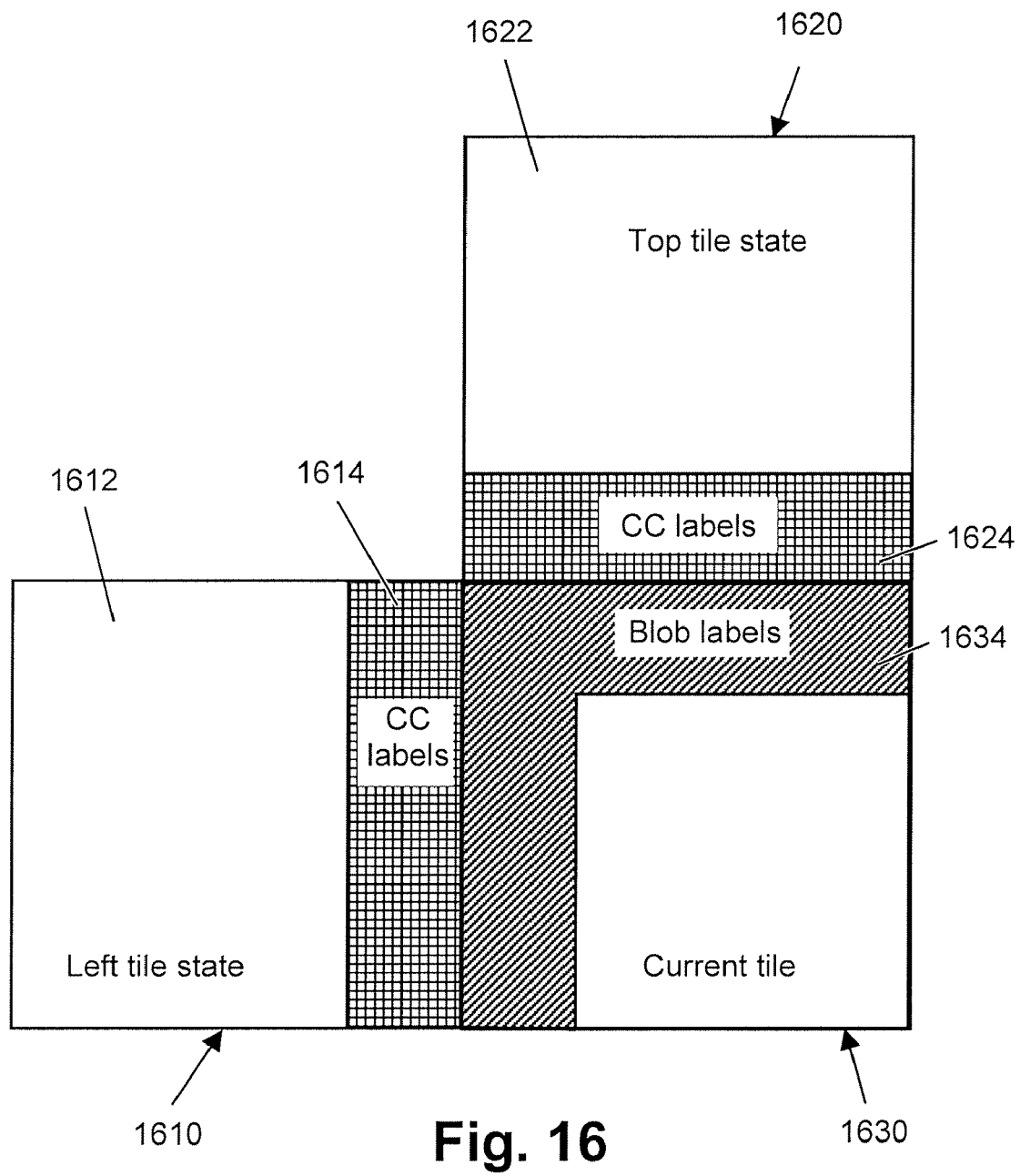
FIG. 16 is a block diagram illustrating merging between a current tile and the states of two adjacent tiles.

Each CC is stored in a data structure that holds information about its bounding box, mean colour, size in pixels, and touching CCs. During the inter-tile merging process, every blob in the current tile is assigned a CC label, and the corresponding CC data structure is updated using the blob statistics. Merging is performed between the current tile 1630 and the states 1612, 1622 two adjacent tile 1610, 1620 along the left and top borders of the current tile 1630 as shown in FIG. 16. The current tile 1630 is a block of pixel data that has been processed to form blobs and has blob labels 1634 for the pixels along the common borders. In contrast, the previous tile state 1612, 1614 does not contain pixel data, only blob statistics and connected component information linked to those blobs. A tile state 1612, 1622 is a compact data structure that contains information about the blobs along the borders in that tile 1610, 1620 and pointers to the CCs 1614, 1624 that those blobs belong to. In particular, there are two different tile states: the left tile state 1612 and the top tile state 1622; each has CC label information 1614, 1624 for each pixel along their common borders with the current tile 1630 for merging with tiles to their right and below, respectively. The blobs in the previous tile are now part of connected components.

2.2.4.3 Process Best Blob and CC Pair

Figure 14:
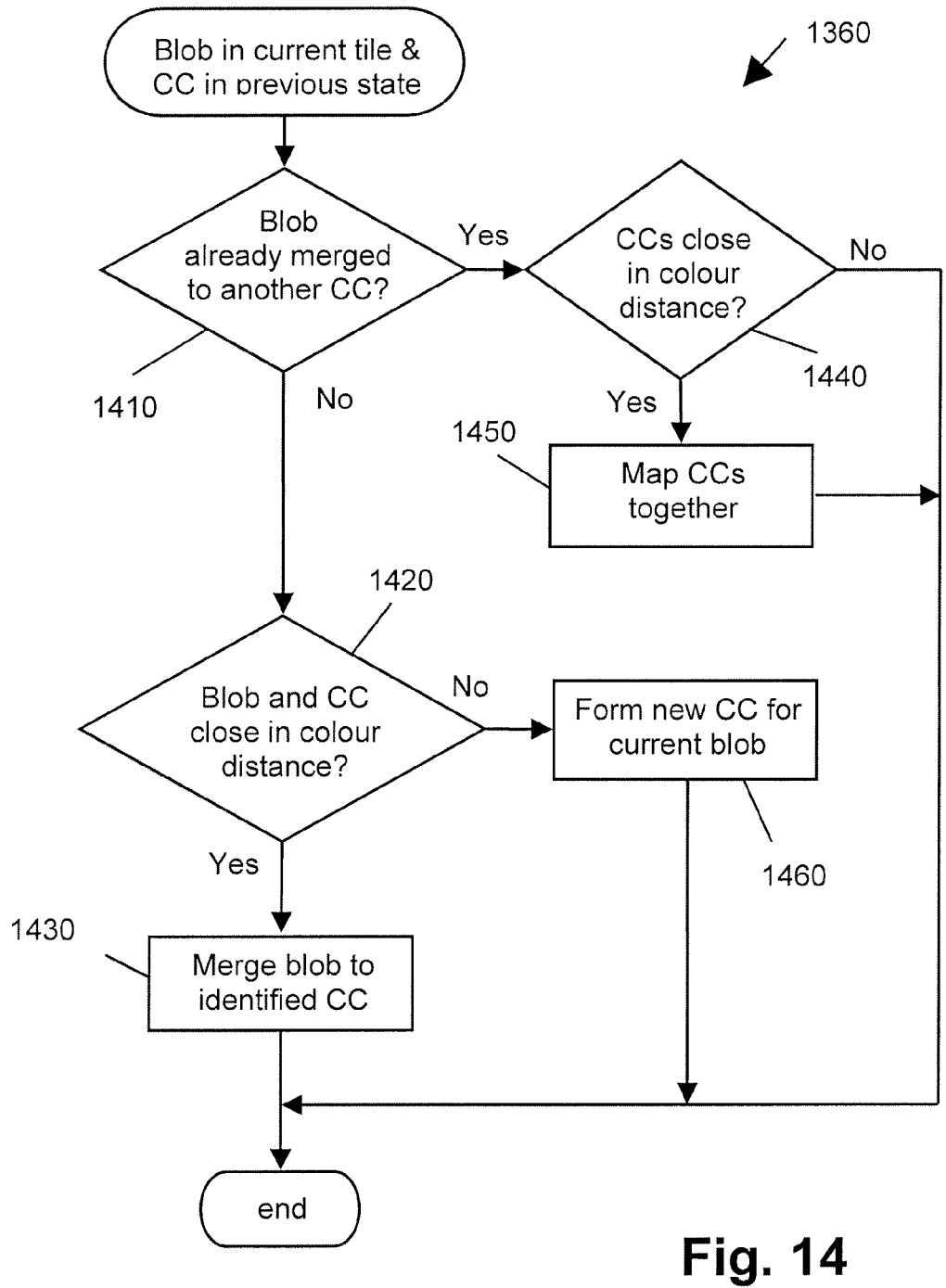
FIG. 14 is a flow diagram of the step of processing a best blob and CC pair of FIG. 13.

FIG. 14 illustrates in greater detail step 1360 of FIG. 13, which takes as input the best blob and CC pair identified in step 1350. Processing commences in step 1410. In decision step 1410, a check is made to determine if the blob has already merged with another CC. If, at decision block 1410, the identified blob has already been assigned a CC label, processing continues at decision block 1440. Otherwise, processing moves to decision block 1420. At decision block 1420, the colour distance, calculated in step 1330, between the identified blob and CC pair is compared with a colour-merging threshold. The value for the threshold may be 450. If the force merge flag has been set, then the threshold may be 900. If the colour distance is less than the threshold, processing continues at step 1430. Otherwise, processing continues at step 1460. In step 1430, the blob and identified CC are merged together. This is done by updating the CC's statistics using the blob's statistics and assigning the CC's label to the blob. Processing then terminates. In step 1460, a new CC is formed for the current blob. Processing then terminates.

In decision block 1440, the colour distance between the identified CC and the CC to which the identified blob belongs is compared with a colour threshold for merging. If the colour distance between the two CCs is below the threshold, processing continues at step 1450. In step 1450, the CCs are mapped together. This is done by combining their statistics and setting a "map-to" pointer that links the CCs together. Processing then terminates. Likewise, if step 1440 returns false (No), processing terminates.

2.2.4.4 CC Mapping Outcome

Figure 18:
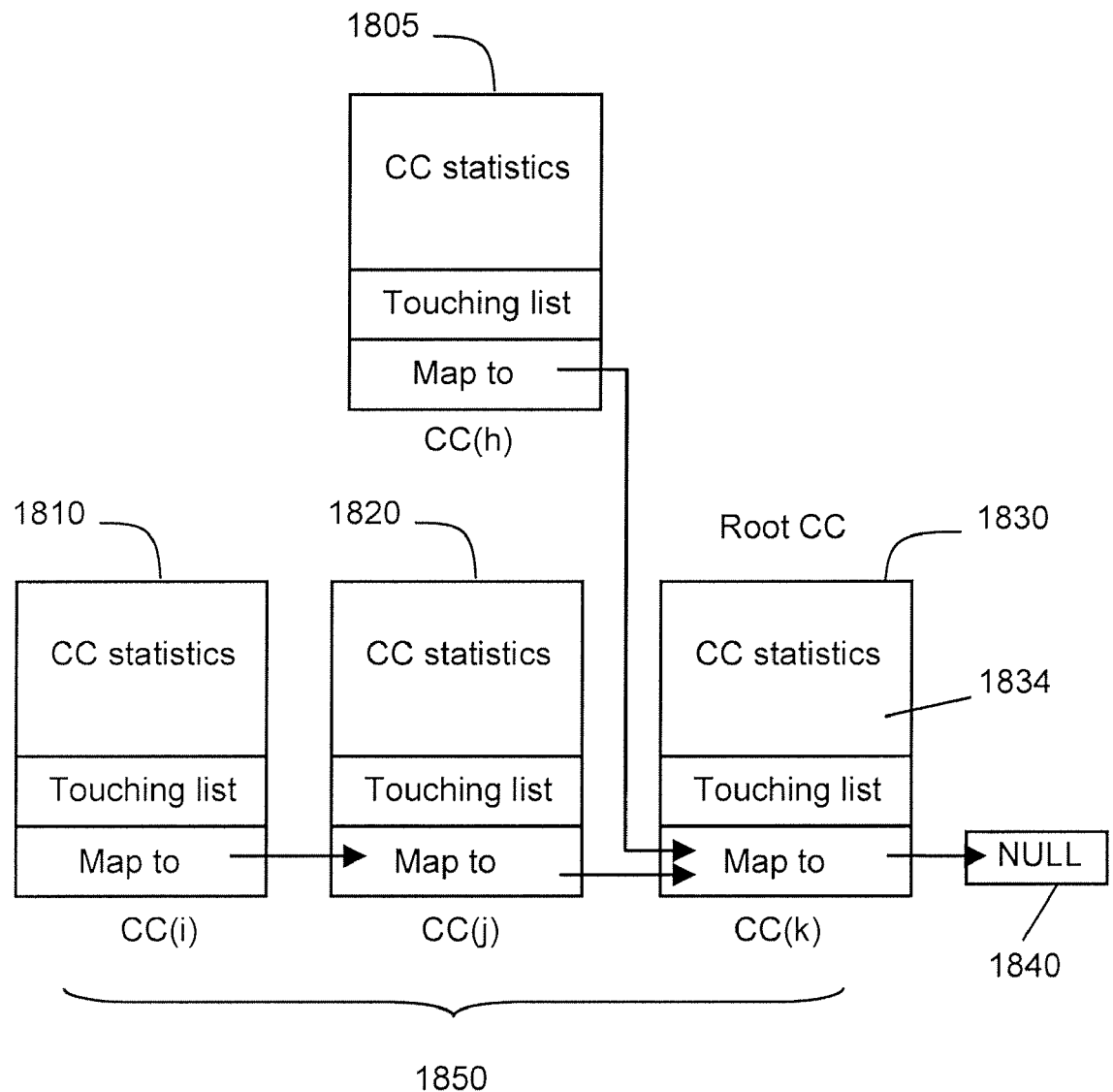
FIG. 18 is an example of the outcome of a CC mapping process of FIG. 14.

FIG. 18 is an illustration of the outcome of a CC mapping process in accordance with step 1450 of FIG. 14. The drawing shows that a linked list 1850 of CCs may be formed as a result of merging CCs 1805, 1810, 1820, 1830. In this illustration, the CC (k) 1830 has its map-to pointer 1832 pointing to NULL 1840, which indicates it has never been merged into another CC, thus it is called a root CC. Furthermore, a root CC's statistics 1834 are determined by accumulating individual CC statistics over a number of merges. For example, the final statistics of CC 1830 are the combined statistics of CC (h) 1805, CC (i) 1810, CC (j) 1820 and CC (k) 1830 before those CCs were merged together. The order in which the statistics are combined is not important. In FIG. 18, CC (i) 1810 points to CC (j) 1820, and both CC (h) 1805 and CC (j) 1820 point to CC (k) 1830.

2.2.5 Post Merging Processing

Figure 50:
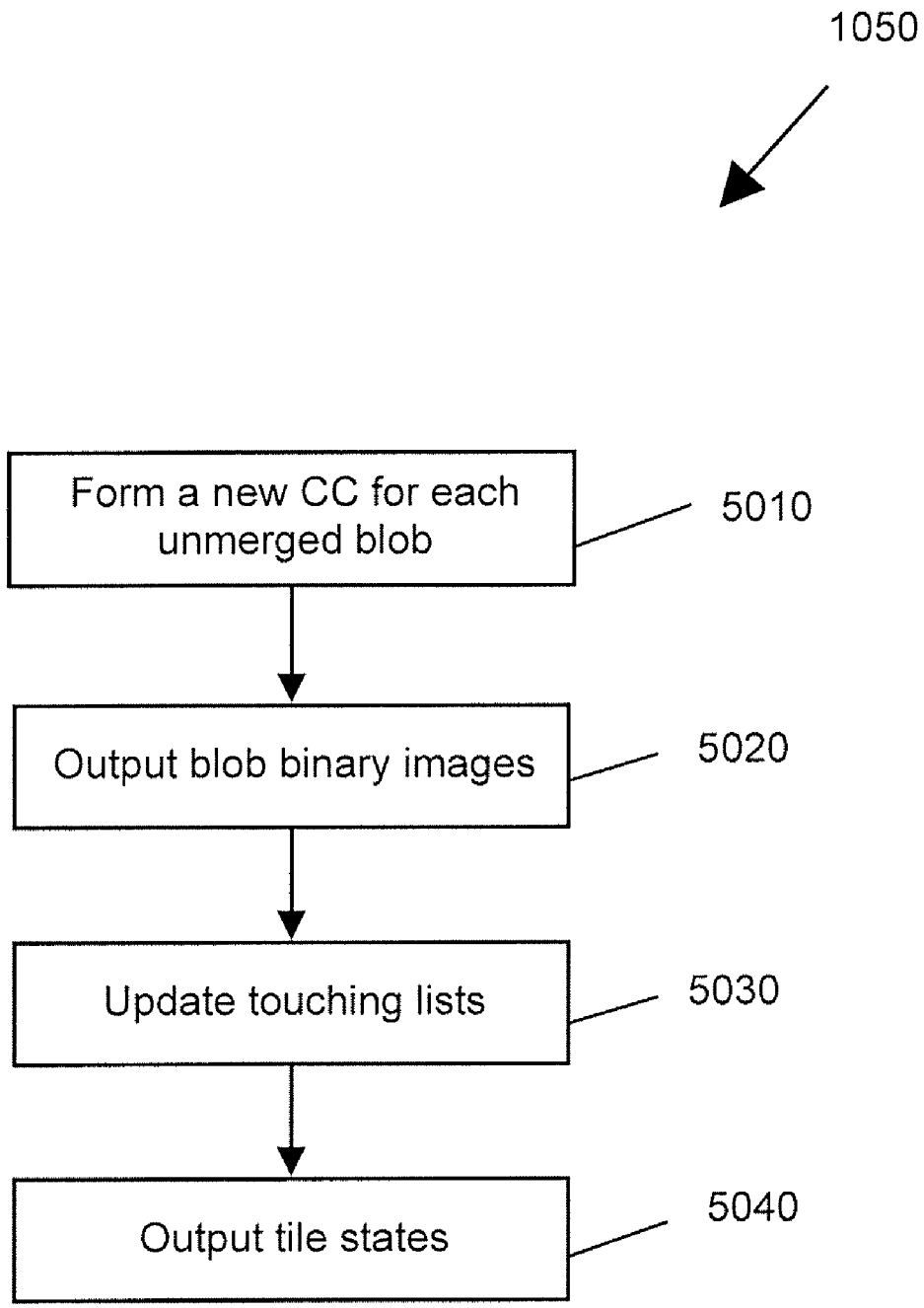
FIG. 50 is a flow diagram illustrating the step of post-merging processing of FIG. 10.

FIG. 50 is a flow diagram of the post merging processing step 1050 of FIG. 10. In step 5010, a new CC is formed for each unmerged blob in the current tile in a process that is the same as step 1460 of FIG. 14. In step 5020, binary images for storing the shape and appearance of the blobs are output using the blob labels. For a tile with n blobs, only n−1 binary images are needed to be output, because the nth binary image is stored implicitly as the remaining region after the n−1 regions have been taken out. Therefore, a flat tile that contains a single blob does not require storing any binary image. In an alternative embodiment, the binary images may be stored in a single, compact data structure as an index map, where each pixel location has a blob index and is represented using log 2(n) bits. For example, if the maximum number of blobs per tile is 16, the blob index at each pixel location is encoded using a 4-bit number. In another alternative embodiment, binary images for bi-level tiles may be stored using 1-bit bitmaps. In step 5030, the touching list of each CC inside the current tile is updated. This is done by identifying all the adjoining CCs in that tile. In step 5040, the tile states are output. The colour segmentation process stores blob and CC information in a compact tile state data structure for merging with the next input tile. As mentioned above, there are two tile states where the left tile state has CC label information along the right tile border, and the top tile state has CC label information along the bottom tile border.

2.3. Segmentation Example

Figure 25:
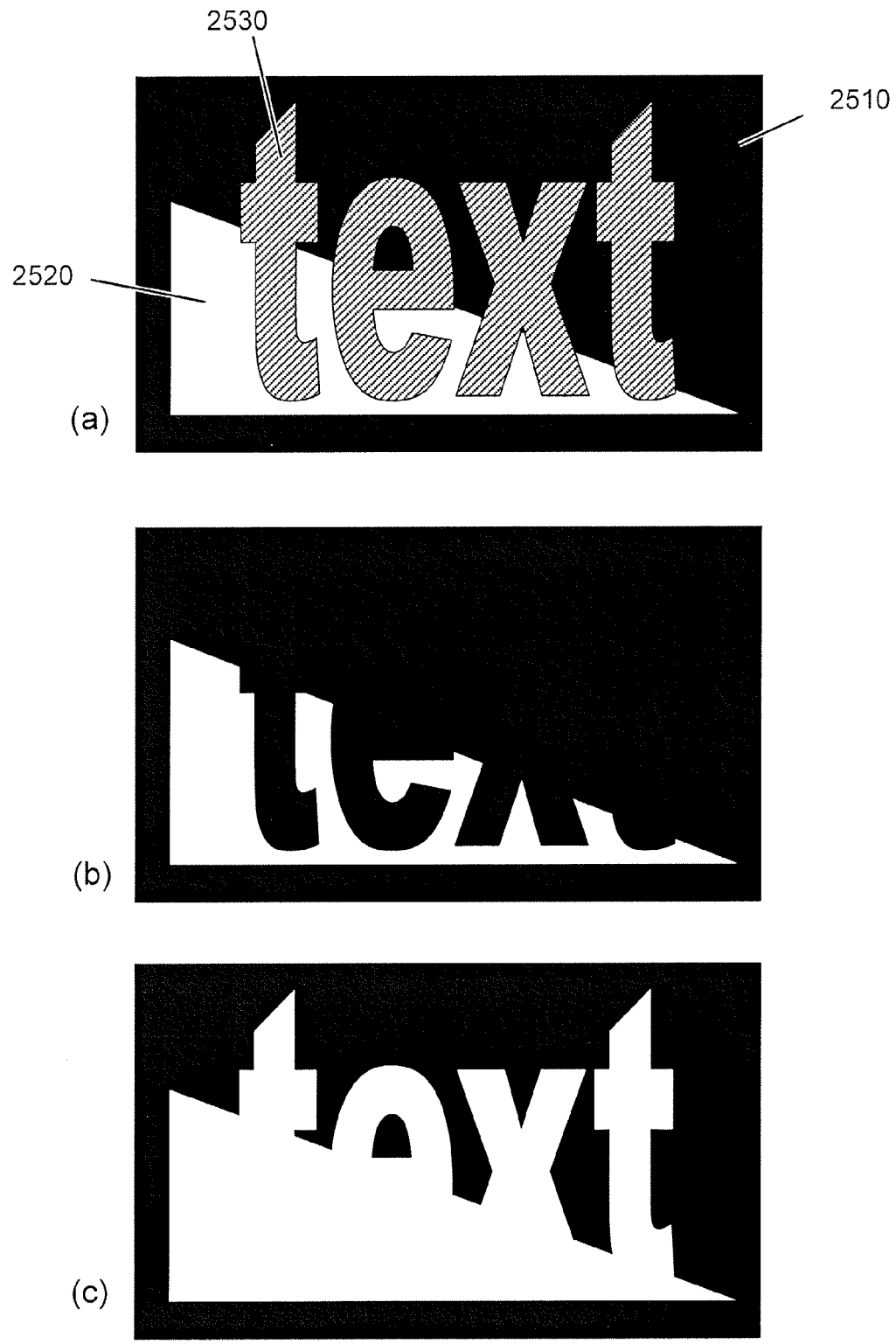
FIG. 25(a) is an image of a simple example illustrating segmentation based on more than 2 quantisation levels.
FIGS. 25(b) and (c) are images illustrating respective results of binary segmentation of the image of FIG. 25(a)

FIG. 25(*a*) shows a simple example that illustrates the advantage of a segmentation based on more than 2 quantisation levels. The background 2510 is black and onto this is placed a white triangle 2520 and the letters of the word 'text' in grey 2530. A binary segmentation of this image would typically result in the merging of the text 2530 with either the background 2510 or the triangle 2520, as seen in FIGS. 25(*b*) and (*c*). Neither of these segmentations could be used for document layout analysis to select text regions—the text features have been lost.

At the same time, there are certain features of a binary segmentation that permit a simplification of layout analysis of connected components. Consider the case of a page with a connected outer boundary and CCs formed by 4-way connectedness. In this case, except on the edges of the page, each CC that touches another CC at a boundary is either contained by that CC or contains that CC, and a CC can only be contained by a single other CC. An unambiguous containment hierarchy can be generated and represented in the form of a tree structure. Each successive layer of the tree contains CCs of opposite polarity to the previous, and each branch consists of a set of CCs that share a unique parent. Such a hierarchy is useful in grouping CCs as the hierarchy can be used to select subsets of CCs (those that share a unique parent), which are candidates to be grouped together. This is beneficial in terms of processing speed as fewer CCs need to be considered at a time and in terms of accuracy. CCs from different regions of the page may be on different branches of the tree and are not to be grouped together. Furthermore, processing of CCs can start at the top of the tree and can be terminated for branches of the tree below CCs of a certain classification (e.g. text) to further improve the processing time.

If the segmentation is not binary, an unambiguous hierarchy generally cannot be usefully generated. Consider the letter 'e' in FIG. 25(*a*). The outer boundary of this letter touches both the black background and the white triangle, so that either the background or triangle could be considered as a parent for this CC. The case of the triangle is even more complicated as its outer boundary touches the background and all of the letters. The benefits of using a hierarchy in grouping objects can be achieved despite this ambiguity. This is done by defining the characteristics of a parent-child relationship between two CCs that touch at a boundary, without requiring a unique parent for each child. For example, a parent-child relationship can be defined between two CCs if those CCs touch at a boundary and the bounding box of one of the CCs (the parent) completely encloses the bounding box of the second (the child). Using this definition for the example shown in FIG. 25(*a*), the triangle and all of the letters of the word 'text' would be defined as children of the background CC.

3. Layout Analysis

Layout analysis is the part of the system where foreground content of the page is identified. The middle (layout analysis) module takes as input from the front-end module a list of connected components and a "touching list". The output of the layout analysis is essentially a decision on which connected components represent foreground content (e.g. text, tables, bullet points) in the scanned image. The layout analysis is based on a colour segmentation, instead of a binary image. This has numerous benefits in terms of the sorts of foreground objects which it is possible to find, but there is no clear containment hierarchy like there is for binary images. For efficiency, the layout analysis only uses the bounding boxes and a few other general statistics for the connected components to base its grouping on. The layout analysis does not have access to the original pixel data or even the bit-level segmentation.

The main steps of the layout analysis are: forming a containment hierarchy based on the touching list, grouping CCs based on their bounding boxes and colours, and testing these groups to determine whether the CCs are well aligned like rows of text. The touching lists are used to provide a hierarchy for the CCs that is a multi-colour equivalent of a bi-level containment hierarchy. A given CC can be considered as the parent of a subset of its touching list elements. Specifically, the given CC may be a parent of those CCs which the given CC touches and whose bounding boxes are completely contained within the bounding box of the parent CC.

Figure 4:
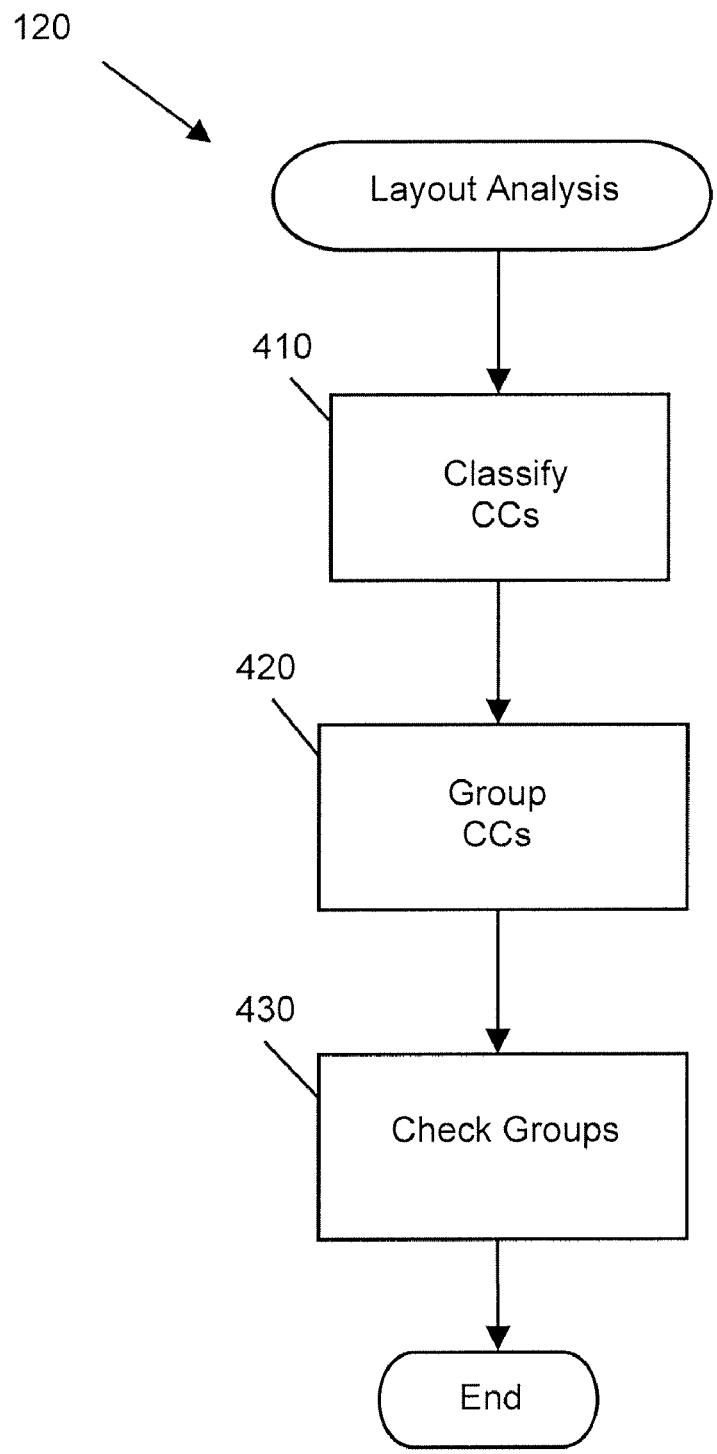
FIG. 4 is a flow diagram of the layout analysis step of FIG. 1.

FIG. 4 illustrates in detail step 120 of FIG. 1, which takes as input the compact CC information, statistics, and 'touching list' information generated by step 110. The touching list describes which CCs are next to each other—that is, which CCs share a boundary. The process of FIG. 4 does not have access to the input image. Part of this information is a list of all the CCs from the input image.

In step 410, the CCs are classified based on their statistics, so that a colour containment hierarchy is formed from the list of CCs. The colour containment hierarchy is a structure, where each node is a CC. A parent node has as its children the CCs that the parent node touches, and whose bounding boxes are completely contained within the bounding box of the parent CC. A child node may have more than one parent node. The analysis may be based only on the bounding box size and shape. CCs with a width and height both less than 1/100 of an inch (e.g. 3 pixels at a resolution of 300 dpi) are considered noise and removed. Connected components with a width or height above one inch, or with both width and height above 8/15 of an inch are classified as images. Everything else is classified as potential text. Alternative embodiments may include classifications related to other document layout features such as tables, the number of pixels in a connected component, and may use other values.

In step 420 potential text CCs are grouped together, representing areas of text. CCs are typically grouped with nearby CCs, and an efficient grouping algorithm takes advantage of this fact by finding the neighbouring CCs before determining grouping. The high resolution colour segmentation method used in the front end can find thousands of siblings that are considered for grouping on a typical scan document. In these cases, finding neighbouring CCs using a simple pair-wise comparison, an O(N2) method, can become slow, and a more sophisticated method of determining neighbours must be used. A triangulation may be performed on the nodes of the colour containment hierarchy. If the centres of the bounding boxes of the CCs on the page define nodes in a plane, an efficient triangulation method can be used for this purpose, such as Delaunay triangulation These methods are typically O(NlogN) processes.

Figure 53:
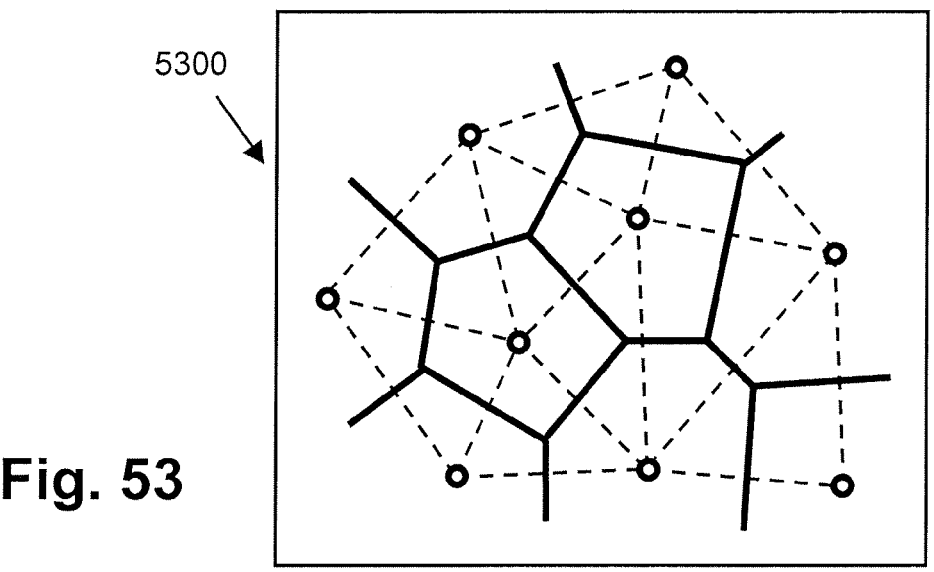
FIG. 53 is a diagram illustrating a Delaunay triangulation and a Voronoi diagram of set points.

FIG. 53 shows an illustration 5300 of the Delaunay triangulation (indicated by dashed lines) and Voronoi diagram (indicated by solid lines) of a set of nodes in a plane. The Voronoi diagram is a segmentation of the page into regions that are closer to a given point than any other. The Delaunay triangulation is the dual of the Voronoi diagram that can be generated by connecting points together that share a boundary in the Voronoi diagram. A typical point in a plane of randomly located points in the plane has around 5 points connected to it in this triangulation. These points can be considered as good candidates for neighbours in a grouping stage.

The triangulation output lends itself to a method of forming groups of CC. Those CCs that are adjacent in the Delaunay triangulation are grouped together based on a pair-wise comparison of their bounding boxes. This initial grouping is then followed by subsequent passes over the pairs of adjacent CCs to join these groups together, or place ungrouped CCs into existing groups. The process can also look for different types of grouping (text, table, etc) in a single pass through the data. Groups of text CCs are generally characterised by the following features: similar colour; similar size of bounding boxes; rough alignment along horizontal or vertical axis (depending on text alignment); and close together along axis of alignment relative to the size of the CCs.

In step 430, the groups of CCs are checked or verified to determine which groups of CCs are text characters. The information relating to the group contents and merging generated during the grouping stages is stored by a processor. The information relating to each individual group may be stored in a data structure that includes the colour, bounding box, and contents of a group. These structures are updated during the grouping stage when the contents of a group are changed. In an alternative embodiment, a group marker is included in the CC data structures and data such as group colour and bounding box can be reconstructed from the CC data. In step 430, the text character CCs are subjected to an alignment test as an extra check to ensure the CCs are text.

The groups formed generally include all of the text, but may also include parts of images, which are undesirable to classify as text. To reduce this problem, the groups are examined to see whether the connected components in the group are arranged in neat rows (or columns) like text, or randomly like noise or similarly coloured areas of an image tend to be.

This may be done mainly by forming four histograms of the bounding box edges, one for each side (i.e. left, top, right or bottom edges). One of these should have full bins where the baseline of the text is and be empty in other places. To check for this, the sum of the squares of the histogram bins may be found and compared to an expected value. If any of the four histogram bins are found to be much higher than would be expected for randomly arranged bounding boxes, the group is considered to be text. All four bounding box edges are used so as to allow for pages that are scanned in sideways or upside-down, or for text which is arranged in columns rather than rows.

3.1 Grouping CCs

Figure 20:
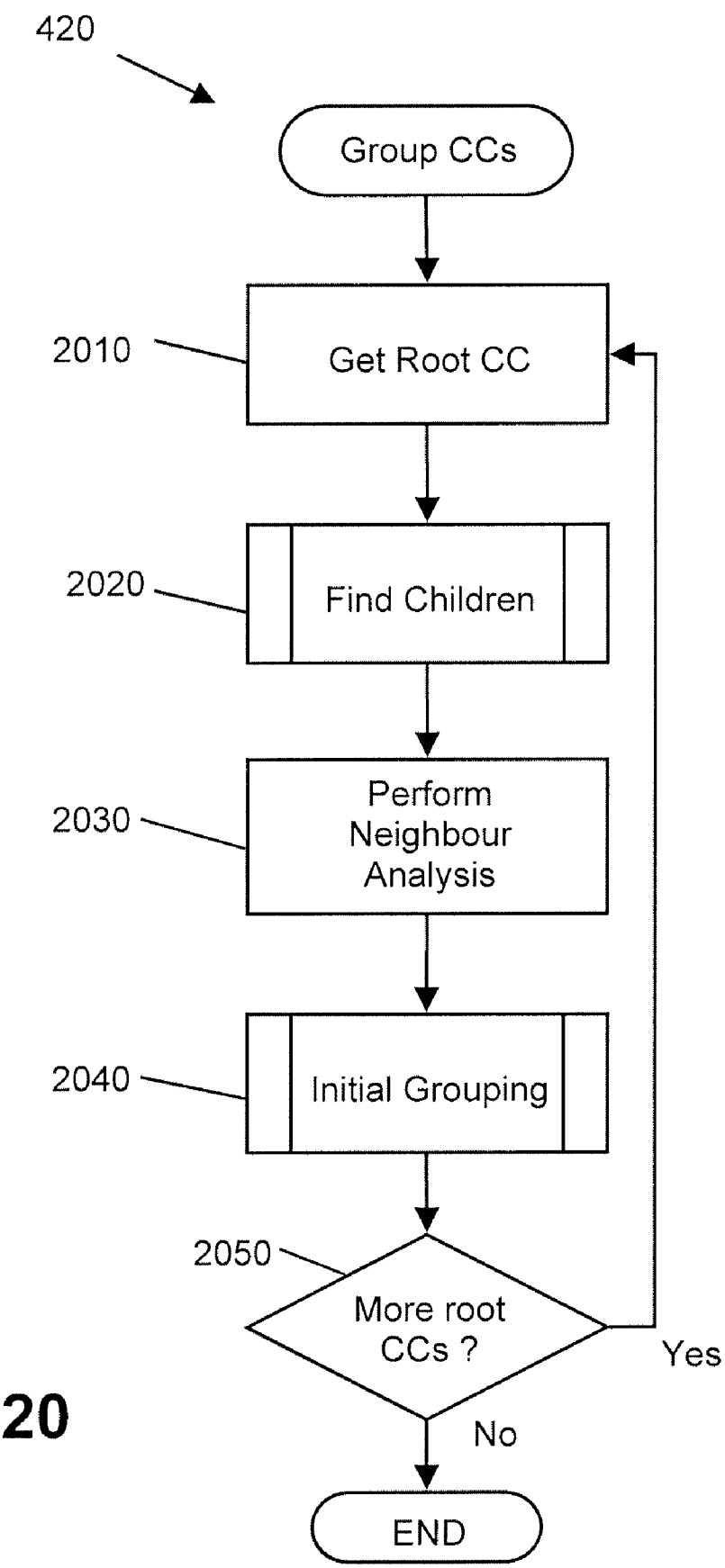
FIG. 20 is a flow diagram of grouping CCs step of FIG. 4.

FIG. 20 illustrates in detail the step 420 of FIG. 4 which groups the set of CCs segmented by step 110. The process begins at step 2010 by obtaining a root CC. A root CC is one which has not been merged into another CC during the colour segmentation stage. In step 2020, the children CCs of the root CC are found. A list of children CCs for this root CC is formed. The children may be defined as CCs whose bounding boxes are completely contained within the bounding box of the current root CC and that touch the bounding box at a boundary. Step 2020 is described in greater detail in relation to FIG. 22.

Figure 23:
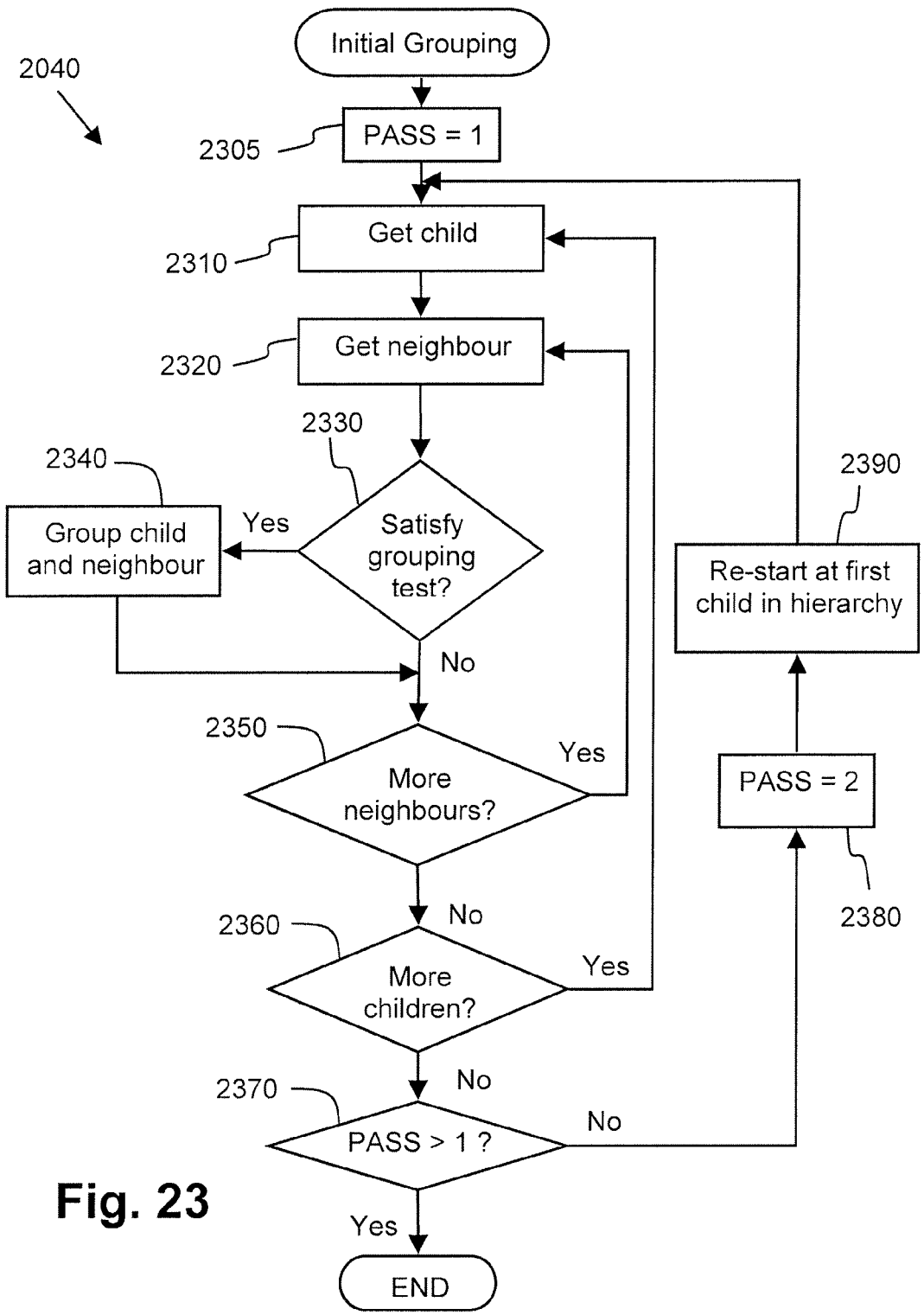
FIG. 23 is a flow diagram of the initial grouping step of FIG. 20.

From step 2020, processing moves to step 2030. In step 2030, a neighbour analysis on the children of the current CC is carried out. For each child, a set of neighbouring CCs are found which are close in some defined way. This may be achieved, for example, by finding the Delaunay triangulation of the centres of the bounding boxes of each child CC. The edges in the triangulation represent connections between neighbouring CCs. Alternative methods may use different elements of the bounding box data and colour information for the list of CCs to define proximity. In step 2040, the neighbour data is used to carry out an initial grouping. This processing step 2040 forms groups of objects of similar properties (e.g. geometry & colour) within the same child list to determine features of the document layout. FIG. 23 describes in further detail step 2040.

In decision step 2050, a check is made to determine if there are more root CCs remaining to be processed. If there are more root CCs, processing returns to step 2010, and the next root CC is obtained and subsequently processed. Otherwise, the grouping stage (420) terminates.

3.1.1 Finding Children for Parent CC

Figure 22:
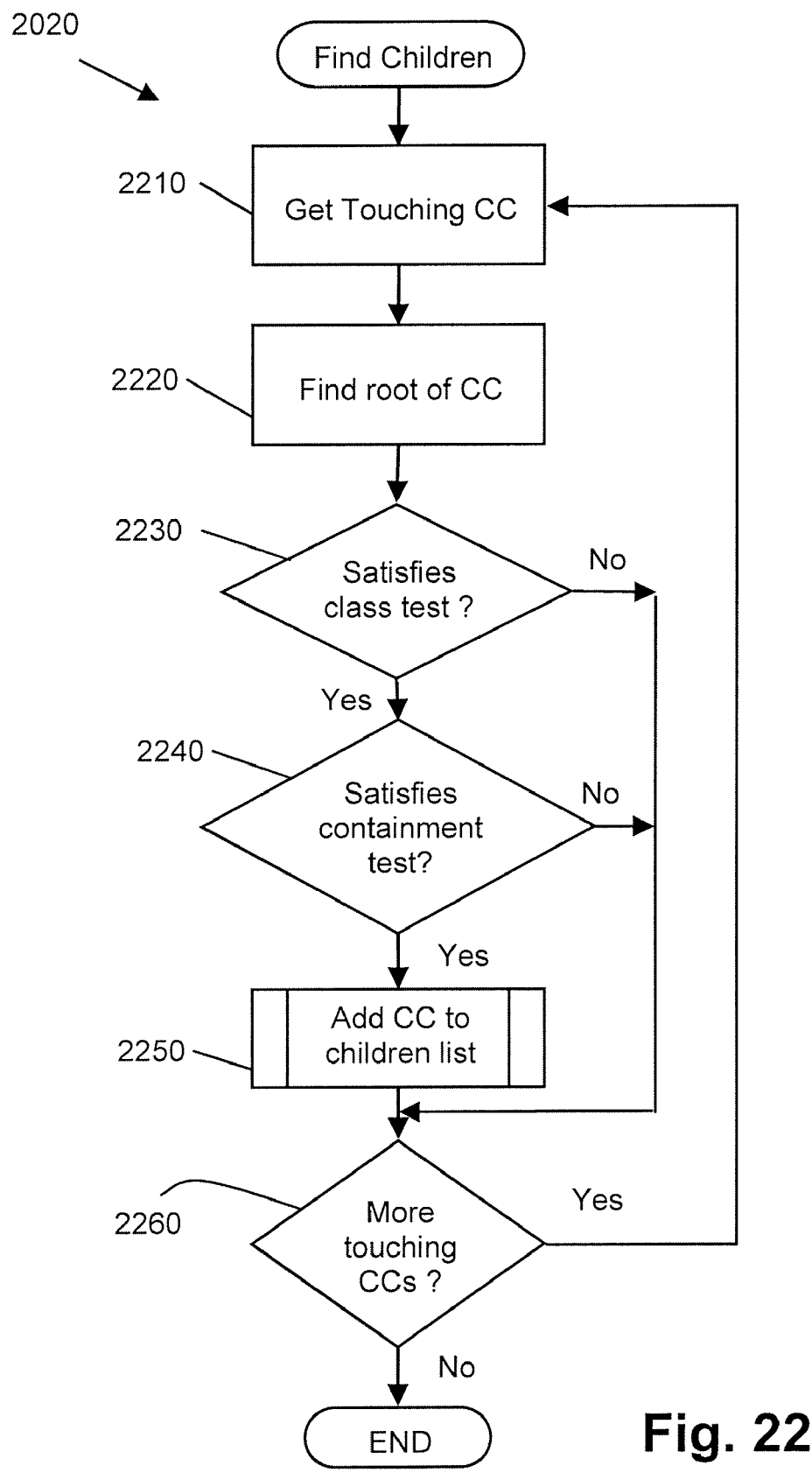
FIG. 22 is a flow diagram of the step of finding child CCs of a group of FIG. 20.

FIG. 22 illustrates the step 2020 of finding children CCs and forming the list of children for a given parent CC. In step 2210, a touching CC is obtained from the list of touching CCs of the parent CC. In step 2220, the root CC is found. This is done using any merging information from the colour segmentation stage associated with the touching CC. In decision step 2230, classification of the CC from step 410 of FIG. 4 is checked to determine whether the CC satisfies the class test (i.e., is it appropriate to store this CC in the child list). All CCs other than noise sized CCs may be stored, but alternative embodiments may store other combinations of classes, for example potential text only. If the class of the touching CC is appropriate, processing continues at step 2240. Otherwise, processing continues at step 2260. At decision step 2240, the CC is checked for containment with respect to the parent CC. The containment test involves checking that the bounding box of the CC is completely covered by the bounding box of the parent CC, but alternative methods are possible. If the containment test is satisfied, processing continues at step 2260. The CC can be included in the list of children in step 2250, processing then continues to step 2260. Any CC should only appear once in the list of children so that step 2250 includes a check that the CC is not already included in the list. This check may be carried out using a hash table. Processing then continues at decision step 2260. Step 2260 tests whether there are any more elements in the touching list of the parent. If so, processing continues at step 2210. Otherwise, the list of children for the current CC is complete and processing terminates.

3.1.2 Initial Grouping

Figure 26:
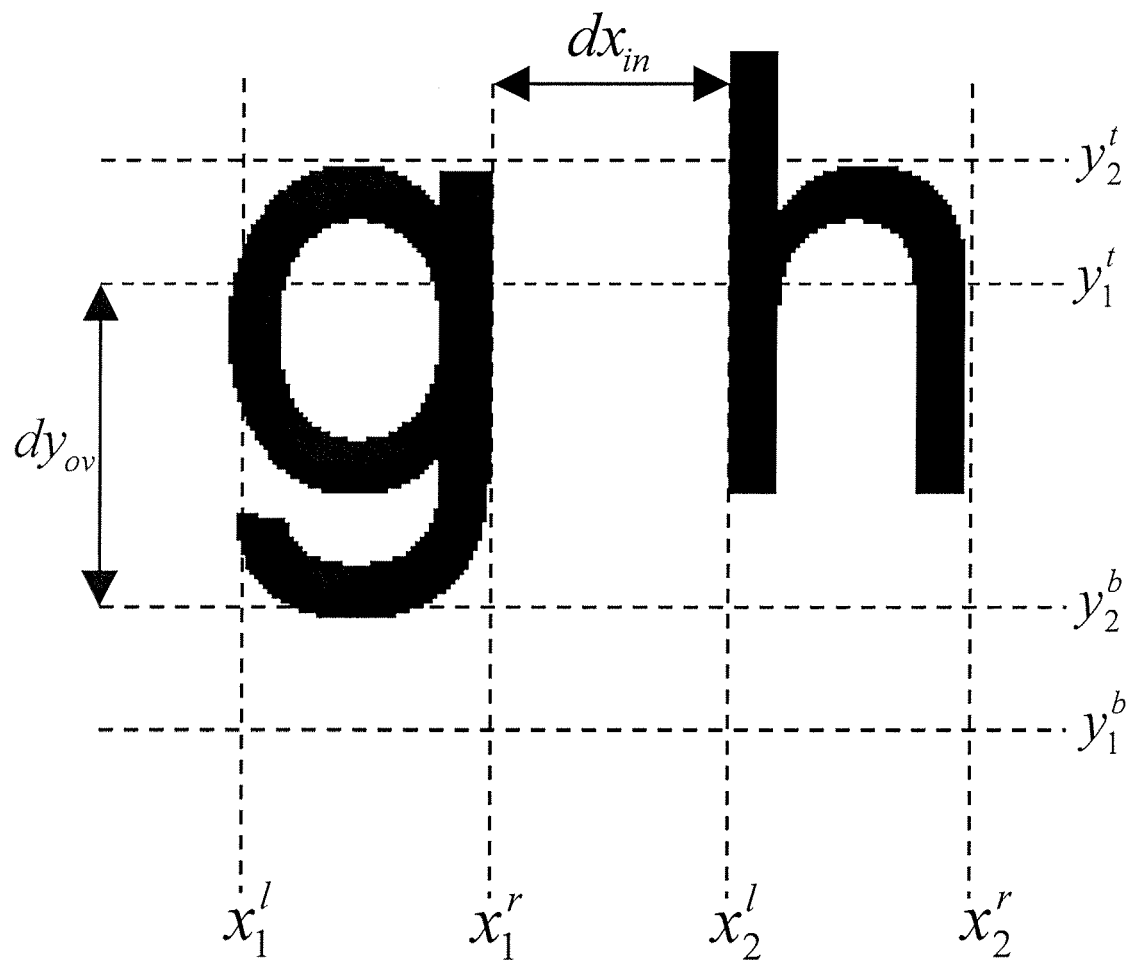
FIG. 26 is a graphical depiction of an area of a document containing two objects, the letters 'g' and 'h'.

FIG. 23 illustrates the step 2040 of FIG. 20 of initial grouping carried out using the neighbour data from step 2030 of FIG. 20. This method may be designed purely to group text, but in alternative embodiments, the method may also classify or group other document objects such as tables. The initial grouping may be a two-pass process in which the first pass joins CCs into groups and the second pass joins groups together into larger groups. In step 2305, the counter PASS is set to 1. In step 2310, a child is obtained. In step 2320, a neighbour of the child is obtained. At step 2330, a check is made to determine if the child and neighbour satisfy a grouping test. These objects are tested for grouping using a series of tests. The tests may be based on initial classification, geometry and colour, and are different between the first and second pass. FIG. 26 described hereinafter provides an extract of an area of a document with which the grouping test of step 2320 is explained.

Referring to FIG. 23, if the grouping test is satisfied, the child and neighbouring CCs are grouped together in step 2340. Processing then continues at step 2350. Otherwise, if step 2330 returns false, processing continues at step 2350. If two CCs are grouped together, each is marked as belonging to the same group. The group that the CCs are marked with depends on prior grouping of the two CCs. If neither is already grouped, a new group is formed containing both CCs. If only one of the two has already been grouped, the other CC is included in that group. If both have already been grouped and the groups are the same, no action is taken. Finally, if both have already been grouped and the groups are different, the two groups are merged into a single group, and the other group is marked as empty.

At step 2350, a check is made to determine if there are more neighbours of the current CC. If more neighbours exist, processing continues at step 2320. Otherwise, processing continues at step 2360. In step 2360, the process checks for more children of the parent CC. If more children exist, processing continues at step 2310. Otherwise, processing continues at step 2370. In step 2370, a test is conducted to determine if both passes are complete (PASS>1?). If this is the case, the process terminates. If only the first pass is complete, processing continues at step 2380 and the counter PASS is incremented. Processing continues at step 2390. In step 2390, processing returns to the start of the list of children. Processing then returns to step 2310 and the second pass starts.

In an alternative embodiment, the process 2040 loops through the edges of the triangulation data rather than pairs of child CC and neighbours. This is slightly more efficient as each pair of neighbours is considered only once.

3.1.2.1 Grouping Test for Two CCs

To illustrate the preferred grouping test for two neighbouring CCs, FIG. 26 shows a simple extract from an area of a document containing just two objects—the letters 'g' and 'h'. The dashed lines represent the coordinates of the bounding boxes for each letter. The coordinates are positioned at $x_i^l$, $x_i^r$, $y_i^t$ and $y_i^b$ for the left and right x coordinates and top and bottom y coordinates, respectively, of the $i^{th}$ CC. The subscripts 1 and 2 refer to the $1^{st}$ and $2^{nd}$ CC respectively (i.e. the letters 'g' and 'h'). The processing of this embodiment also uses the colour of each CC in YUV space, $[y_i, u_i, v_i]$, and the widths, $w_i$, and heights, $h_i$, of the bounding boxes.

The horizontal overlap distance for two CCs is defined as the length of the horizontal section covered by both of the CCs, or zero if the CCs do not overlap. The vertical overlap distance $dy_{ov}$ is defined analogously, and is illustrated in FIG. 26. The horizontal overlap is zero in FIG. 26 and so is not marked. The overlap distances can be expressed as follows:

$$dx_{ov} = \max(0, \min(x_1^r, x_2^r) - \max(x_1^l, x_2^l)),$$

$$dy_{ov} = \max(0, \min(y_1^b, y_2^b) - \max(y_1^t, y_2^t)). \quad (1)$$

The horizontal inner distance between two CCs is defined as the shortest distance between the left edge of one CC and the right edge of the other, or zero if the horizontal overlap distance is non-zero. The vertical inner distance is defined in the same way using the top and bottom edges of the CC. The horizontal distance $dx_{in}$ is illustrated in FIG. 26, while for this example the vertical inner distance is zero and not represented. These inner distances can be expressed as follows:

$$dx_{in} = \max(x_2^l - x_1^r, x_1^l - x_2^r, 0)$$

$$dy_{in} = \max(y_2^t - y_1^b, y_1^t - y_2^b, 0) \quad (2)$$

In the first pass, two neighbouring CCs are grouped together as text if those CCs meet the requirements of three conditions based on colour, size, and alignment. The colour condition is satisfied if:

$$\sqrt{(y_i - y_j)^2 + (u_i - u_j)^2 + (v_i - v_j)^2} < T_C, \quad (3)$$

where the threshold parameter may be $T_C = 500$.

The size test is satisfied if:

$$\max\left(\frac{w_{min}}{w_{max}}, \frac{h_{min}}{h_{max}}\right) > T_R, \quad (4)$$

where $w_{min}$ is the minimum width of the two CCs, $w_{max}$ is the maximum width, $h_{min}$ is the minimum height and $h_{max}$ is the maximum height. The threshold parameter may be $T_R = 0.55$.

The alignment condition is satisfied if either of the following conditions is met:

$$[(dx_{ov} > 0) \text{ and } (dy_{in}/\max(w_{min}, h_{min}) < T_S)],$$

or $$[(dy_{ov} > 0) \text{ and } (dx_{in}/\max(w_{min}, h_{min}) < T_S)], \quad (5)$$

The threshold parameter may be $T_S = 0.65$.

The second pass uses parameters based on groups rather than individual CCs. The mean colour, $[Y_i, U_i, V_i]$, width, $W_i$, and height, $H_i$, of the elements of each group may be used. For the case of an ungrouped CC, these values are set to the colour, width and height parameters for the individual CC. The test also uses the distance between the centres of the CCs being considered, D, which is defined as follows:

$$D = \sqrt{\left(\frac{x_1^l + x_1^r}{2} - \frac{x_2^l + x_2^r}{2}\right)^2 + \left(\frac{y_1^l + y_1^b}{2} - \frac{y_2^l + y_2^b}{2}\right)^2}. \quad (6)$$

As for the first pass, the groups are joined if a series of conditions are met. These conditions relate to colour similarity $T_c$, size $T_R$, and separation $T_o$, and are described by the following equations:

$$\sqrt{(Y_1 - Y_2)^2 + (U_1 - U_2)^2 + (V_1 - V_2)^2} < T_{Cg}, \quad (7)$$

$$\max(W_{min}/W_{max}, H_{min}/H_{max}) > T_R,$$

$$\min(W_{min}/W_{max}, H_{min}/H_{max}) > T_{R2},$$

$$D/\max(W_{min}, H_{min}) < T_D,$$

where the parameter values may be $T_{Cg}$=500, $T_R$=0.55, $T_{R2}$=0.3, and $T_D$=1 if either group contains 3 or less elements, and $T_{Cg}$=100, $T_R$=0.55, $T_{R2}$=0.3, and $T_D$=2 otherwise. No alignment test is used in the second grouping stage.

The thresholds may depend upon features of the CCs being tested for grouping, e.g., the pixel count of each CC.

3.2 Checking Groups

Figure 21:
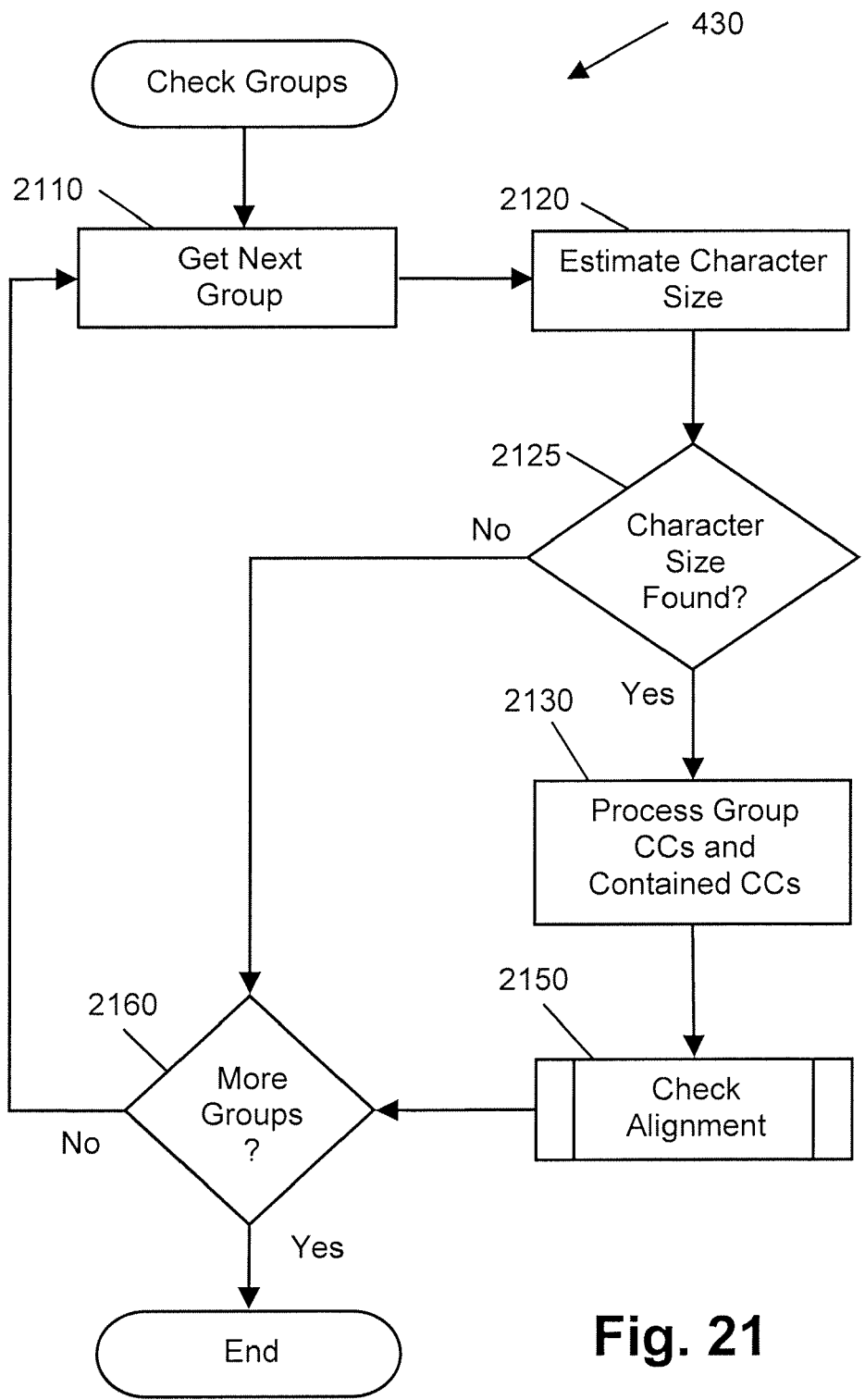
FIG. 21 is a flow diagram of the checking groups of CCs step of FIG. 4.

FIG. 21 illustrates in detail step 430 of FIG. 4 for checking groups. This process determines whether or not each group consists of text. This decision is made mainly on the basis of whether the objects in the group are found to be aligned in either rows or columns. Groups are assumed to be text, tested for text-like properties, and rejected if the groups fail those tests.

In step 2110, the next of the groups formed in step 420 is obtained. In step 2120, the size of the text characters in the group is estimated. The estimated size is based on the statistics of the lengths of individual characters. These lengths may be defined as the maximum of the width and the height of an object's bounding box. This measure is reasonably insensitive to skew and the alignment of text on the page and is also sufficiently uniform over the set of characters within a typical font of a given size. In alternative embodiments, bounding box area, pixel count and/or stroke width may be used as measures of the length. A histogram of character lengths may be formed, and the estimated size may be based on the largest length associated with a histogram bin with more than a threshold number of elements in the bin. The threshold used is at least 3 objects and at least 15% of the number of objects in the group. If no such bin exists, no estimate is returned.

In decision step 2125, a check is made to determine if the character size is found. If no suitable character size could be found, the group is rejected and processing continues at step 2160. Otherwise, processing continues at step 2130.

Step 2130 processes the CCs in a group and other suitable CCs that are contained within the bounding box of the group, but have not yet been allocated to any group. This process 2130 is beneficial for adding text that may have been missed by the original grouping and small objects such as punctuation marks that may have been omitted from the initial grouping based on classification. Only objects that share a parent with the objects in the group and are of a sufficiently similar colour may be added to the group. The colour similarity condition for the group and contained CCs is satisfied if the following condition is met:

$$\sqrt{(Y - y)^2 + (U - u)^2 + (V - v)^2} < T_{Cg2} \quad (8)$$

where [Y, U, V] is the colour of the group, [y, u, v] is the colour of the CC. The parameter value may be $T_{Cg2}$=500.

Alternatively, geometric tests may be applied in step 2130, and the requirement that the bounding box of the CC be fully contained by the bounding box of the group may be relaxed so that objects near to the group join the group. Other alternatives of the step 2130 may merge some objects to form characters. This is intended for scripts, such as Chinese, with complicated characters that may have been segmented as more than one separate object, and is beneficial in improving the accuracy of alignment tests later in processing. Two objects may only merge if their bounding boxes overlap. The merging is then limited to not occur if the merging would create an aspect ratio of more than 1.6, or create a merged object that is larger than the character size estimated in step 2120.

In step 2150, the alignment of objects within the group is checked. This test distinguishes text groups from other groups and is described in further detail below. Following this step, a test is carried out in step 2160 to determine whether there are more groups to process. If there are more groups, processing returns to step 2110. Otherwise, the process 430 ends.

3.2.1 Check Alignment

Figure 24:
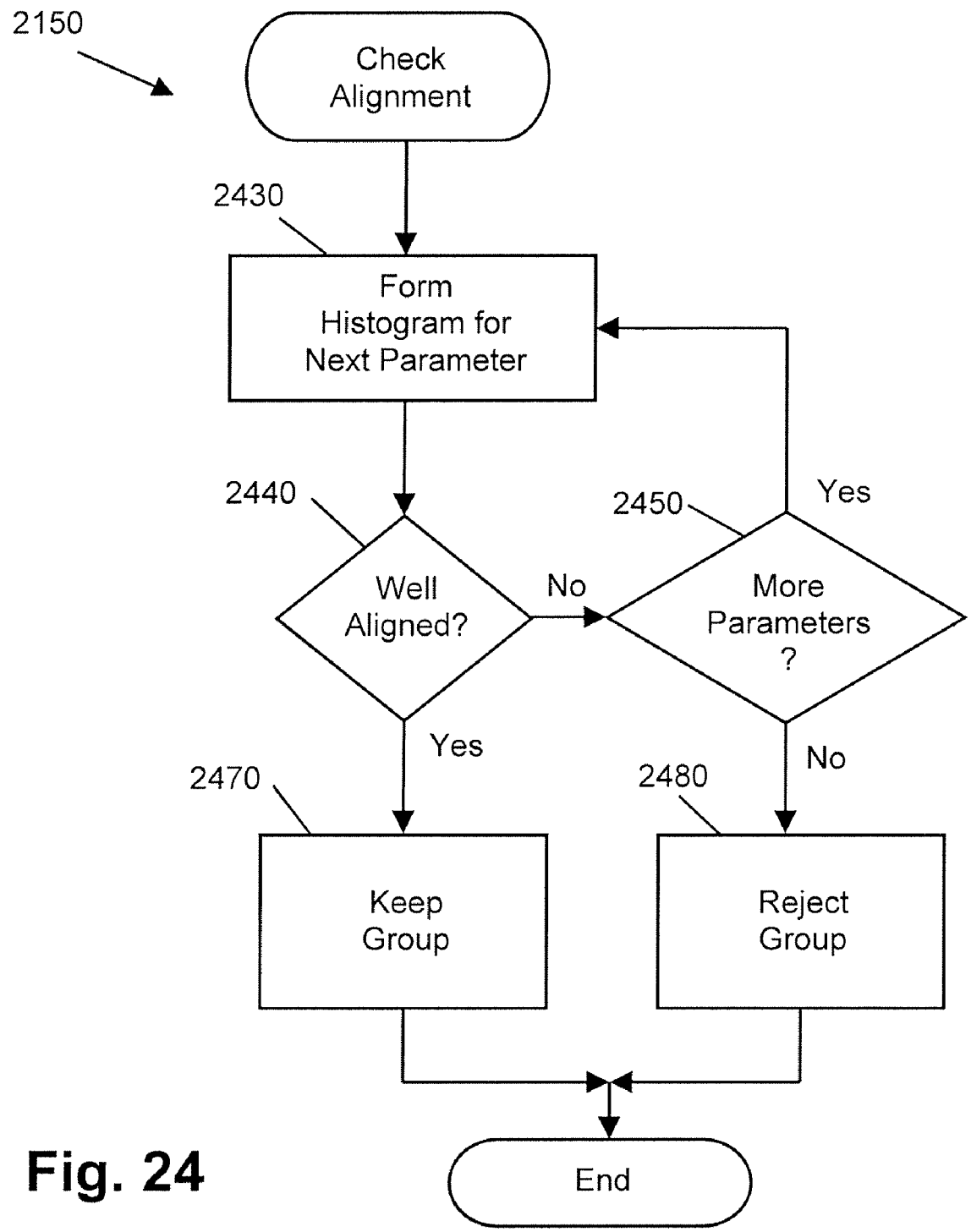
FIG. 24 is a flow diagram of the checking alignment step of FIG. 21.

FIG. 24 depicts in greater detail step 2150 of FIG. 21. During this step, a subset of the CCs in the group are defined as characters. Characters may be those objects that have a size more than half the character size estimated in 2120, and less than twice this size.

Steps 2430 to 2450 conduct acceptance tests for the group based on a histogram analysis of a sequence of parameters related to the group elements. These parameters are the left, top, bottom and right edge of each character's bounding box. Using multiple parameters allows text to be identified in a variety of alignments, since the alignment of text on the page depends on many factors such as the language and skew of text on the page. Alternatively, various combinations of the horizontal and vertical bounding box parameters may be used to identify a broader range of text alignments.

In step 2430, a histogram is formed for the group element values of the next parameter. The size of the bins in the histogram may be scaled according to the group character sizes. A value of ⅕ of the average height of the characters in the group (rounded up) may be used for top and bottom bounding box edges, and ⅕ of the average width of the characters in the group (also rounded up) may be used for left and right bounding box edges. The range of bins in the histogram is set so that all of the data are included with non-empty bins at each end of the range. The lowest value covered by the histogram may be set to the lowest value of the parameter in the group.

Decision step 2440 tests whether the values in the histogram are well aligned, forming discrete clusters (ideally representing baselines of different lines of text) rather than spread randomly. Step 2440 tests whether the number of characters in the group, N, is larger than a threshold, T with a preferred value of T=7.

For small groups (N<T), step 2440 examines three parameters AL1, AL2, and OV. AL1 is the count of the largest bin in the histogram. AL2 is the count of the second largest bin in the histogram. OV is the size of the largest subset of overlapping characters in the group. The pseudo-code in Table 2 describes the tests that are used for this group. The group passes the alignment test if the pseudo-code returns Y, and fails the test if the pseudo-code returns N.

TABLE 2

```
IF (N < 3)
    return N
ELSE IF (N == 3)
    IF (AL1 >= 2 and OV >= 3)
        return Y
    END
ELSE IF (N == 4)
    IF (AL1 >= 2 and OV >= 4 and AL2 >= 2)
        return Y
    ELSE IF (AL1 >= 3 and OV >= 4)
        return Y
    END
    ELSE IF (N == 5)
        IF (AL1 >= 4 and OV >= 5)
            return Y
        END
ELSE IF (N == 6)
    IF (AL1 >= 2 and OV >= 6 and AL2 >= 2)
        return Y
    ELSE IF (AL1 >= 4 and OV >= 6)
        return Y
    ELSE IF (AL1 >= 3 and AL2 >= 3)
        return Y
    END
ELSE IF (N == 7)
    IF (AL1 >= 2 and OV >= 6 and AL2 >= 2)
        return Y
    ELSE IF (AL1 >= 6)
        return Y
    ELSE IF (AL1 >= 3 and OV >= 4 and AL2 >=3)
        return Y
    END
END
return N
```

Figure 27:
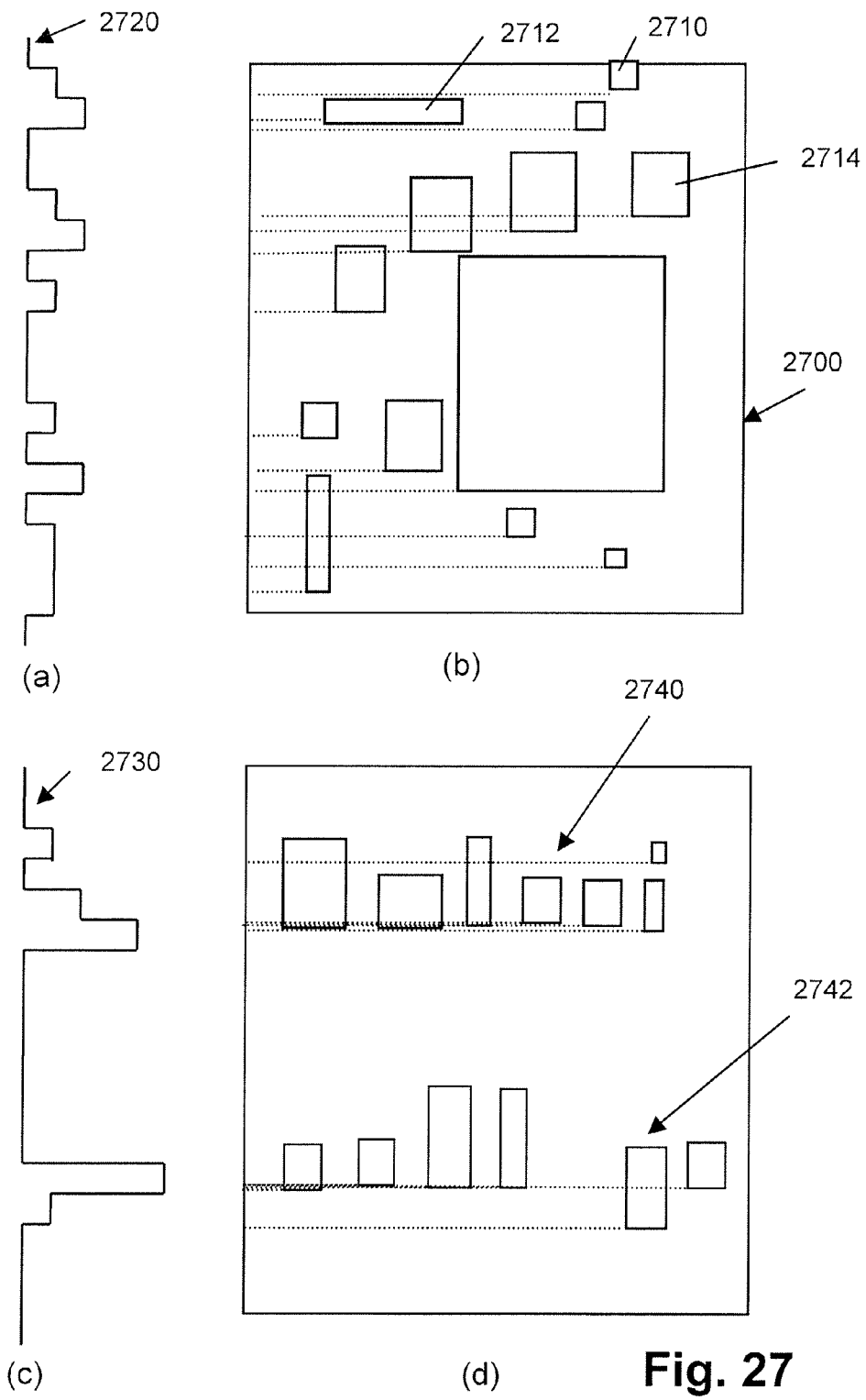
FIG. 27(a) shows a histogram of the values of the bottoms of the bounding boxes for an image of FIG. 27(b)
FIG. 27(b) shows a selection of irregularly arranged bounding boxes for parts segmented from an image.
FIG. 27(c) shows a corresponding histogram for the page of FIG. 27(d)
FIG. 27(d) shows an arrangement of bounding boxes on a page for a text group.

For large groups, a test is done comparing the sum of the squares of the histogram bins to the expected value for randomly arranged CCs within the group. The equation for this test is given below:

$$\sum_{i=1}^{m} h_i^2 \geq 2 \times \left(n + \frac{n(n-1)}{m}\right),$$

where m is the total number of histogram bins, n is the total number of characters, and $h_i$ is the population of the ith bin of the histogram. The term on the right-hand side of the equation is twice the expected (mean) value, and approximates, for large enough m and n, the value for which there is a 0.1% chance of randomly arranged characters being accepted. An example of this processing is shown in FIG. 27, described hereinafter.

Referring to FIG. 24, if the group is accepted according to the test, and processing continues at step 2470. In step 2470, the group is kept, alignment checking finishes. Processing then terminates. Otherwise, if step 2440 returns false (N), processing continues at step 2450. Decision step 2450 checks whether there are more parameters to test. If there are, processing continues at step 2430 for the next parameter. Otherwise, if all parameters have been tested, processing continues at step 2480, where the group is rejected. Processing then terminates.

The foregoing description discloses testing based on one parameter at a time and rejecting exactly those groups that fail every test. However, in view of this disclosure, it will be apparent to those skilled in the art that alternative ways of combining tests for different parameters may be practiced without departing from the scope and spirit of the invention, such as accepting groups which are nearly well enough aligned in two different but similar parameters (such as the top and bottom edges of the bounding boxes), or creating an overall score for the group based on many parameters.

3.2.2 Alignment Example

FIG. 27(b) shows a selection of irregularly arranged bounding boxes 2710, 2712, 2714, . . . as might result from parts segmented from an image 2700. FIG. 27(b) shows randomly arranged connected components. FIG. 27(a) shows the histogram 2720 of the values of the bottoms of the bounding boxes for this image. FIG. 27(d) shows the arrangement of bounding boxes 2740, 2742 on the page for a text group that has well aligned connected components, and FIG. 27(c) shows the corresponding histogram 2730. As depicted, the histogram 2730 for the text has a few large clusters of values, while the other histogram 2720 has more evenly spread values. Using the sum of squares of histogram bin values as the measure, FIG. 27(a) gives a value of 19, and FIG. 27(c) gives a value of 47. The term on the right hand side of the acceptance test above for m=19 and n=13 is 45. According to this test therefore, the image data of FIG. 27(b) is rejected, while the text data of FIG. 27(d) is accepted. Alternatively, the acceptance test may be based on other statistics, such as the total number of values that are in bins of significantly larger than average count.

4. Generating Compressed Output Image

The back end module uses inpainting to make the background image more compressible, by painting over the foreground areas with an estimated background colour. The inpainting is preferably performed on background images at a lower resolution (e.g., 150 dpi). The inpainting algorithm is a single pass, tile based algorithm and seeks to enhance compressibility. The colour of each pixel is chosen by interpolating from surrounding pixels to the left and right instead of using one average colour for a large area.

The algorithm performs the following steps: 1) combine the masks for all the foreground components to make one foreground mask for the tile; 2) dilate the mask so that a small additional area around the foreground components is inpainted; 3) in raster order over the tile:
a. If the pixel is not masked, update the tile's activity; and
b. If the pixel is masked, paint the pixel with a colour interpolated from the colours of the nearest non-masked pixels to the left and right;
4) if the activity of the non-masked areas is below a certain threshold, paint the whole tile with the mean colour of the non-masked pixels (this gives improved compression with ZLib compressed JPEG); and 5) if the whole tile is masked, paint the whole tile with the mean colour of the previous tile. Step 2) above eliminates bleeding effects and improves compression as well as sharpens the output quality.

Figure 5:
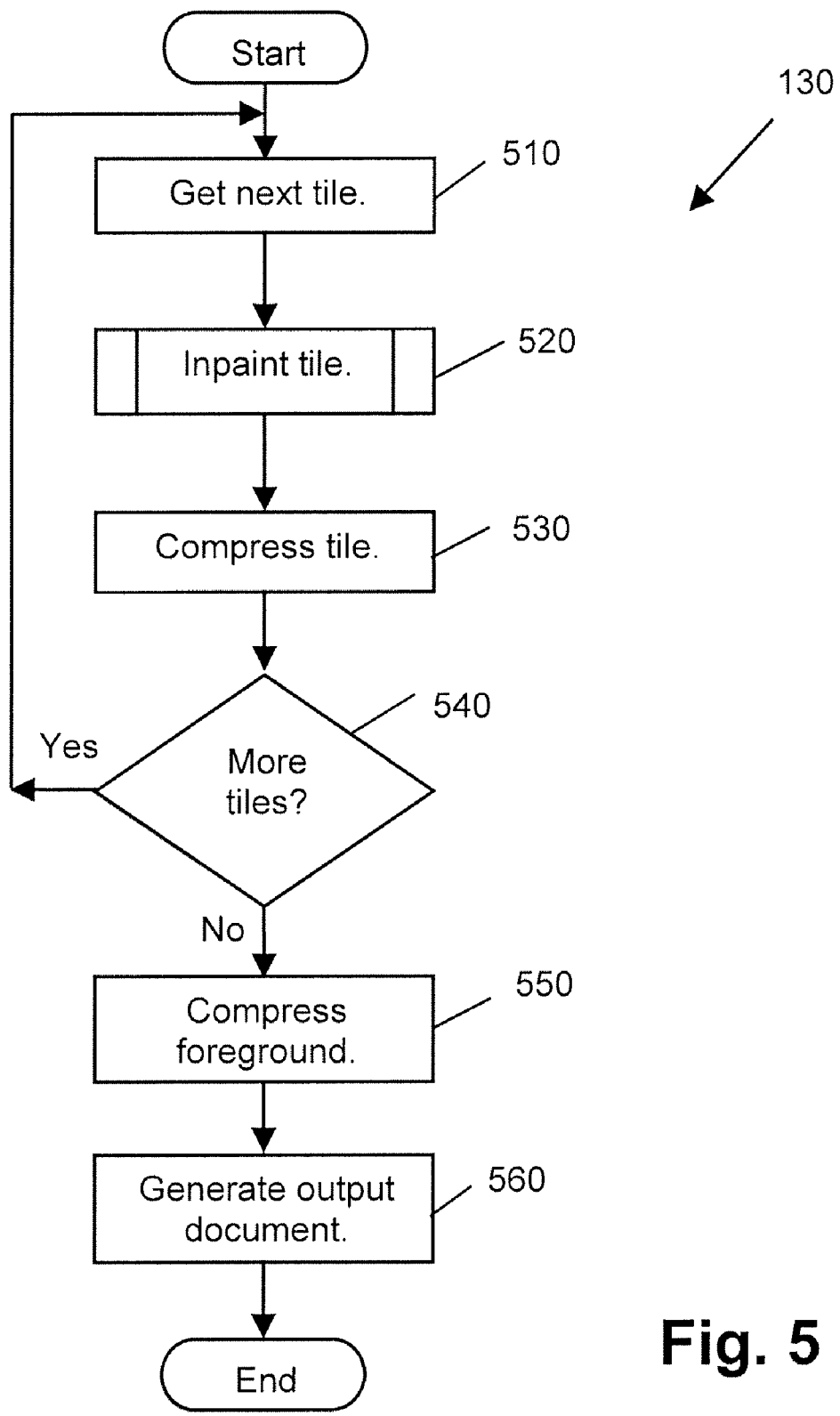
FIG. 5 is a flow diagram of the step of generating a compressed output image of FIG. 1.

FIG. 5 illustrates in detail step 130 of FIG. 1. Steps 510 through 540 use a tile-based processing system similar to that described in FIGS. 2 and 3. In step 510, the next tile to be processed is obtained. In step 520, an inpainting process is performed on the current tile to remove any foreground CCs as identified in step 120 of FIG. 1 and flatten any tiles which appear visually close to flat. In step 530, the current tile is compressed. This may be done using JPEG in the YCrCb colourspace with the 2 chrominance channels subsampled by 2:1 horizontally and vertically. The tiles of the reduced resolution background image each comprise 16×16 pixels, which means that those pixels can be encoded directly into four 8×8 pixel JPEG blocks for the Y channel and one 8×8 JPEG block for each of the Cr and Cb channels without any buffering required between tiles.

In step 540, a check is made to determine if there are more tiles to process. If there are any more tiles to inpaint and compress, processing returns to step 510. Otherwise, processing continues at step 550. In step 550, the foreground is compressed, which involves compressing the foreground elements identified in step 120. The foreground elements are grouped according to colour and one binary image at the full input resolution is created for each similarly coloured group of foreground elements. Each image created may then be encoded in CCITT G4 Fax if the image is large enough that the encoding produces a compression advantage in the output document.

In step 560, the output document is generated. The compressed background and compressed foreground images are stored in a compound compressed format. This format may be a PDF document, for example. The JPEG encoded background image may be further compressed using Flate (Zlib) compression. This gives a significant space saving on JPEG images containing a large number of repeated flat blocks as produced by steps 520 and 530. The composite document may be written containing the Flate and JPEG compressed background images, and a page description containing details of the size, position, order and—in the case of the binary foreground images—the colour to render each of the images on the page.

4.1 Inpaint Tile

Figure 30:
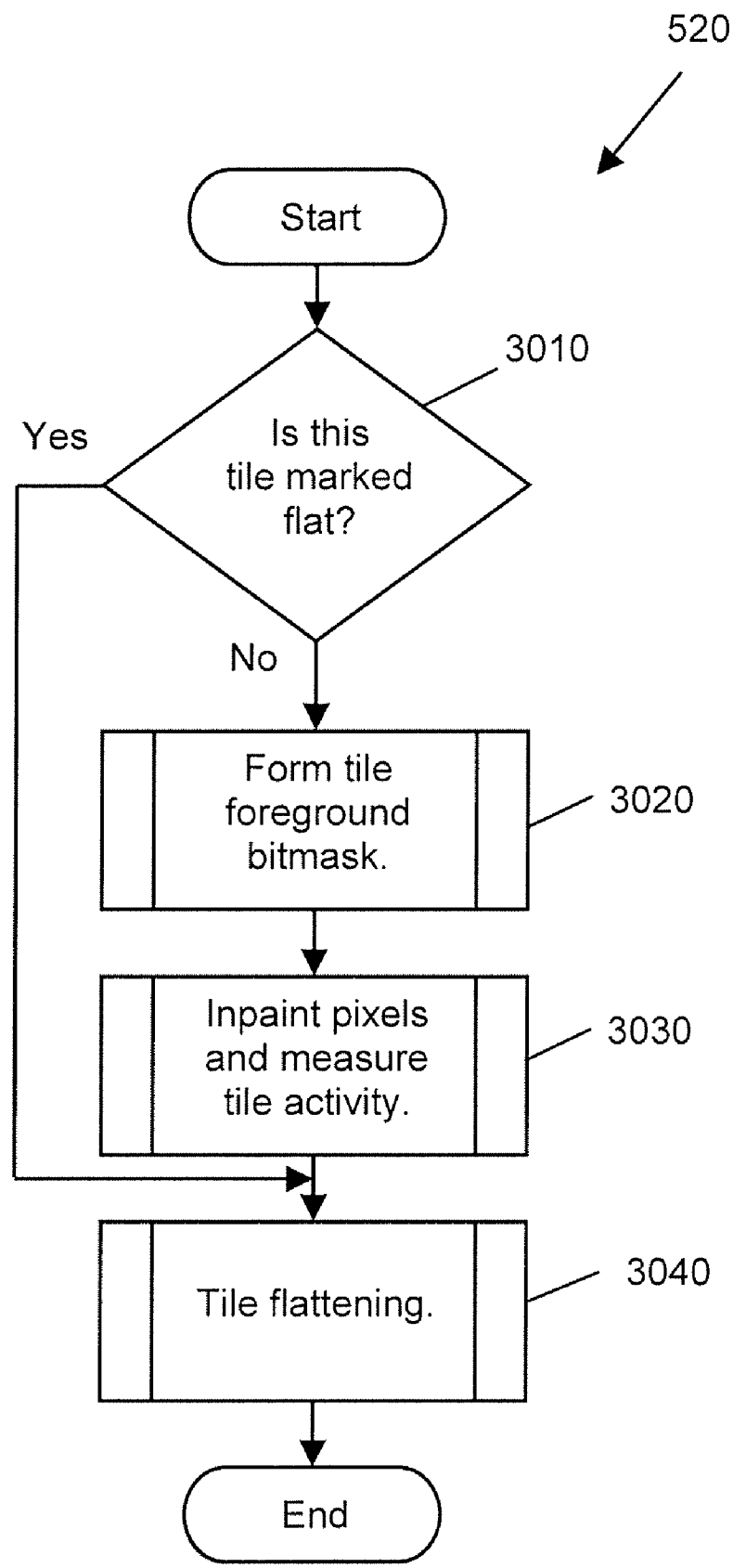
FIG. 30 is a flow diagram of the step of inpainting a tile of FIG. 5.

FIG. 30 illustrates in detail step 520 of FIG. 5. This process modifies the downsampled background image to increase compressibility and enhance the sharpness of the foreground CCs by removing foreground CCs from the background and flattening image tiles with low visible activity. A small area surrounding the foreground CCs is also inpainted to remove bleeding effects to enhance the image and increase compressibility.

The process 520 shown in FIG. 30 removes the selected foreground CCs from the low resolution background by painting the CCs out with colours estimated by interpolating between the colours of pixels to the left and right of the foreground CC. This increases compressibility. A small area around the outside of the CC is also inpainted to increase further compressibility and to enhance the appearance of the image. Compressibility is increased still further by identifying tiles of the background image which have low visible activity and setting all their pixels to the same colour.

The input to the process of FIG. 30 is the downsampled background image created in step 250 of FIG. 2, the list of CCs from step 240 of FIG. 2, and the foreground or background selection information from step 120 of FIG. 1. In step 3010, the tile is checked to see if the tile is marked as being 'flat'. If so, processing continues at the tile flattening step 3040. Otherwise, processing continues at step 3020, where a full resolution foreground bitmask is formed for the tile. This has a bit set in every location that corresponds to a foreground CC. In step 3030, the areas in the background image corresponding to the foreground CCs and a small area around them are removed by inpainting over them with colours interpolated from the colours of pixels to the left and right of the CC. The activity of the non-inpainted pixels in the tile is also measured. In step 3040, the entire tile is flattened to a constant colour if the tile activity is found to be low enough to be visually flat. Processing then terminates.

4.1.1 Form Tile Foreground Bitmask

Figure 31:
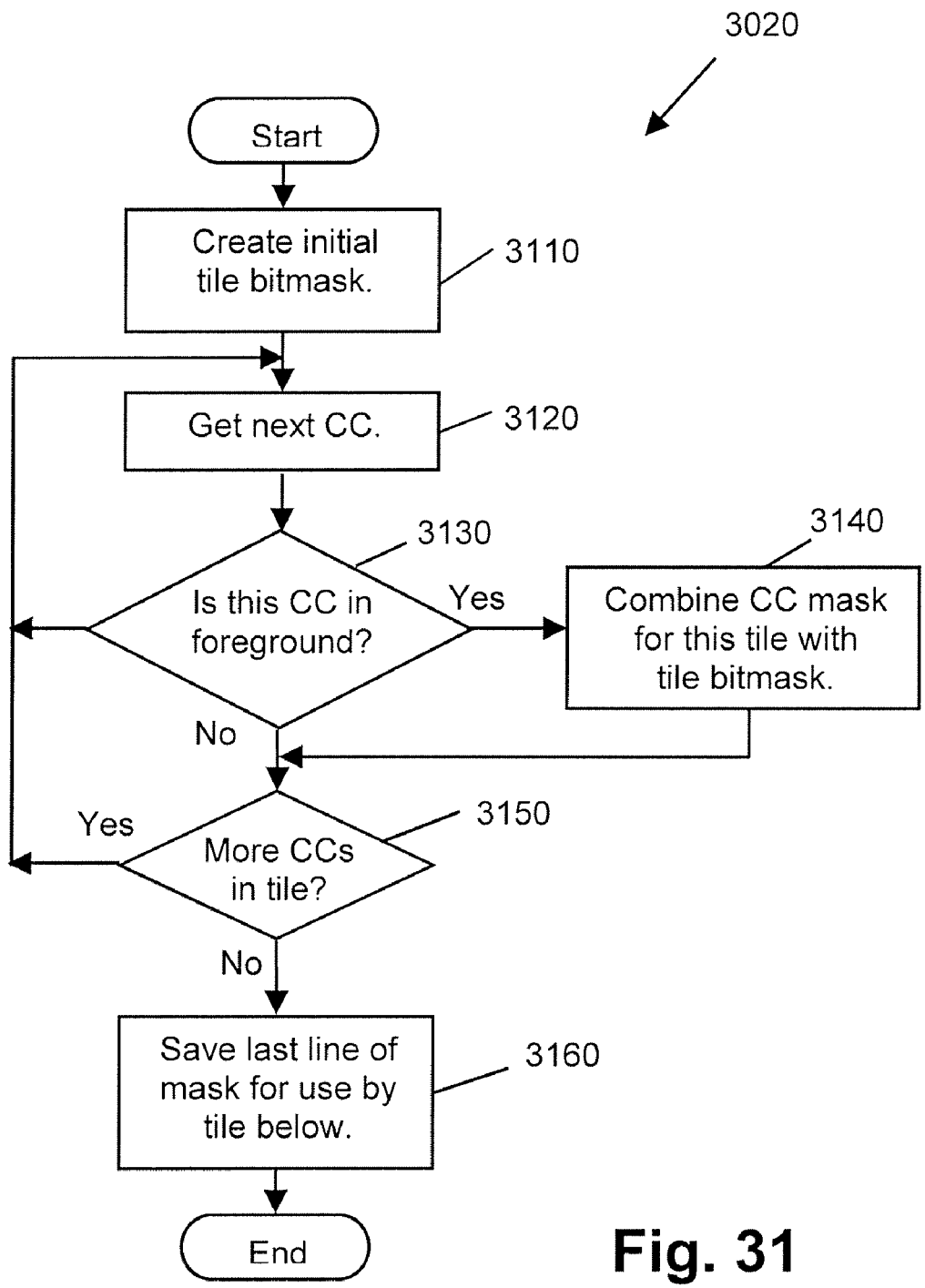
FIG. 31 is a flow diagram of the step of forming a tile foreground bitmask of FIG. 30.

FIG. 31 illustrates in greater detail step 3020 of FIG. 30 for forming a tile foreground bitmask. In step 3110, an initial bitmask for the tile is created. This bitmask is the same width as the tile and one row taller than the tile. The first row of this bitmask is set to be the same as the last row of the tile above unless this tile is in the first band of the document in which case the first row of the bitmask is set to be blank. This allows the inpainted area to extend below foreground CCs that have a bottom edge that aligns with a tile boundary.

In step 3120, the next CC in the tile is obtained. In step 3130, the CC is checked to determine if the CC is a foreground CC (in step 120). If the CC is a foreground one, processing continues at step 3140. Otherwise, processing continues at step 3150. In step 3140, the bitmask corresponding to this CC and the current tile is combined with the tile bitmask created in step 3110, using a bitwise OR function. Processing then continues at step 3150. In step 3150, a check is made to determine if there are more CCs in the current tile. If so, processing returns to step 3120. Otherwise, if all the CCs in the tile have been processed, the result of step 3150 will be No and processing continues at step 3160. In step 3160, the last line of the mask formed is saved so that it can be used by step 3110 when processing the tile directly below this one on the page. The bitmask created in the process 3020 of FIG. 31 is at the full resolution of the input image.

4.1.2 Inpaint Pixels and Measure Tile Activity

Figure 32:
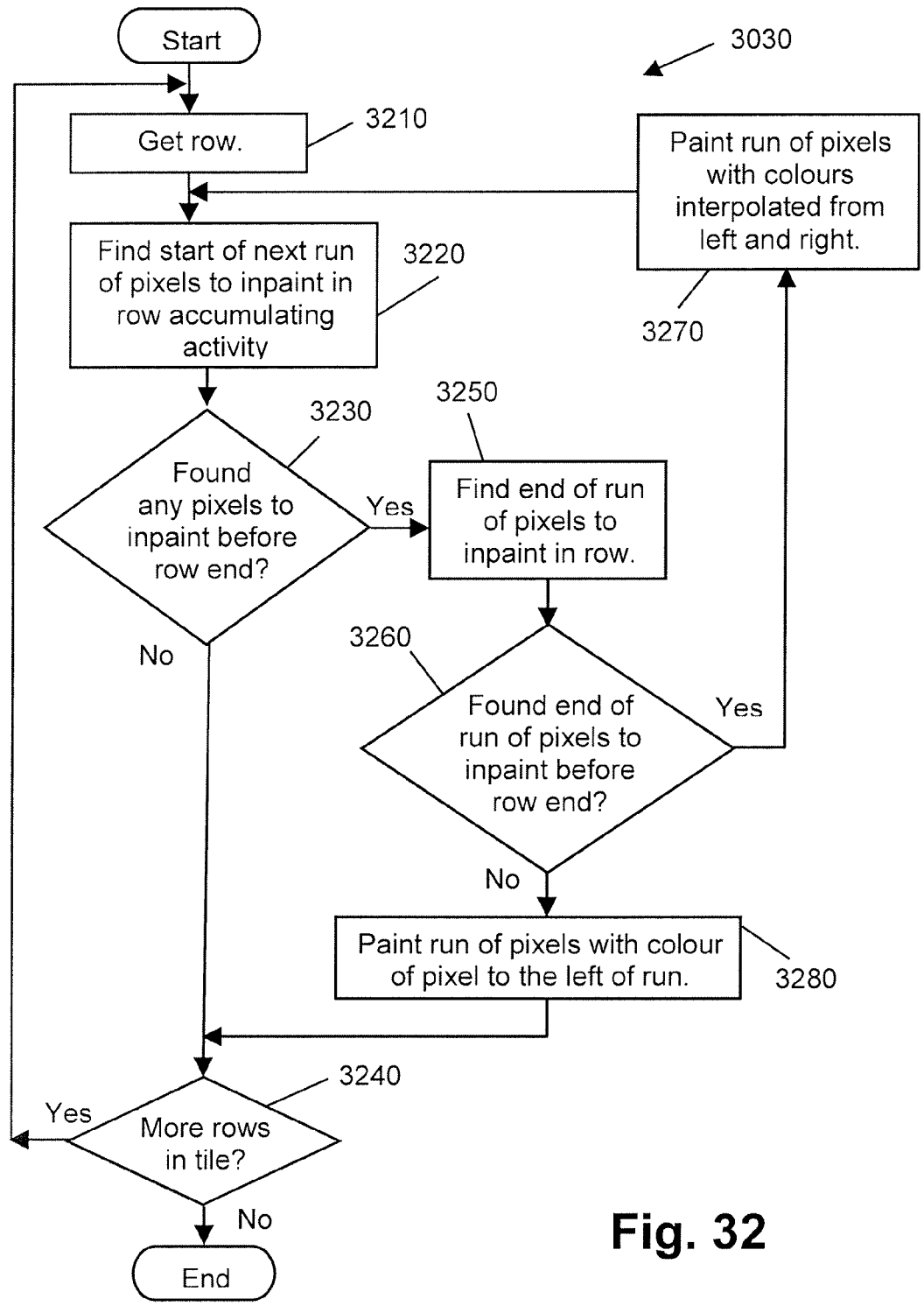
FIG. 32 is flow diagram of the step of inpainting pixels and measuring tile activity of FIG. 30.

FIG. 32 illustrates in greater detail step 3030 of FIG. 30. Each pixel is examined in raster order until one that should be inpainted is found marking the start of a run of pixels to inpaint. Subsequent pixels are examined until the end of the run of pixels to inpaint is found. The horizontal run of pixels is then painted with colours interpolated linearly between the colours of the pixels to the left and right of the inpaint run.

Figure 34:
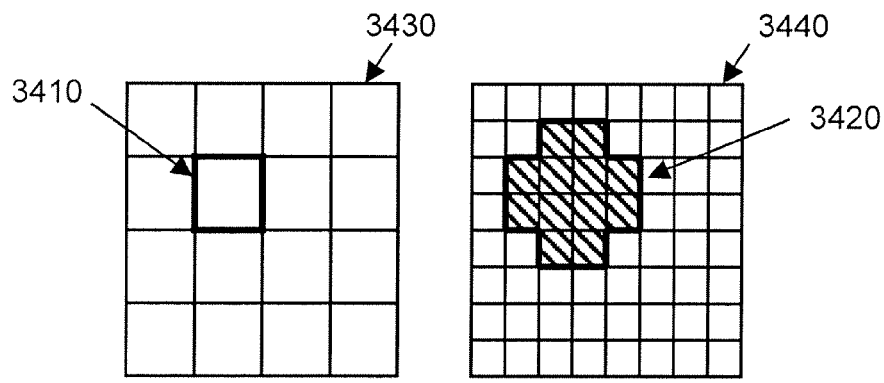
FIG. 34 is a block diagram of an example pixel in a background image tile and a corresponding pixels examined in a full-resolution foreground mask.

Referring to FIG. 32, step 3210 gets a row of the tile. In step 3220, the start of the next run of pixels is found in terms of accumulated pixel activity of row. Each pixel in the row is examined in raster order and the pixel activity in the tile is accumulated until a pixel is found that should be inpainted. The pixel activity of the non-inpainted pixels is recorded by accumulating the pixel values and the squares of the pixel values and keeping a count of the number of pixels measured. To decide whether each pixel should be inpainted, the pixel location is compared with the corresponding locations in the tile foreground bitmasks created in step 3020 of FIG. 30. As the tile bitmask is at twice the resolution of the background image, there are 4 pixels in the mask corresponding to the area covered by one pixel in the background image. Also to improve compression and remove the bleeding edge effect from foreground CCs, a small additional area around the edge of foreground CCs is inpainted. To do this, 8 pixels in the full-resolution foreground mask are examined to decide whether to inpaint the current background pixel. FIG. 34 shows an example pixel 3410 in the background image tile 3430 and the corresponding full resolution mask pixels 3420 which are examined. If any one of these 8 pixels indicated by 3420 is set in the mask 3440, i.e. corresponds to the location of a foreground CC, the pixel 3410 is inpainted. Since the bitmask 3440 is stored as an array of bit-vectors, these 8 pixels 3420 can be checked quickly using a bitwise AND operation. Alternatively, this may be implemented by dilating the set pixels in the bitmask 3420 and then downsampling. The colour of the last examined pixel that is not inpainted on each row is recorded and made available when processing the next tile to the right so that the colour can be used as an interpolation value if the first pixel in the same row of the next tile is to be inpainted.

Referring to FIG. 32, in decision step 3230, a check is made to determine if any pixels to inpaint have been found before the row's end. If a pixel to inpaint has been found, processing continues at step 3250. Otherwise, processing continues at step 3240. In step 3250, the remaining pixels in the row are examined in raster order to find the end of the run of pixels that should be inpainted in the row. The same test is used here to determine whether a pixel should be inpainted as the test used in step 3220. In step 3260, a check is made to determine if the end of the run of pixels to inpaint has been found before the row's end. If the end of the run of pixels to be inpainted is found before reaching the end of the row, processing continues at step 3270. In step 3270, each pixel in the run of pixels to be inpainted is set to a colour interpolated linearly between the colours of the nearest non inpainted pixels to the left and right. If the run of pixels to inpaint extended to the left hand edge of the tile, the last value saved for the same row in the previous tile is used as the left interpolation value. Processing then continues at step 3220, and the next run of pixels to inpaint is searched for. If in step 3250 the end of the row is reached without finding any pixels which should not be inpainted, the decision step 3260 directs processing to continue at step 3280. In step 3280, each pixel in the run of pixels to be inpainted is set to the value of the nearest non-inpainted pixel to the left, which may be a value saved for the same row in a previous tile. After step 3280, processing continues at step 3240.

In step 3240, a check is made to determine if there are more rows in the tile to process. If there are more rows in the tile, processing continues at step 3210. Otherwise, processing ends if there are no more rows.

4.1.3 Inpainting Examples

FIG. 35 shows some one dimensional inpainting examples. Before and after plots are provided for two examples 3510, 3520, where pixel intensity is plotted as a function of position X. In the first example 3510, the run of pixels to inpaint is completely within a tile, and the inpainted pixel values (indicated by diagonal hatching) are replaced with values interpolated linearly between the non-inpainted pixel values to the immediate left and right. The inpainted area is slightly larger than the foreground component to remove any bleeding effect; this is depicted as the dilated mask area. The colour to inpaint each pixel is found by interpolating between the non-masked pixel colours to the left and right. In the second example 3520 of FIG. 25, the run of pixels to inpaint crosses a tile edge 3530. When processing the left hand tile, the values of the pixels to be inpainted are replaced with the value of the non-inpainted pixel to the immediate left. When processing the right hand tile of the example 3520, the inpainted pixel values are set to values interpolated linearly between the last recorded non-inpainted pixel value for this row and the first non-inpainted pixel value to the right.

4.1.4 Tile Flattening

Figure 33:
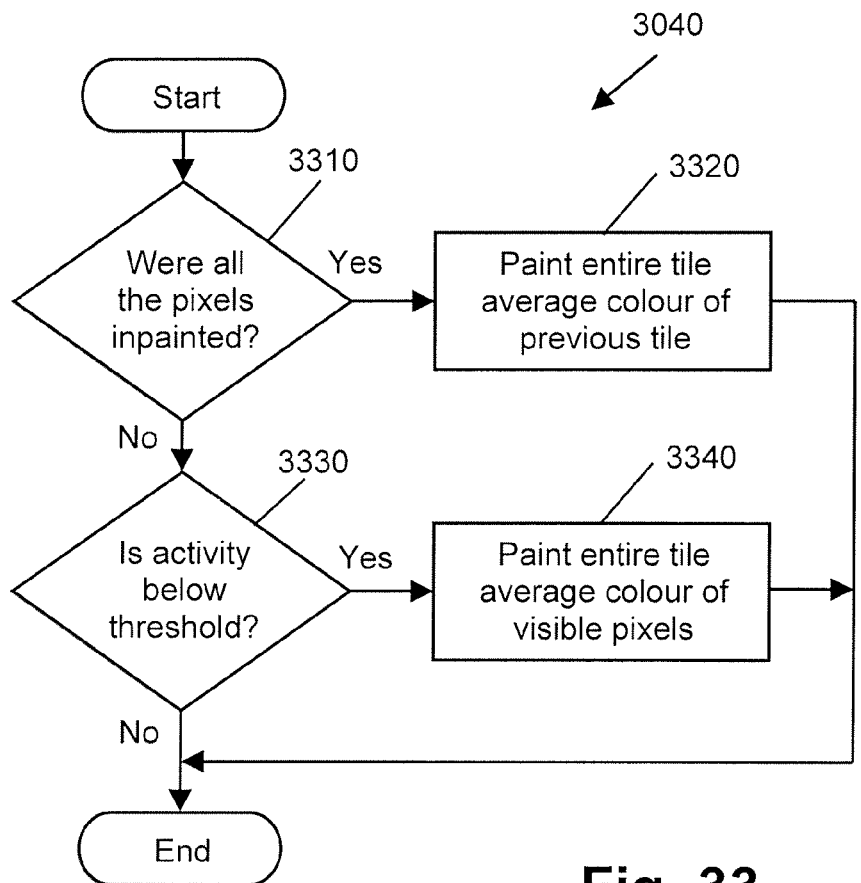
FIG. 33 is a flow diagram of the step of tile flattening of FIG. 30.

FIG. 33 depicts in greater detail step 3040 of FIG. 30. In decision step 3310, a check is made if all the pixels have been inpainted. In particular, the number of pixels that were inpainted as recorded in step 3220 is checked. If all the pixels in the tile were inpainted, the visible area of the tile is deemed to be low and processing continues at step 3320. In step 3320, all the pixels in the current tile are painted (set) to the mean colour of the previous tile in raster order. This significantly increases the compressibility of the background image when a block based compression technique like JPEG is used. Processing then terminates. If step 3310 determines that not all of the pixels in the tile were inpainted, processing continues at decision step 3330. In step 3330, the activity of the non inpainted pixels as measured in step 3220 is checked against a predetermined threshold. If the activity is found to be less than this threshold, the activity visible area of the tile in the reconstructed image is deemed to be close to flat. In this case, processing continues at step 3340 and the tile is made completely flat by painting all the pixels in the tile the mean colour of the non-inpainted visible pixels in the tile. This significantly increases the compressibility of the background image. The process of FIG. 33 ends after step 3340, or after step 3330 if the activity in the tile is found to be higher than the threshold.

5. Hardware Embodiment

Figure 51:
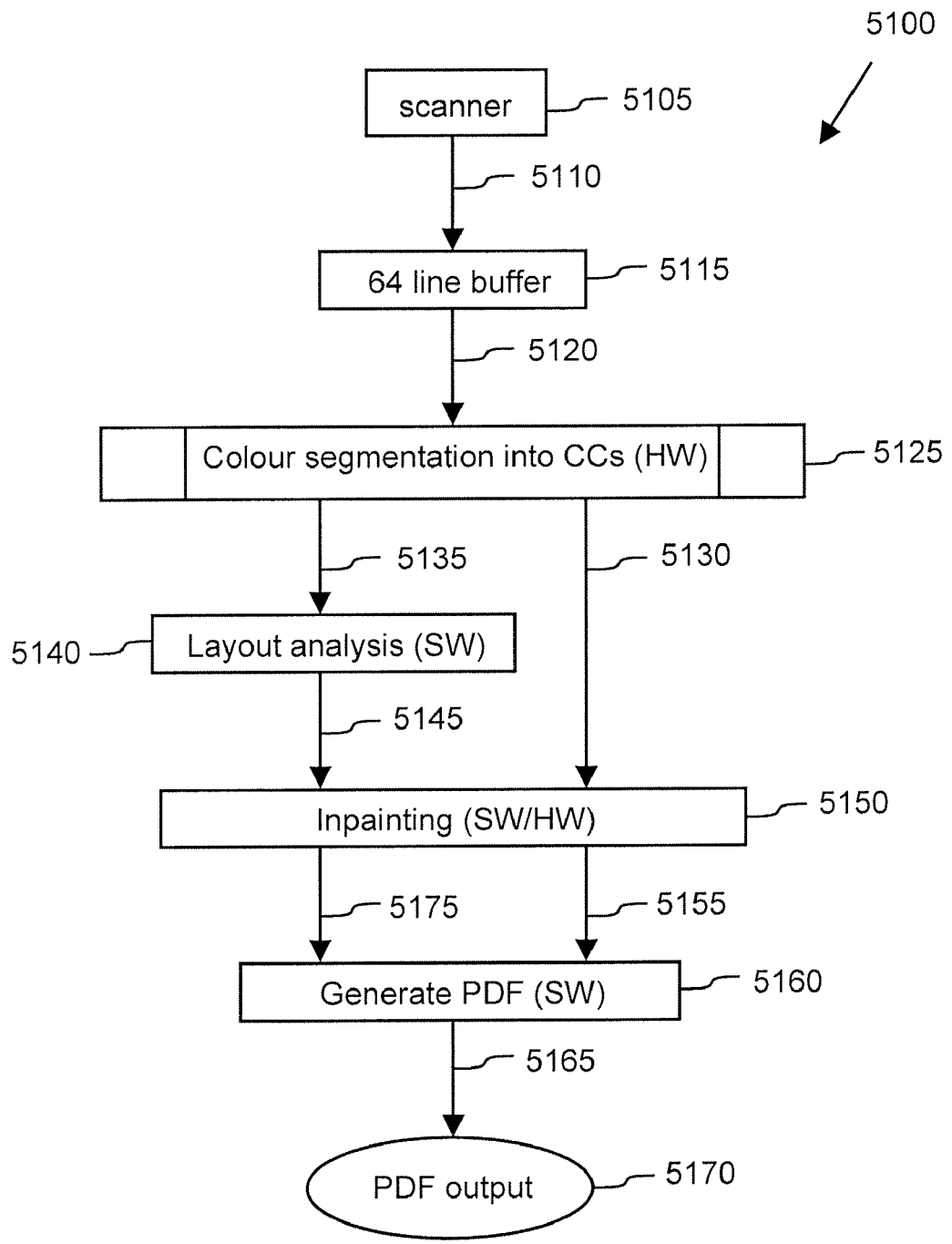
FIG. 51 is a block diagram of a system in accordance with another embodiment of the invention.

FIG. 51 illustrates a system 5100 in accordance with a second embodiment of the invention. The system 5100 features an efficient data flow between different stages of processing pipelines. The design greatly reduces memory bandwidth and enables the system 5100 to run fast.

Scanners normally acquire scanned data in pixel raster order. The pixel data is then stored and often compressed for further image processing. In a conventional scan-to-document application, the scanned data normally needs to be retrieved from storage, decompressed, and then kept in memory for segmentation and layout analysis to process the image data. This is often the case for high-speed scanners, as the segmentation process simply cannot keep up with the speed of the scanner's page-by-page streaming raster data.

This not only requires a big memory buffer, but also high memory bandwidth as each image pixel needs to be written and read at least twice. First, the pixels have to be written to memory by the scanner and then a compressor reads the data from the memory and compresses the data. Later, a decompressor must read the compressed data and decompress the data into memory. Finally, an image processor can segment the decompressed data. There is at least one redundant memory read and write for each original image pixel, not mentioning the compressed data. For a high resolution scanner (e.g. 600 dpi), this means over 200 MB of extra data.

This embodiment of the invention employs high-speed, auto-segmentation which works directly on the real-time, page-by-page streaming raster data from a scanner 5105. As a result, the redundant memory read and write are completely eliminated and the size of memory buffer is also greatly reduced.

Bus 5110 carries from the scanner 5105 the scanned raster data, which is written to module 5115, a line buffer. In this example, a 64-line buffer is used but other sizes may be practiced, dependent on the height of a band as explained hereinafter. The line buffer 5115 stores a band of data for processing by code segmentation module 5125 while simultaneously collecting a new band of incoming scanned data. The module 5125 reads a tile of data via a bus 5120 from the line buffer 5115 and colour segments the data into connected components on a tile-by-tile basis. When the module 5125 finishes a band of data, a new band of data is ready from the line buffer 5115 for processing. The old band buffer is then used to collect the new incoming raster data. The height of a band is determined by the height of a tile, and the line buffer 5115 requires double the height of a band. In this embodiment, the preferred tile size is 32×32.

Module 5125 is implemented in hardware in this embodiment, so that the processing speed of a band can keep up with the speed at which the scanner 5105 produces a new band of data. The output of module 5125 is compact Connected Components (CCs) on bus 5135 to a layout analysis module 5140 and a downsampled image either uncompressed or compressed on bus 5130 to the inpainting module 5150. The data on bus 5135 may be written to memory until a significant area of a page or a whole page of CCs is produced. Module 5140 performs layout analysis using only the compact connected component data. As the data is compact, the processing power required to perform layout analysis is small. Therefore, the layout analysis module may be implemented as software (SW) executed by an embedded processor in real time. The output of the layout analysis module is foreground information provided on bus 5145, which tags the data from bus 5135. The data on the bus 5130 also may be written to memory until a significant area of a page or a whole page of CCs are produced.

The inpainting module 5150 performs the removal of foreground on the downsampled image (provided via bus 5130) on a tile-by-tile basis. This module 5150 may be implemented on the same embedded processor that runs the layout analysis software 5140, or alternatively it may be implemented by hardware (HW). Module 5150 decompresses the data from the bus 5130, if the data is compressed. The module 5150 then in-paints the foreground area with an estimated background colour on the downsampled image to produce a background image. The foreground removed background image is output on a bus 5155, and a foreground mask is generated on a bus 5175.

Output generation module 5160 creates the layout analysed document, such as a PDF file, from the foreground images produced on the bus 5175 and background image produced on the bus 5155. The module 5160 may be implemented by software running on the same embedded processor.

In the second embodiment, modules 5115 and 5125 work on real time page-by-page scan data and produce compact connected components and a downsampled image on page N. Modules 5140, 5150 and 5160 work in sequential order using the data produced by module 5125 on page N−1. The system can therefore deliver layout analysed documents from the live data of high speed scanners in real time.

The modules 5125, 5140, 5150 and 5160 may be implemented in the manner described for the corresponding steps in the first embodiment.

5.1 Colour Segmentation Module

Figure 52:
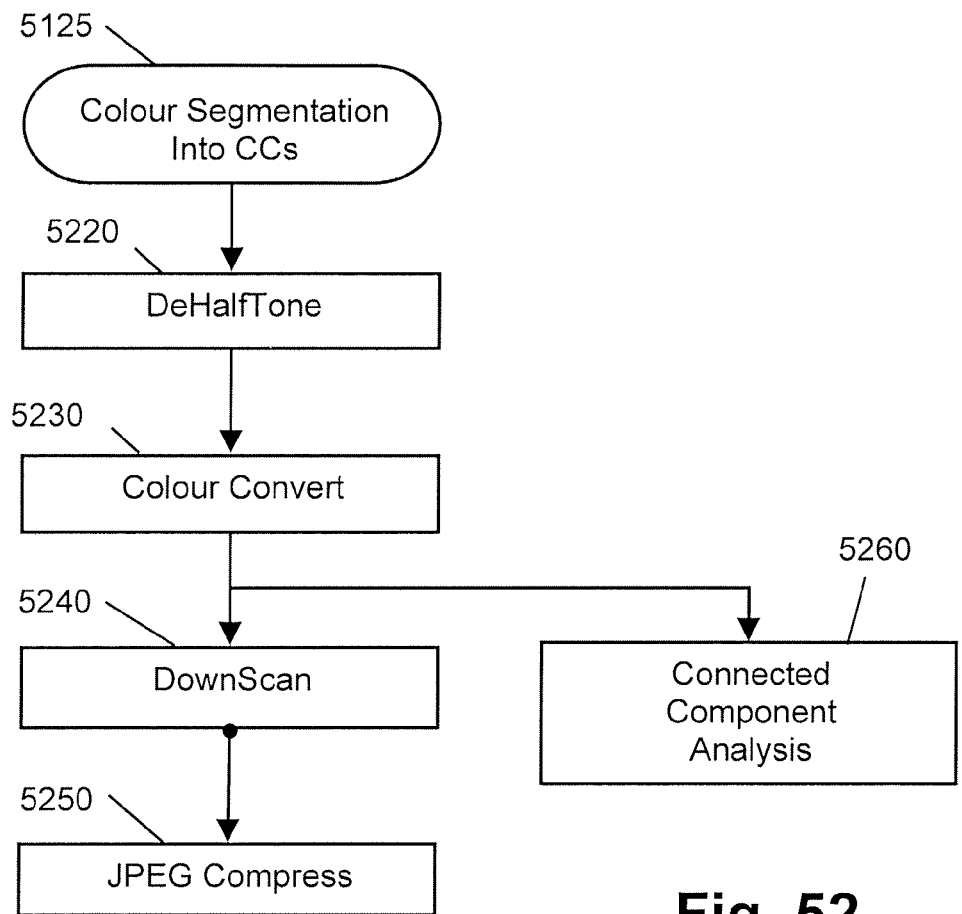
FIG. 52 is a block diagram of a colour segmentation module of FIG. 51.

FIG. 52 illustrates in detail the module 5125. The components of the Colour Segmentation into CCs module 5125 includes a dehalftone module 5220, which takes a stream of pixels in tile order and removes any artifacts caused by the scanning of material printed using a halftone system of printing, for example an Ink Jet Printer. The dehalftone module 5220 is a hardware embodiment of the software embodiment described earlier. The module may internally use static RAM and pipelined processing to achieve the necessary speed.

Pixels output from the dehalftone module 5220 are passed to the Colour Convert module 5230, which converts the pixels from the input colour space (often RGB) to the YCbCr luminance/chrominance space. This module 5230 performs the necessary multiplications and additions on each pixel according to the formula:—

$$Y = R*0.2989 + G*0.5866 + B*0.1145$$

$$Cb = R*-0.1687 + G*-0.3313 + B*0.5000$$

$$Cr = R*0.5000 + G*-0.4183 + B*-0.0816$$

The arithmetic operations are performed in scaled, fixed point arithmetic to reduce the complexity and increase the speed of the module 5125. The output from the Colour Convert module 5230 is passed to two modules, the DownScan Module 5240, and the Connected Component Analysis Module 5260. The DownScan module 5240 performs a simple averaging of the colour of a set of 4 (in a 2 by 2 square) or 16 (in a 4 by 4 square) to form each output pixel. The pixels output from the DownScan module 5240 are then compressed by the Hardware JPEG compressor 5250.

6. Computer Implementation

The methods according to the embodiments of the invention may be practiced using one or more general-purpose computer systems, printing devices, and other suitable computing devices. The processes described with reference to any one or more of FIGS. 1-52 may be implemented as software, such as an application program executing within the computer system or embedded in a printing device. Software may include one or more computer programs, including application programs, an operating system, procedures, rules, data structures, and data. The instructions may be formed as one or more code modules, each for performing one or more particular tasks. The software may be stored in a computer readable medium, comprising one or more of the storage devices described below, for example. The computer system loads the software from the computer readable medium and then executes the software.

Figure 7:
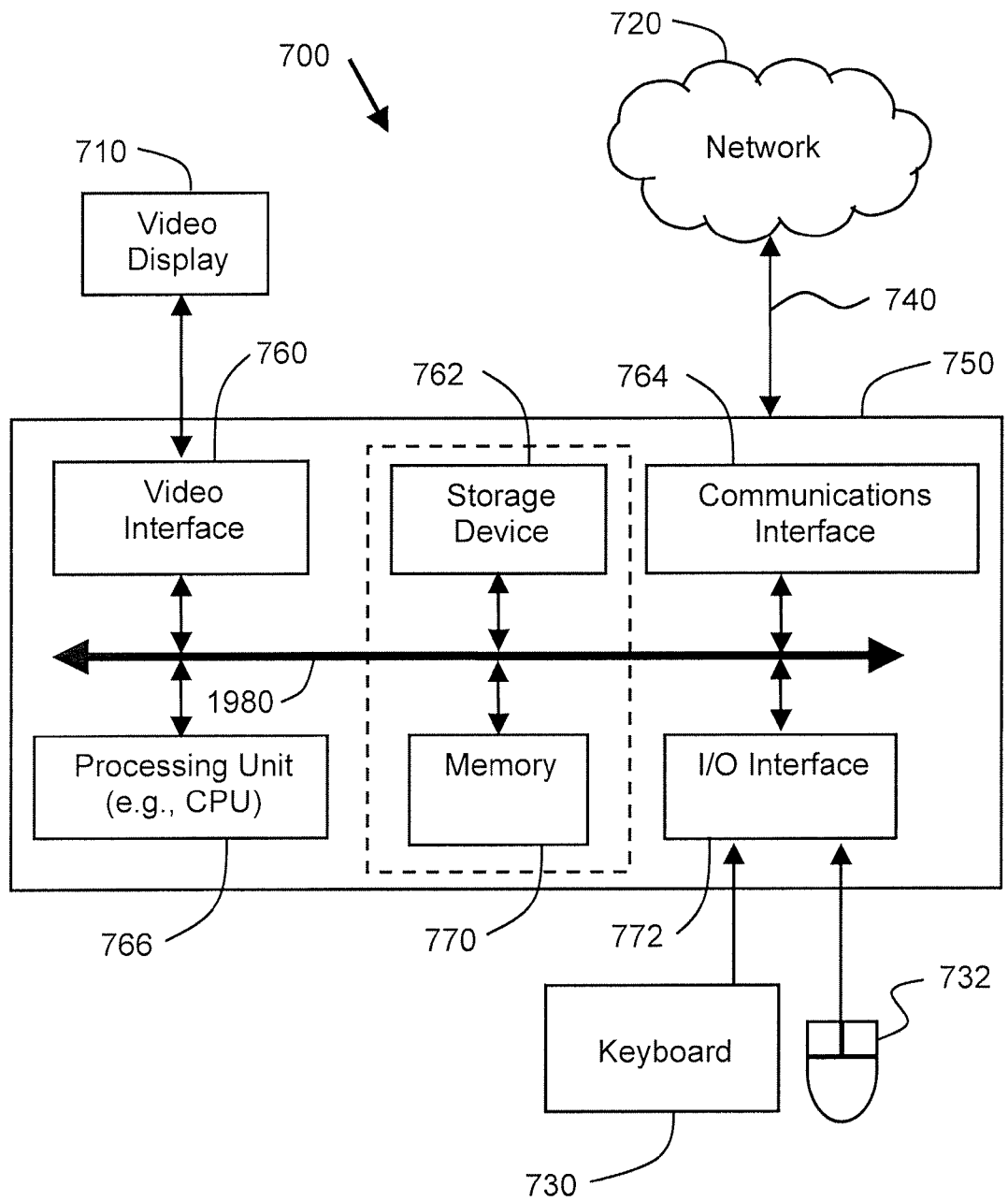
FIG. 7 is a block diagram of a general-purpose computer system with which embodiments of the invention may be practice.

FIG. 7 depicts an example of a computer system 700 with which the embodiments of the invention may be practiced. A computer readable medium having such software recorded on the medium is a computer program product. The use of the computer program product in the computer system may effect an advantageous apparatus for implementing one or more of the above methods.

In FIG. 7, the computer system 700 is coupled to a network. An operator may use the keyboard 730 and/or a pointing device such as the mouse 732 (or touchpad, for example) to provide input to the computer 750. The computer system 700 may have any of a number of output devices, including line printers, laser printers, plotters, and other reproduction devices connected to the computer. The computer system 700 can be connected to one or more other computers via a communication interface 764 using an appropriate communication channel 740 such as a modem communications path, router, or the like. The computer network 720 may comprise a local area network (LAN), a wide area network (WAN), an Intranet, and/or the Internet, for example. The computer 750 may comprise a processing unit 766 (e.g., one or more central processing units), memory 770 which may comprise random access memory (RAM), read-only memory (ROM), or a combination of the two, input/output (IO) interfaces 772, a graphics interface 760, and one or more storage devices 762. The storage device(s) 762 may comprise one or more of the following: a floppy disc, a hard disc drive, a magneto-optical disc drive, CD-ROM, DVD, a data card or memory stick, flash RAM device, magnetic tape or any other of a number of non-volatile storage devices well known to those skilled in the art. While the storage device is shown directly connected to the bus in FIG. 7, such a storage device may be connected through any suitable interface, such as a parallel port, serial port, USB interface, a Firewire interface, a wireless interface, a PCMCIA slot, or the like. For the purposes of this description, a storage unit may comprise one or more of the memory 770 and the storage devices 762 (as indicated by a dashed box surrounding these elements in FIG. 7).

Each of the components of the computer 750 is typically connected to one or more of the other devices via one or more buses 780, depicted generally in FIG. 7, that in turn comprise data, address, and control buses. While a single bus 780 is depicted in FIG. 7, it will be well understood by those skilled in the art that a computer, a printing device, or other electronic computing device, may have several buses including one or more of a processor bus, a memory bus, a graphics card bus, and a peripheral bus. Suitable bridges may be utilized to interface communications between such buses. While a system using a CPU has been described, it will be appreciated by those skilled in the art that other processing units capable of processing data and carrying out operations may be used instead without departing from the scope and spirit of the invention.

The computer system 700 is simply provided for illustrative purposes, and other configurations can be employed without departing from the scope and spirit of the invention. Computers with which the embodiment can be practiced comprise IBM-PC/ATs or compatibles, laptop/notebook computers, one of the Macintosh™ family of PCs, Sun Sparcstation™, a PDA, a workstation or the like. The foregoing are merely examples of the types of devices with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory.

In some instances, the program may be supplied encoded on a CD ROM or a floppy disk, or alternatively could be read from a network via a modem device connected to the computer, for example. Still further, the software can also be loaded into the computer system from other non-transitory computer readable storage media comprising magnetic tape, a ROM or integrated circuit, a magneto-optical disk, and a computer readable card such as a PCMCIA card. Examples of transitory media by which the program may be supplied include a radio or infra-red transmission channel between the computer and another device, and the Internet and Intranets comprising email transmissions and information recorded on websites and the like. The foregoing is merely an example of relevant computer readable media. Other computer readable media may be practiced without departing from the scope and spirit of the invention.

7. Industrial Applicability

The embodiments of the invention are applicable to the computer and data processing industries. The foregoing describes only a small number of methods, apparatuses, and computer program products for processing and compressing a digital image in accordance with embodiments of the invention, and modifications and/or changes can be made thereto without departing from the scope and spirit of the invention, the embodiments being illustrative and not restrictive.

We claim:

1. A method of segmenting a digital image comprising a plurality of pixels, said method using at least a processor to perform the steps of:
   generating a plurality of blocks of pixels from said digital image; and
   producing at least one connected component for each block using said blocks of pixels in a one-pass manner, said producing step comprising:
      segmenting a block of pixels into at least one connected component, each connected component comprising a group of pixels that are spatially connected and semantically related, said segmenting step comprising:
         estimating a number of representative colors for each block;
         quantizing each block to said representative colors; and
         forming connected components from each quantized block;
      merging said at least one connected component of said block with at least one connected component segmented from at least one other block that has been previously processed; and
      storing, for said block, the connected components of said block and data representing the location, in the digital image, of the connected components of said block.

2. The method according to claim 1, wherein said semantically related pixels comprise pixels that are similarly colored.

3. The method according to claim 1, wherein said storing sub-step comprises storing M−1 binary bitmaps, where M-connected components are in a block, M being an integer.

4. The method according to claim 1, wherein said storing sub-step comprises storing an index map.

5. The method according to claim 1, wherein said segmenting sub-step further comprises merging a subset of said connected components that are formed.

6. The method according to claim 5, wherein said merging sub-step comprises gathering statistics of said connected components.

7. The method according to claim 6, further comprising the step of removing said formed connected components that are deemed to be noise.

8. The method according to claim 7, wherein said noise comprises connected components having a pixel count that is below a predefined threshold and a border-length-to-pixel-count ratio above another predefined threshold.

9. The method according to claim 6, wherein said statistics comprise any one or more of bounding boxes, pixel count, border length, and average color.

10. The method according to claim 6, wherein said merging step comprises:
    merging connected components of a first block with connected components of a second block on the left of and above the first block; and
    updating said statistics of said merged connected components.

11. The method according to claim 10, wherein said statistics comprise any one of more of bounding boxes, pixel count, fill ratio, and average color.

12. The method according to claim 10, wherein said merging step comprises the following sub-steps performed for each connected component in the first block touching the common border with the second block to the left and above the first block:
    finding a list of connected components that touch one of the connected components of the first block along the common border; and
    deciding on the best candidate to merge.

13. The method according to claim 1, wherein said estimating sub-step comprises:
    forming a histogram related to a plurality of color bins based on YUV data of pixels in each block;
    classifying each block based on histogram statistics; and
    merging bin colors to form said representative colors based on said block classification.

14. The method according to claim 13, further comprising the step of forming an indexed map for each pixel in one pass.

15. The method according to claim 14, wherein said quantizing step comprises:
    quantizing non-empty bins to representative colors;
    creating a bin mapping to said representative colors; and
    remapping said indexed map to said representative colors using said bin mapping.

16. The method according to claim 13, wherein said forming sub-step comprises:
deciding on a luminance band based on Y value;
deciding on a color column based on a U and a V value;
accumulating the pixel color to a mapped bin; and
incrementing the pixel count of the mapped bin.

17. The method according to claim 16, wherein said step of deciding a luminance band further comprises luminance-band anti-aliasing.

18. The method according to claim 16, wherein said deciding on a color column further comprises color column anti-aliasing.

19. An apparatus comprising a processor and memory for segmenting a digital image comprising a plurality of pixels in accordance with the method of claim 1.

20. A non-transitory computer readable storage medium having recorded therein a computer program for segmenting a digital image comprising a plurality of pixels in accordance with the method of claim 1.

21. A method of segmenting a digital image comprising a plurality of pixels, said method using at least a processor to perform the steps of:
generating a plurality of blocks of pixels from said digital image, wherein said generating step comprises the sub-steps of:
arranging said digital image into a plurality of bands, each band comprising a predetermined number of consecutive lines of pixels;
buffering and processing said bands one-by-one, wherein said processing step comprises the sub-steps, performed on each currently buffered band, of:
arranging said currently buffered band into a plurality of blocks of pixels; and
buffering and processing said blocks of pixels of said currently buffered band one-by-one; and
producing at least one connected component for said blocks of pixels, said producing step comprising:
segmenting said blocks of pixels into at least one connected component, each connected component comprising a group of pixels that are spatially connected and semantically related;
merging said at least one connected component of one block with at least one connected component segmented from at least one other block that has been previously processed; and
storing, for said block, the connected components of said block and data representing the location, in the digital image, of the connected components of said block.

* * * * *